United States Patent
Kobayashi et al.

(10) Patent No.: US 10,380,523 B2
(45) Date of Patent: Aug. 13, 2019

(54) SCHEDULING APPARATUS, SCHEDULING METHOD, AND COMPUTER PROGRAM

(71) Applicant: NIPPON STEEL & SUMITOMO METAL CORPORATION, Tokyo (JP)

(72) Inventors: Hirokazu Kobayashi, Tokyo (JP); Yasuhito Yaji, Tokyo (JP); Akihito Furukawa, Tokyo (JP); Minenori Inatomi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 1232 days.

(21) Appl. No.: 14/387,374

(22) PCT Filed: Apr. 11, 2013

(86) PCT No.: PCT/JP2013/060961
§ 371 (c)(1),
(2) Date: Sep. 23, 2014

(87) PCT Pub. No.: WO2013/154164
PCT Pub. Date: Oct. 17, 2013

(65) Prior Publication Data
US 2015/0081373 A1   Mar. 19, 2015

(30) Foreign Application Priority Data
Apr. 12, 2012   (JP) ................. 2012-091077

(51) Int. Cl.
*G06Q 10/06* (2012.01)
*G06Q 10/00* (2012.01)
*G05B 19/418* (2006.01)

(52) U.S. Cl.
CPC .  *G06Q 10/06313* (2013.01); *G05B 19/41865* (2013.01); *G06Q 10/00* (2013.01); *Y02P 90/20* (2015.11)

(58) Field of Classification Search
CPC .................................................. G06Q 10/06
See application file for complete search history.

(56) References Cited

U.S. PATENT DOCUMENTS

| 5,826,236 A | 10/1998 | Narimatsu et al. |
| 6,968,499 B1 * | 11/2005 | Minami ............ G06F 17/30905 |
| | | 707/E17.121 |

(Continued)

FOREIGN PATENT DOCUMENTS

| JP | 8-212264 A | 8/1996 |
| JP | 2000-254839 A | 9/2000 |
| JP | 2006-48088 A | 2/2006 |

OTHER PUBLICATIONS

International Search Report issued in PCT/JP2013/060961, dated Jul. 16, 2013.

(Continued)

*Primary Examiner* — Kurtis Gills
(74) *Attorney, Agent, or Firm* — Birch, Stewart, Kolasch & Birch, LLP

(57) ABSTRACT

Resources, product classes, processes, and product orders are registered in mutual association. From the information of product classes, processes, and resources, variables and constants used when formulating an objective function and a constraint expression are constructed. A constraint setting screen is displayed which includes contents of the constraint expression described by using the selection input field of identification information of the product classes, processes, and resources. Based on a result of selective input to this constraint setting screen, the contents of constraint are set. Further, an object setting screen is displayed which includes the contents of an object described using the product classes and processes and text information indicating the contents of the object, and a selection input field thereof. The contents of the object are registered based on a result of selective (Continued)

input to this object setting screen. Then, the constraint expression and the objective function are formulated based on the constructed variables and constants, the information of the product class, process, and resource, and the set contents of the constraint and the objective function.

28 Claims, 26 Drawing Sheets

(56) References Cited

U.S. PATENT DOCUMENTS

| | | | | |
|---|---|---|---|---|
| 7,448,022 | B1* | 11/2008 | Ram | G06F 8/00 717/120 |
| 8,180,658 | B2* | 5/2012 | Hamadi | G06Q 10/06 705/7.11 |
| 2008/0244057 | A1* | 10/2008 | Kojima | G06F 8/61 709/223 |
| 2011/0078074 | A1* | 3/2011 | Lipman | G06Q 10/06 705/39 |
| 2012/0203564 | A1* | 8/2012 | Myr | G06Q 10/06 705/2 |

OTHER PUBLICATIONS

PCT/ISA/237—Issued in PCT/JP2013/060961, mailed on Jul. 16, 2013.
International Preliminary Report on Patentability dated Oct. 23, 2014, issued in PCT/JP2013/060961 (Forms PCT/IB/338, PCT/IB/373 and PCT/IB 237).

\* cited by examiner

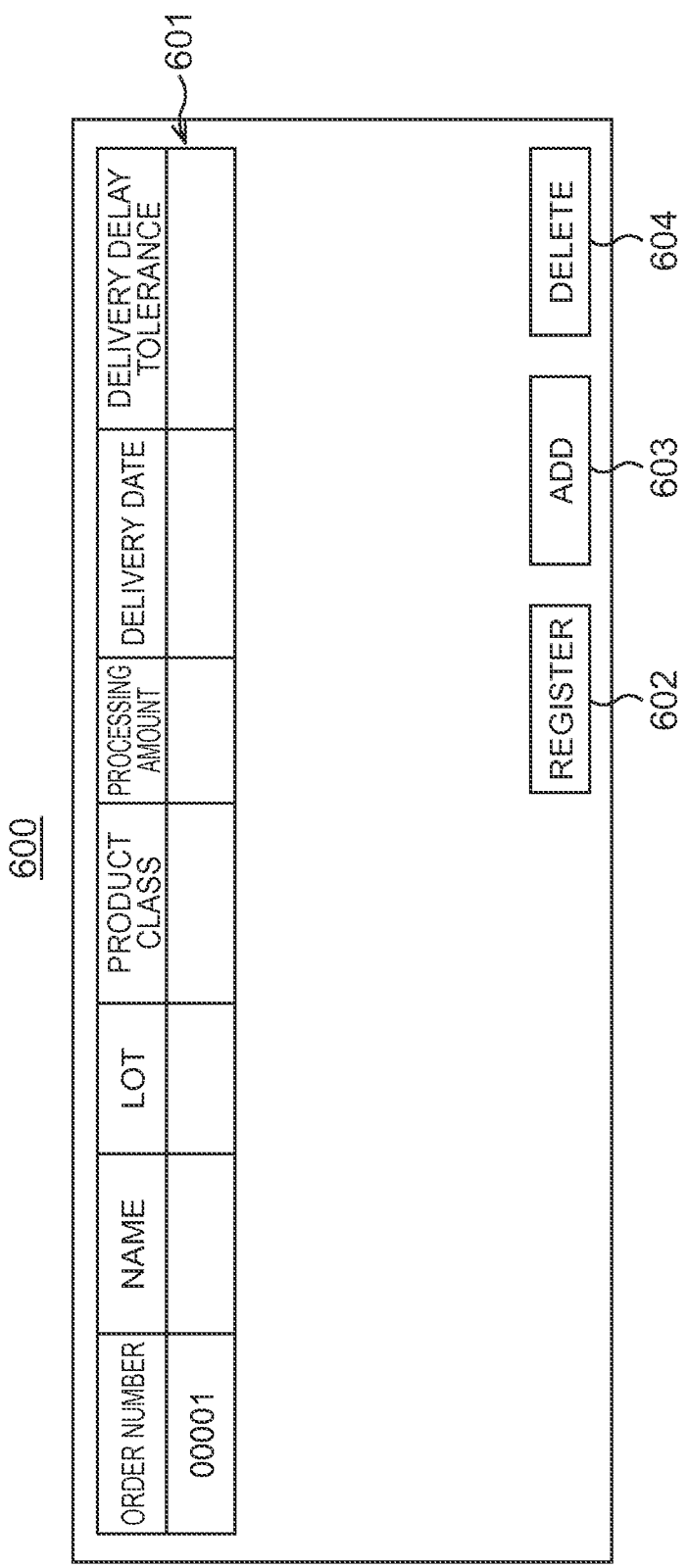

| ORDER NUMBER | NAME | LOT | PRODUCT CLASS | PROCESSING AMOUNT | DELIVERY DATE | DELIVERY DELAY TOLERANCE |
|---|---|---|---|---|---|---|
| 00001 | 1 FOR COMPANY A | L001 | NORMAL OPERATION | 5.0 | 2011/12/10 | 3 |
| 00002 | 2 FOR COMPANY A | L001 | NORMAL OPERATION | 2.0 | 2011/12/15 | 2 |
| 00003 | 3 FOR COMPANY A | L011 | SPECIAL OPERATION 1 | 3.0 | 2011/12/16 | 2 |
| ... | ... | ... | ... | ... | ... | ... |
| N | 1 FOR COMPANY B | L002 | SPECIAL OPERATION 1 | 4.5 | 2011/12/12 | 2 |

601

REGISTER 602    ADD 603    DELETE 604

| CONSTRAINT NAME | PRODUCT CLASS | CONDITION | | RESULT | |
|---|---|---|---|---|---|
| | | PROCESS NAME | RESOURCE NAME | PROCESS NAME | RESOURCE NAME |
| CONSTRAINT 2-1 | | | | | |
| | | | | | |

← 801

[REGISTER] 802  [ADD CURRENT CONSTRAINT] 803  [ADD NEXT CONSTRAINT] 804  [DELETE] 805

| CONSTRAINT NAME | PRODUCT CLASS | CONDITION | | RESULT | |
|---|---|---|---|---|---|
| | | PROCESS NAME | RESOURCE NAME | PROCESS NAME | RESOURCE NAME |
| CONSTRAINT 2-1 | NORMAL OPERATION | MACHINING | MACHINE 1 | STANDBY | MACHINE 1 |
| | | | | ASSEMBLY | MACHINE 1 |

← 801

[REGISTER] 802  [ADD CURRENT CONSTRAINT] 803  [ADD NEXT CONSTRAINT] 804  [DELETE] 805

FIG. 15

| FUNCTION NUMBER | EFFECTIVENESS NECESSITY | PRODUCT CLASS | PROCESS | OBJECT | IMPORTANCE (0 TO 10) |
|---|---|---|---|---|---|
| OBJECT 00001 | ☐ | NORMAL OPERATION | MACHINING | START QUICKEST | 0 |
| OBJECT 00002 | ☑ | NORMAL OPERATION | MACHINING | PROCESSING TIME MINIMUM | 5 |
| ... | ... | ... | ... | ... | ... |
| OBJECT W | ☑ | SPECIAL OPERATION 1 | ASSEMBLY | DELIVERY ON TIME | 10 |

1500

1501

REGISTER — 1502

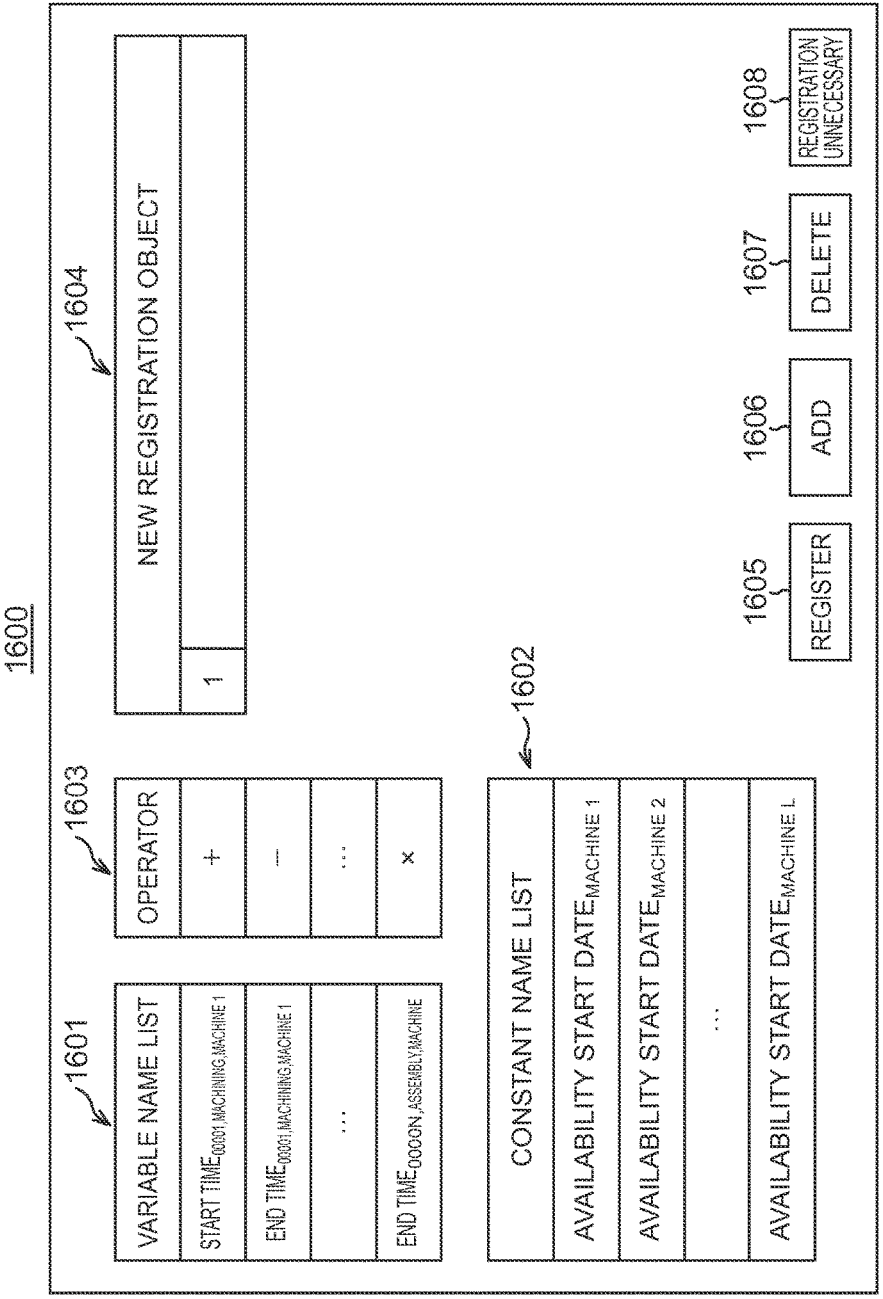

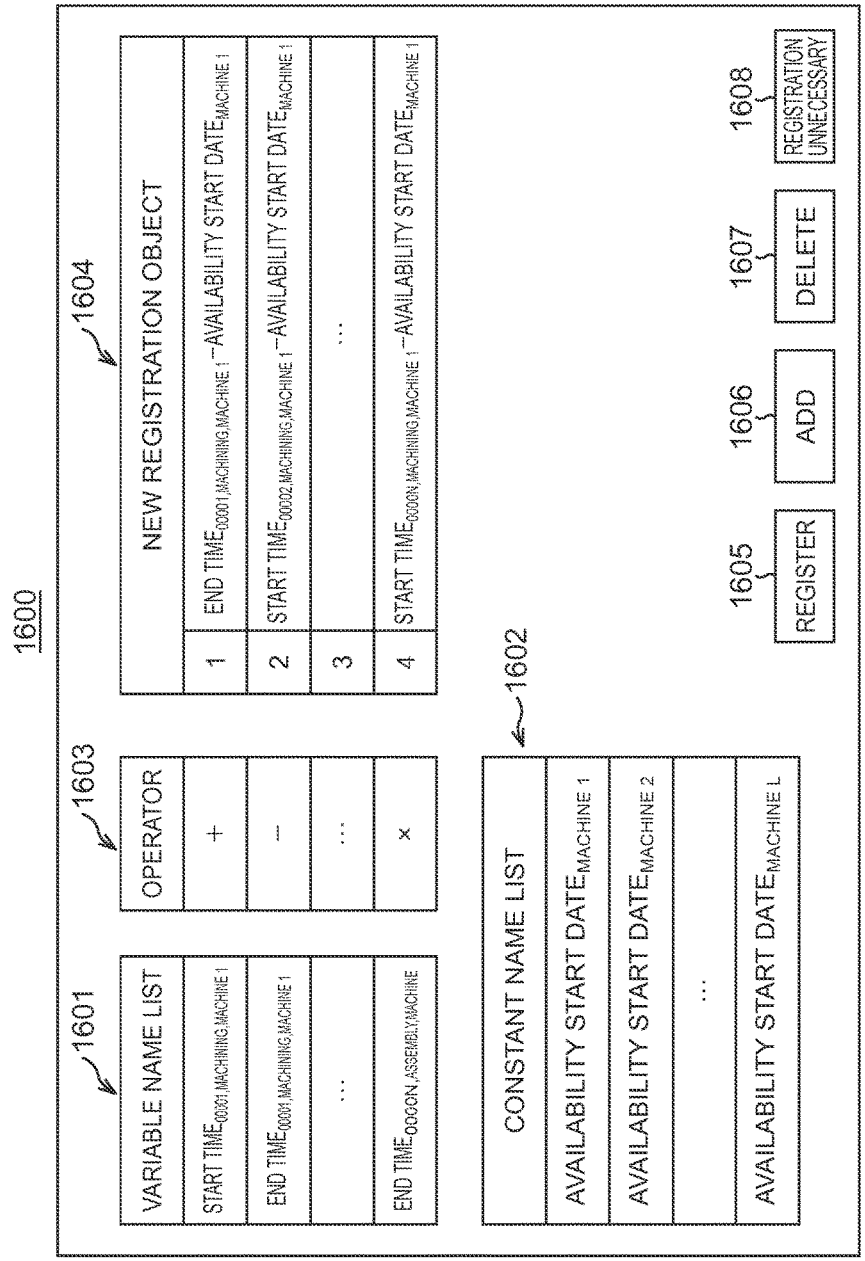

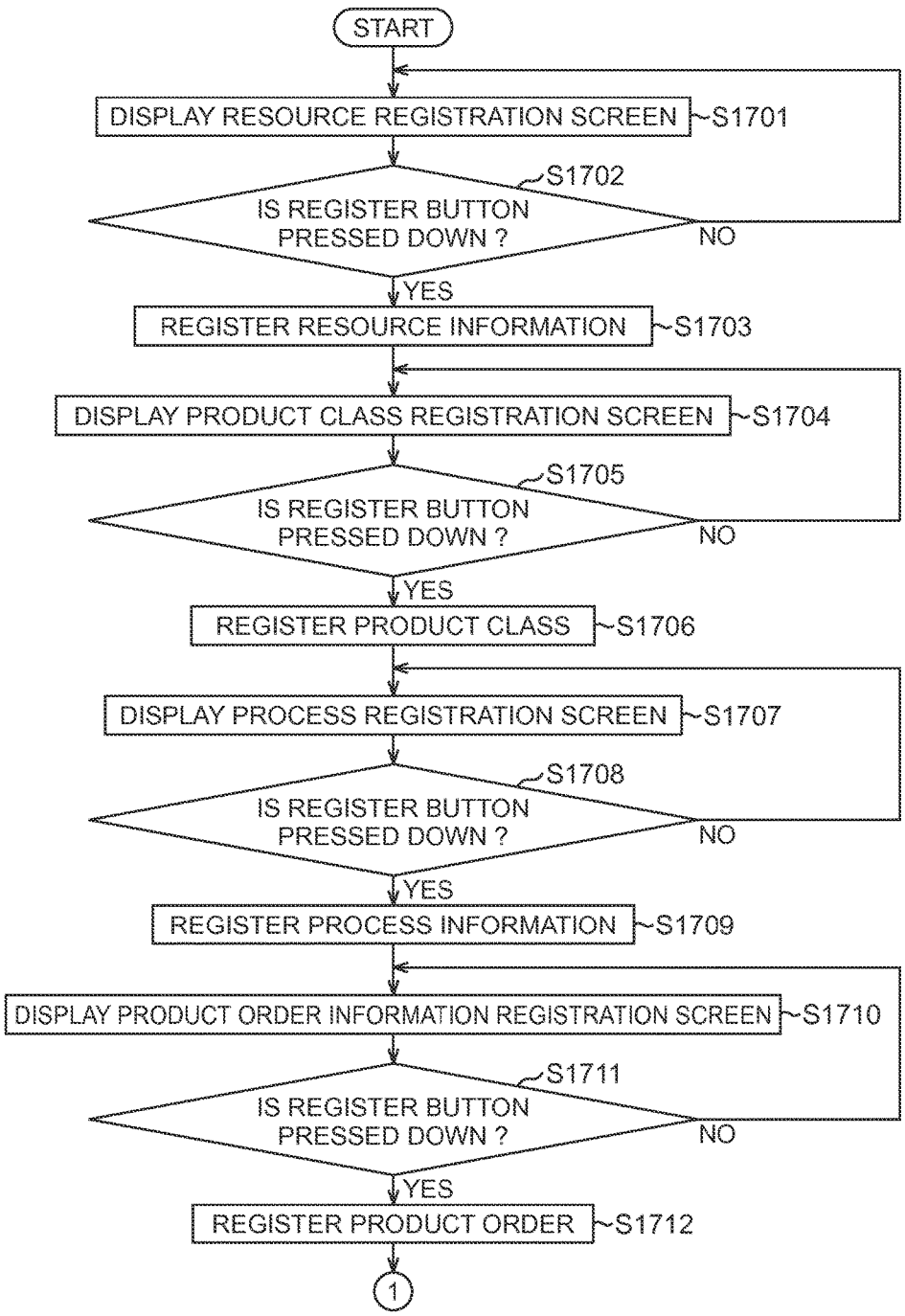

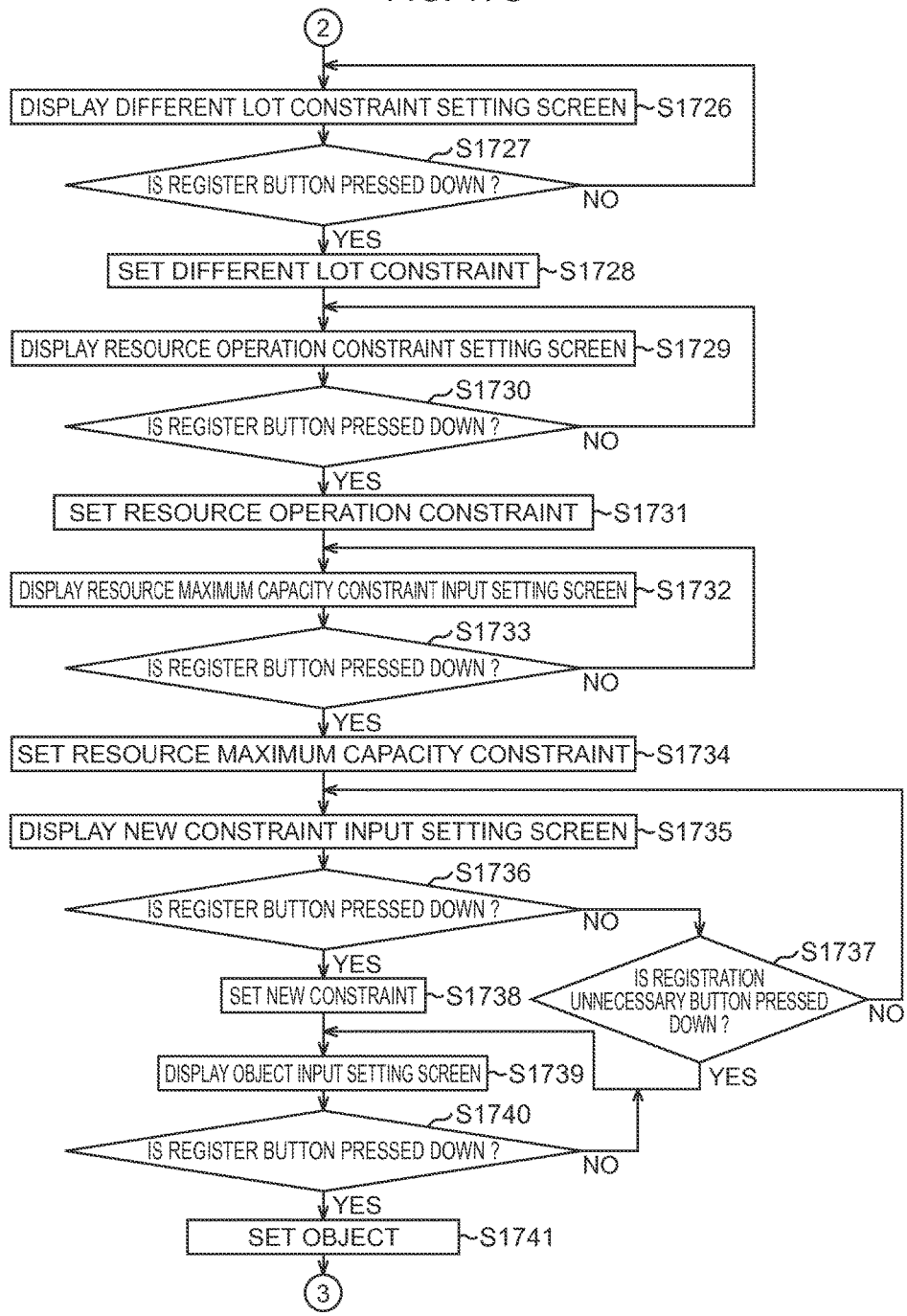

SCHEDULING APPARATUS, SCHEDULING METHOD, AND COMPUTER PROGRAM

TECHNICAL FIELD

The present invention relates to a scheduling apparatus, a scheduling method, and a computer program. In particular, it is preferably used for automatically planning a manufacturing plan or a distribution plan by mathematical programming.

BACKGROUND ART

In manufacturing industry, various resources are used in various processes for manufacturing products from raw materials, assembling parts to make products, or the like. In order to effectively utilize these resources or to appropriately adjust stock amounts, it is essential to create a production plan or a distribution plan to perform operation following this plan. The same is true not only in manufacturing industry but also in distribution business or the like.

However, on the site of product manufacturing or distribution, there exist numerous raw materials, intermediate products, and products, and resources for machining, transportation, or the like of them are associated with each other intricately. Accordingly, constraints which should be considered become complicated. Therefore, for example, it is uneasy to create a production plan or a distribution plan for keeping stocks appropriately or producing products without delaying the delivery date.

As a technology for solving such a problem, conventionally, scheduling apparatuses have been developed for rewriting a rule made by a person (for example, a rule to start production first from a product whose delivery date is closer) into a program, and creating the production plan or the distribution plan automatically.

Such a rule-based scheduling apparatus can make a certain kind of plan quickly even for a complicated problem. However, there are a problem that there is no proof for whether a mathematically optimum plan is really made or not, a problem that the rules become quite enormous, and the like.

Then, as such a rule-based scheduling apparatus, there is a technology described in Patent Literature 1. Patent Literature 1 discloses a technology which obtains a first measure corresponding to a difference between an end time and a scheduled end time of a series of processes obtained from a result of temporarily assigning processes to a resource, and a second measure obtained by digitizing compatibility between the temporarily assigned resource and the processes, and repeatedly corrects the temporary assignment until a best assignment result is obtained. In this manner, in the technology disclosed in Patent Literature 1, based on predetermined measures, correction to assign necessary processes to a resource is repeated. Thus, it is not ensured that a mathematically really optimum plan is made.

Accordingly, as a method to mathematically solving them, scheduling apparatuses creating a production plan or a distribution plan using mathematical programming have been developed.

By using the mathematical programming, it is possible to make a production plan or a distribution plan whose optimality is mathematically ensured. However, to make the production plan or the distribution plan according to this method, the planner needs to have high-level mathematical expertise. Thus, it has been often difficult for a general user who plans production and distribution handles such a scheduling apparatus creating the production plan or the distribution plan using the mathematical programming.

Accordingly, it is demanded to construct a system which allows even a general user who has no high-level mathematical expertise to simply make the production plan or the distribution plan in a form according to the mathematical programming.

As such a scheduling apparatus using the mathematical programming, there is a technology described in Patent Literature 2. Patent Literature 2 discloses that after a production plan is made by performing optimization calculation by the mathematical programming, a quantitative relation ratio is fixed between raw materials and products in this production plan, the amounts of the raw materials and the products are then corrected by using GUI (Graphical User Interface), and a production plan is remade with the amounts after correction and the quantitative relation ratio, thereby enabling a verification by which a planning result is not largely changed.

However, in the technology disclosed in Patent Literature 2, only a production plan specialized to specific operations can be made. Accordingly, by the technology described in Patent Literature 2, a general-purpose production plan or distribution plan cannot be made.

As a technology to make a general-purpose production plan or distribution plan according to a mathematical method by using the mathematical programming, there is AIMMS developed by Paragon Decision Technology B.V. This technology allows the user to define variables for the mathematical programming by using GUI, and formulate an objective function and a constraint expression by using the defined variables.

However, such technology requires the user himself/herself to input variables to be used in the mathematical programming one by one, and to describe also to write constraint expressions one by one as a mathematical expression. Accordingly, a general user who has no mathematical expertise cannot easily make full use of such technology.

CITATION LIST

Patent Literature

Patent Literature 1: Japanese Laid-open Patent Publication No. 8-212264
Patent Literature 2: Japanese Laid-open Patent Publication No. 2000-254839

SUMMARY OF INVENTION

Technical Problem

As above, it has been difficult by the conventional technologies to provide a general user who has no high-level mathematical expertise with a system to make a general-purpose production plan or distribution plan by using the mathematical programming.

Accordingly, it is an object of the present invention to provide a general user who has no high-level mathematical expertise with a system to make a production plan or distribution plan more diverse than hitherto by using the mathematical programming.

Solution to Problem

A scheduling apparatus of the present invention is a scheduling apparatus automatically making a production plan or a distribution plan by mathematical programming by using information of each of a product order indicating contents of an order of a product, a process which is processing executed in a course of production or distribution of the product, a resource which is a human resource and a material resource used in the process, and a product class which is identification information for distinguishing orders for which processes executed in the course of production or distribution of the product, an order of execution of the processes, and resources used respectively in the processes are same, as one set from others, the scheduling apparatus including: a registration means registering the resources and the processes, the processes and the product classes, and the product classes and the product orders in mutual association in a recording medium; a construction means constructing variables including a start time and end time of each product order/each process/each resource as decision variables used when formulating an objective function and a constraint expression according to the mathematical programming based on the product classes, the processes, the resources, and the product orders which are mutually associated by the registration means; a constraint setting means setting contents of the constraint expression based on an input operation of identification information by a user to a selection input field for inputting at least one piece of identification information of the product classes, the processes, and the resources which are mutually associated by the registration means; an object setting means setting contents of the objective function based on an input operation of identification information and an object by the user to a selection input field for inputting identification information of the product classes and the processes which are mutually associated by the registration means and an object by the objective function; a constraint expression formulating means formulating the constraint expression by using the variables constructed by the construction means based on the product classes, the processes, the resources, and the product orders which are mutually associated by the registration means and the contents of the constraint expression set by the constraint setting means; an objective function formulating means formulating the objective function by using the variables constructed by the construction means based on the product classes, the processes, the resources, and the product orders which are mutually associated by the registration means and the contents of the objective function set by the object setting means; and a plan creating means performing optimization calculation by the mathematical programming to derive the decision variable which maximize or minimize the objective function formulated by the objective function formulating means within a range which satisfies constraints based on the constraint expression formulated by the constraint expression formulating means.

A scheduling method of the present invention is a scheduling method automatically making a production plan or a distribution plan on a computer by mathematical programming by using information of each of a product order indicating contents of an order of a product, a process which is processing executed in a course of production or distribution of the product, a resource which is a human resource and a material resource used in the process, and a product class which is identification information for distinguishing orders for which processes executed in the course of production or distribution of the product, an order of execution of the processes, and resources used respectively in the processes are same, as one set from others, the scheduling method including: a registration step of registering the resources and the processes, the processes and the product classes, and the product classes and the product orders in mutual association in a recording medium; a construction step of constructing variables including a start time and end time of each product order/each process/each resource as decision variables used when formulating an objective function and a constraint expression according to the mathematical programming based on the product classes, the processes, the resources, and the product orders which are mutually associated by the registration step; a constraint setting step of setting contents of the constraint expression based on an input operation of identification information by a user to a selection input field for inputting at least one piece of identification information of the product classes, the processes, and the resources which are mutually associated by the registration step; an object setting step of setting contents of the objective function based on an input operation of identification information and an object by the user to a selection input field for inputting identification information of the product classes and the processes which are mutually associated by the registration step and an object by the objective function; a constraint expression formulating step of formulating the constraint expression by using the variables constructed by the construction step based on the product classes, the processes, the resources, and the product orders which are mutually associated by the registration step and the contents of the constraint expression set by the constraint setting step; an objective function formulating step of formulating the objective function by using the variables constructed by the construction step based on the product classes, the processes, the resources, and the product orders which are mutually associated by the registration step and the contents of the objective function set by the object setting step; and a plan creating step of performing optimization calculation by the mathematical programming to derive the variable which maximize or minimize the objective function formulated by the objective function formulating step within a range which satisfies constraints based on the constraint expression formulated by the constraint expression formulating step.

A computer program of the present invention is a computer program for causing a computer to perform automatically making a production plan or a distribution plan by mathematical programming by using information of each of a product order indicating contents of an order of a product, a process which is processing executed in a course of production or distribution of the product, a resource which is a human resource and a material resource used in the process, and a product class which is identification information for distinguishing orders for which processes executed in the course of production or distribution of the product, an order of execution of the processes, and resources used respectively in the processes are same, as one set from others, the computer program causing a computer to execute: a registration step of registering the resources and the processes, the processes and the product classes, and the product classes and the product orders in mutual association in a recording medium; a construction step of constructing variables including a start time and end time of each product order/each process/each resource as decision variables used when formulating an objective function and a constraint expression according to the mathematical programming based on the product classes, the processes, the resources, and the product orders which are mutually associated by the registration step; a constraint setting step of setting contents of the constraint expression based on an input operation of identification information by a user to a selection input field for inputting at least one piece of identification information of the product classes, the processes, and the resources which are mutually associated by the registration step; an object setting step of setting contents of the objective function based on an input operation of identification information and an object by the user to a selection input field for inputting identification information of the product classes and the processes which are mutually associated by the registration step and an object by the objective function; a constraint expression formulating step of formulating the constraint expression by using the variables constructed by the construction step based on the product classes, the processes, the resources, and the product orders which are mutually associated by the registration step and the contents of the constraint expression set by the constraint setting step; an objective function formulating step of formulating the objective function by using the variables constructed by the construction step based on the product classes, the processes, the resources, and the product orders which are mutually associated by the registration step and the contents of the objective function set by the object setting step; and a plan creating step of performing optimization calculation by the mathematical programming to derive the variable which maximize or minimize the objective function formulated by the objective function formulating step within a range which satisfies constraints based on the constraint expression formulated by the constraint expression formulating step.

Advantageous Effects of Invention

According to the present invention, resources and processes, processes and product classes, and product classes and product orders are registered in mutual association via processes. Then, contents of constraint expression are set based on an input operation of identification information to a selection input field for inputting identification information of at least one of the product classes, processes, and resources. Further, contents of an objective function are set based on an input operation of identification information and an object to a selection input field for inputting identification information of product classes and processes and an object by the objective function. Therefore, it is possible to provide a general user who has no high-level mathematical expertise with a system to make a production plan or distribution plan more diverse than hitherto by using mathematical programming.

BRIEF DESCRIPTION OF DRAWINGS

FIG. 6A is a diagram illustrating an example of an initial state of a product order registration screen.

FIG. 6B is a diagram illustrating an example of the product order registration screen to which product order information is inputted.

FIG. 8A is a diagram illustrating an example of an initial state of a resource use pattern constraint setting screen.

FIG. 8B is a diagram illustrating an example of the resource use pattern constraint setting screen to which information of resource use pattern constraint is inputted.

FIG. 15 is a diagram illustrating an example of an object setting screen.

FIG. 16A is a diagram illustrating an example of an initial state of a new object setting screen.

FIG. 16B is a diagram illustrating an example of the new object setting screen to which information of new objects is inputted.

FIG. 17A is a flowchart describing an example of a processing operation of the scheduling apparatus.

FIG. 17C is a flowchart continued from FIG. 17B.

DESCRIPTION OF EMBODIMENTS

Hereinafter, one embodiment of the present invention will be described with reference to drawings.

Figure 1:
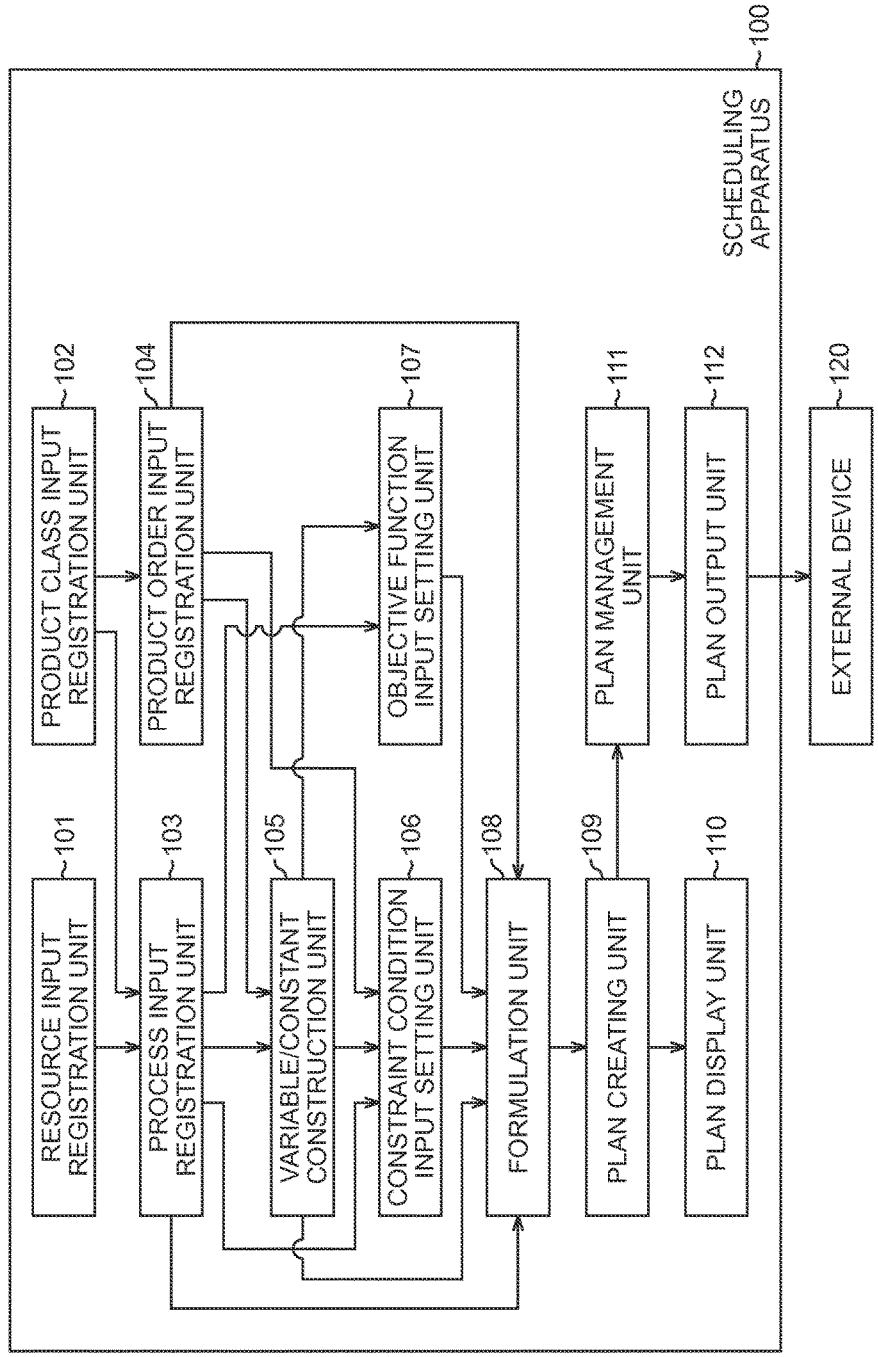
FIG. 1 is a diagram illustrating an example of a functional structure of a scheduling apparatus.

FIG. 1 is a diagram illustrating an example of a functional structure of a scheduling apparatus 100. Note that the scheduling apparatus 100 illustrated in FIG. 1 can be realized by using an information processing apparatus having, for example a CPU, a ROM, a RAM, an HDD, and various interfaces.

The scheduling apparatus 100 of this embodiment sets an objective function and a constraint expression by using information inputted based on an operation of an input device by the user, calculates an optimum value of the objective function by using mathematical programming, makes a production plan from the calculated result, and presents the result to the user. In particular, this embodiment enables a general user who has no high-level mathematical expertise to input information needed for setting the objective function and the constraint expression.

Before describing the function of the scheduling apparatus 100, an overview of "resource, product class, process, product order" described in the following description will be described.

Figure 2:
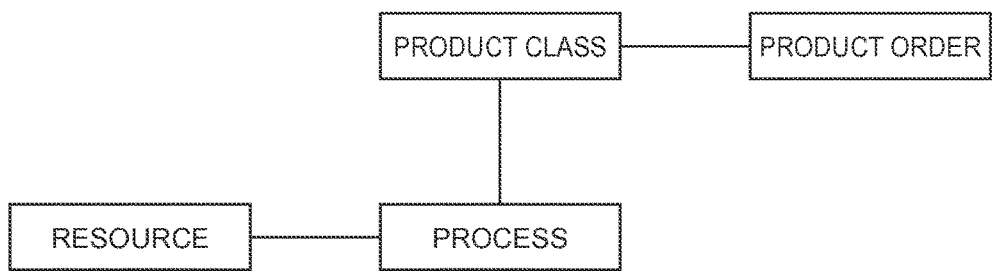
FIG. 2 is a diagram conceptually illustrating an example of a relation of respective information of resource, product class, process, product order.

FIG. 2 is a diagram conceptually illustrating an example of a relation of respective information of resource, product class, process, product order.

In this embodiment, a resource, a product class, a process, and a product order are inputted to the scheduling apparatus 100 based on an operation of the input device by the user and registered.

The resource is a general term for human resource and material resource used in respective processes for carrying out production and distribution of products, and information to be "constant" in at least one of the objective function and the constraint expression is contained as an attribute thereof (see "maximum capacity", "minimum use interval", "availability start date" of FIG. 3). The material resource is, for example, a storage place for machine/equipment for machining and transportation, raw materials, intermediate products, and products, and includes all kinds of material resources generally involved in the fields of production planning and distribution planning. The human resource includes, for example, workers, and includes all kinds of human resources generally involved in the fields of production planning and distribution planning.

The product class is identification information for distinguishing processes executed in the course of production or distribution of a product included in a product order (order), an execution order of the processes, and a resource used in each of the processes as one block from others (see FIG. 4 and FIG. 5). The product order belongs to one of the product classes (see FIG. 6).

In this embodiment, as will be described later, a resource used in each process is registered (see FIG. 5), a process executed in each product class is registered (see FIG. 5), and a product class is registered with respect to the product order (see FIG. 6). Thus, as illustrated in FIG. 2, the resource and the process, the process and the product class, and the product class and the product order are mutually associated one another. That is, the resource, the product class, the process, and the product order are registered in a mutual association. Details of an example of inputting and registering method of the resource, the product class, the process, and the product order will be described later with reference to FIG. 3 to FIG. 6.

Details of an example of the functions which the scheduling apparatus 100 has will be described in detail below.

(Resource Input Registration Unit 101)

A resource input registration unit 101 first displays a resource registration screen on a display device.

Figure 3A:
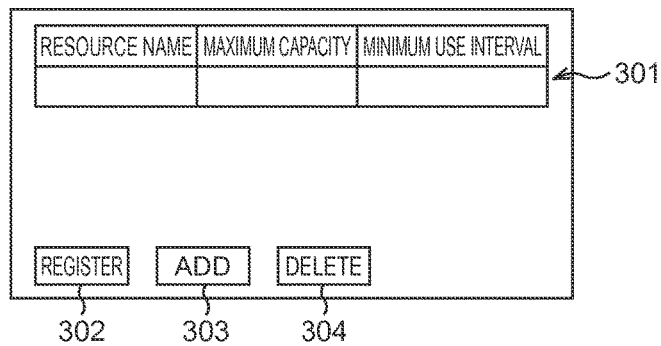
FIG. 3A is a diagram illustrating an example of an initial state of a resource registration screen.
Figure 3B:
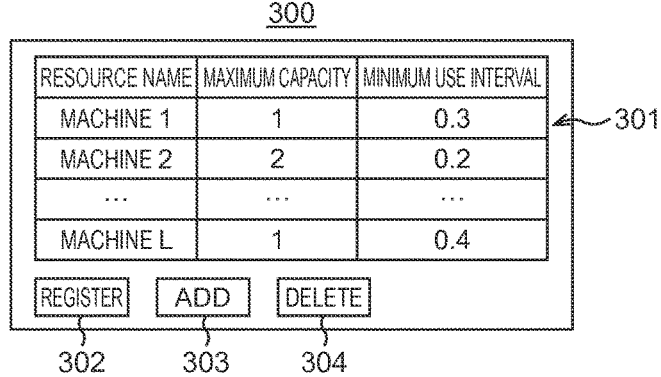
FIG. 3B is a diagram illustrating an example of the resource registration screen to which an initial attribute of the resource is inputted.
Figure 3C:
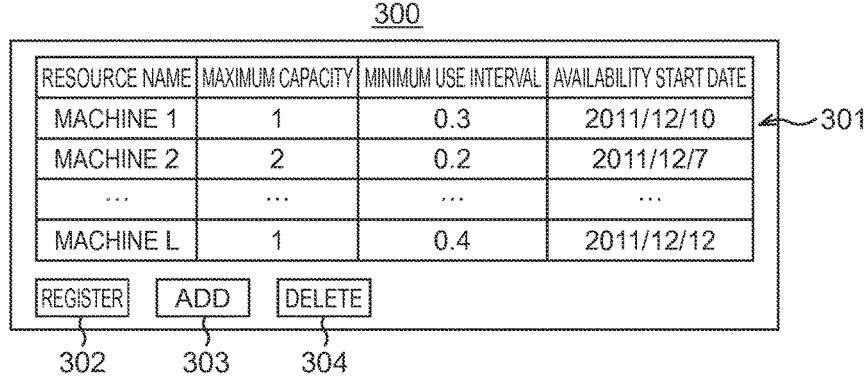
FIG. 3C is a diagram illustrating an example of the resource registration screen to which the initial attribute of the resource and an attribute newly added by a user are inputted.

FIG. 3 are diagrams illustrating an example of a resource registration screen 300. Specifically, FIG. 3A is a diagram illustrating an example of an initial state of the resource registration screen 300. FIG. 3B is a diagram illustrating an example of the resource registration screen 300 to which an initial attribute (attribute set in advance) of the resource is inputted. FIG. 3C is a diagram illustrating an example of the resource registration screen 300 to which the initial attribute of the resource and an attribute newly added by the user are inputted.

In FIG. 3, the resource registration screen 300 is a GUI and has a resource input field 301, a register button 302, an add button 303, and a delete button 304.

The resource registration screen 300 is a screen for registering a resource name for identifying a resource and an attribute of the resource identified by this resource name.

As illustrated in FIG. 3A and FIG. 3B, in this embodiment, the initial attribute of the resource is a "resource name", a "maximum capacity", and a "minimum use interval".

The "resource name" means the name of a resource as a registration target. In this embodiment, for example, a text of the resource name can be inputted in a column where characters of "resource name" are displayed.

The "maximum capacity" means the maximum capacity of the resource as the registration target. In this embodiment, for example, the value (numeral) of the number [number/min] which can be processed per unit time by the resource can be inputted as a maximum capacity in the field where characters of "maximum capacity" are displayed.

The "minimum use interval" means a time which has to be ensured after use of the resource as the registration target is finished. In this embodiment, for example, in the column where characters of "minimum use interval" are displayed, the value (numeral) of this time [min] can be inputted as a minimum use interval.

In the second line of the resource registration screen 300 illustrated in FIG. 3C, there is illustrated a state that resource information indicating that the "resource name" is "machine 1", the "maximum capacity" is "1 [number/min]", the "minimum use interval" is "0.3 [min]", and the "availability start date" is "10 Dec. 2011" in inputted.

When the user operates the input device to press down the add button 303 in a state that a specific line or column of the resource input field 301 of the resource registration screen 300 is specified, a line or a column is added next to the specified line or column.

For example, when the add button 303 is pressed down in a state that the column where the "minimum use interval" is displayed in the resource input field 301 illustrated in FIG. 3B is specified, one blank column is added next to the column where the "minimum use interval" is displayed. In the resource registration screen 300 illustrated in FIG. 3C, a state that the "availability start date" is added as an attribute of the resource in this column is illustrated.

The "availability start date" means the first date when the resource as the target of registration becomes available. In the resource registration screen 300 of this embodiment, for example, in the column where characters of "availability start date" are displayed, the values (numerals) of this date can be inputted as the availability start date (see FIG. 3C).

First, when the add button 303 is pressed down in a state that the columns where the "resource name" and the "maximum capacity" are displayed are specified, one blank column is added each between the "resource name" and the "maximum capacity" and between the "maximum capacity" and the "minimum use interval".

In this manner, attributes of the resource can be added.

Further, when the add button 303 is pressed down in a state that the line where the "machine 1" is displayed is specified, one blank column is added between the "machine 1" and the "machine 2". Similarly, when the add button 303 is pressed down in a state that the line where "machine L" is displayed is specified, one blank column is added next to the line where the "machine L" is displayed. In this manner, (an item of) the resource can be added.

Further, when the user operates the input device to press down the delete button 304 in a state that a certain line or column is specified in the resource input field 301 of the resource registration screen 300, the specified line or column is deleted.

For example, when the delete button 304 is pressed down in a state that the column where the "availability start date" is displayed in the resource input field 301 illustrated in FIG. 3C is specified, the column where the "availability start date" is displayed is deleted. In this manner, an attribute of the resource can be deleted. However, in this embodiment, deleting the initial attributes ("maximum capacity" and "minimum use interval") is not allowed. Note that of course it may also be structured to allow deleting the initial attributes.

Further, for example, when the delete button 304 is pressed down in a state that the column where the "machine L" is displayed in the resource input field 301 illustrated in FIG. 3C is specified, the column where the "machine L" is displayed is deleted. In this manner, (an item) of the resource can be deleted. However, in this embodiment, deleting the input field (blank field of FIG. 3A) which is displayed in the initial state is not allowed.

As described above, when the input operation to the resource input field 301 of the resource registration screen 300 is finished, and the register button 302 is pressed down by the user operating the input device, the resource input registration unit 101 stores in a storage medium the contents inputted in the resource input field 301 when the register button 302 is pressed down.

The "maximum capacity" and the "minimum use interval" which are attributes of the resource registered in this manner are set automatically as constants in a constraint expression which will be described later (see expression (4) and expression (10)). Further, the "availability start date" is set automatically as a constant in an objective function which will be described later (see expression (11)).

The resource input registration unit 101 is realized by that, for example, the CPU generates display data for displaying the resource registration screen 300 according to the contents of the input operation by the user and outputs them to the display device, and stores the resource information in the HDD or the like.

(Product Class Input Registration Unit 102)

A product class input registration unit 102 first displays a product class registration screen on the display device.

Figure 4A:
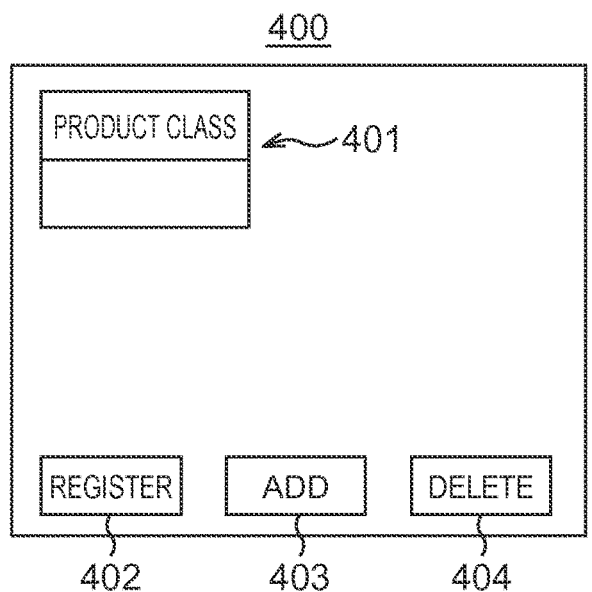
FIG. 4A is a diagram illustrating an example of an initial state of a product class registration screen.
Figure 4B:
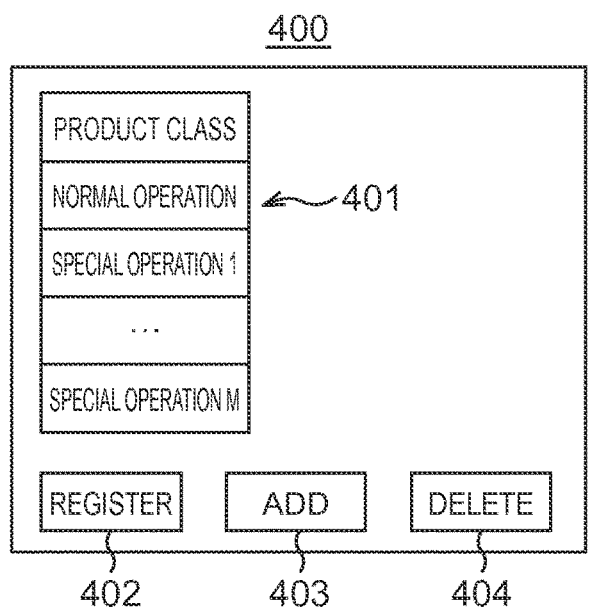
FIG. 4B is a diagram illustrating an example of the product class registration screen to which product class information is inputted.

FIG. 4 are diagrams illustrating an example of a product class registration screen 400. Specifically, FIG. 4A is a diagram illustrating an example of an initial state of the product class registration screen 400. FIG. 4B is a diagram illustrating an example of the product class registration screen 400 to which product class information is inputted.

In FIG. 4, the product class registration screen 400 is a GUI and has a product class input field 401, a register button 402, an add button 403, and a delete button 404.

The product class registration screen 400 is a screen for registering a name of product class. FIG. 4B illustrates a state that "normal operation", "special operation 1", . . . , "special operation M" are inputted as names of "product class".

In the product class registration screen 400 of this embodiment, for example, texts of names of product class can be inputted in the column where characters of "product class" are displayed.

When the user operates the input device to press down the add button 403 in a state that a certain line of the product class input field 401 of the product class registration screen 400 is specified, one blank line is added next to the specified line. In this manner, the product class can be added.

Further, when the user operates the input device to press down the delete button 404 in a state that a certain line of the product class input field 401 of the product class registration screen 400 is specified, the specified one line is deleted. In this manner, the product class can be deleted.

As described above, when the input operation to the product class input field 401 of the product class registration screen 400 is finished, and the register button 402 is pressed down by the user operating the input device, the product class input registration unit 102 stores the contents inputted in the product class input field 401 in the storage medium when the register button 402 is pressed down. Note that at this point, the product class information is not mutually associated with other information.

The product class input registration unit 102 is realized by that, for example, the CPU generates display data for displaying the product class registration screen 400 according to the contents of the input operation by the user and outputs them to the display device, and stores the product class information in the HDD or the like.

(Process Input Registration Unit 103)

A process input registration unit 103 first displays a process registration screen on the display device.

Figure 5A:
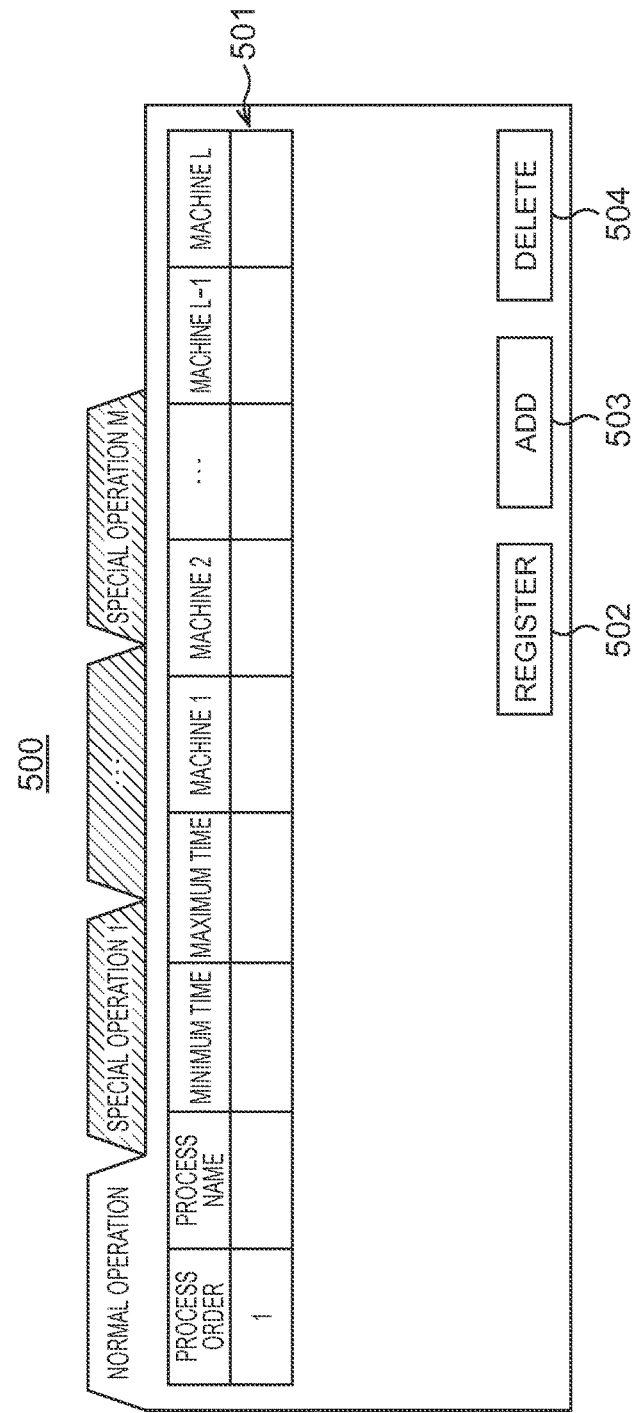
FIG. 5A is a diagram illustrating an example of an initial state of a process registration screen.
Figure 5B:
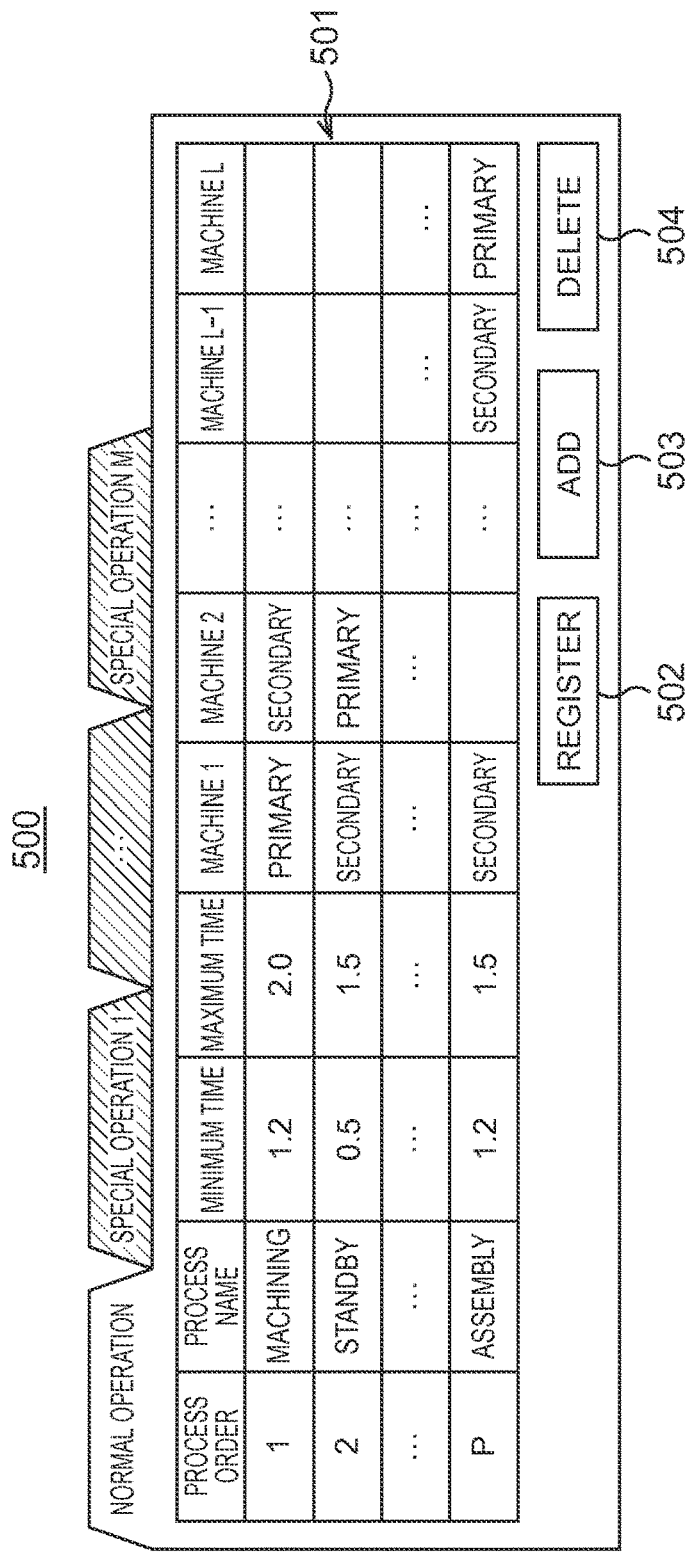
FIG. 5B is a diagram illustrating an example of the process registration screen to which process information related to processes executed by a product class named "normal operation" is inputted.
Figure 5C:
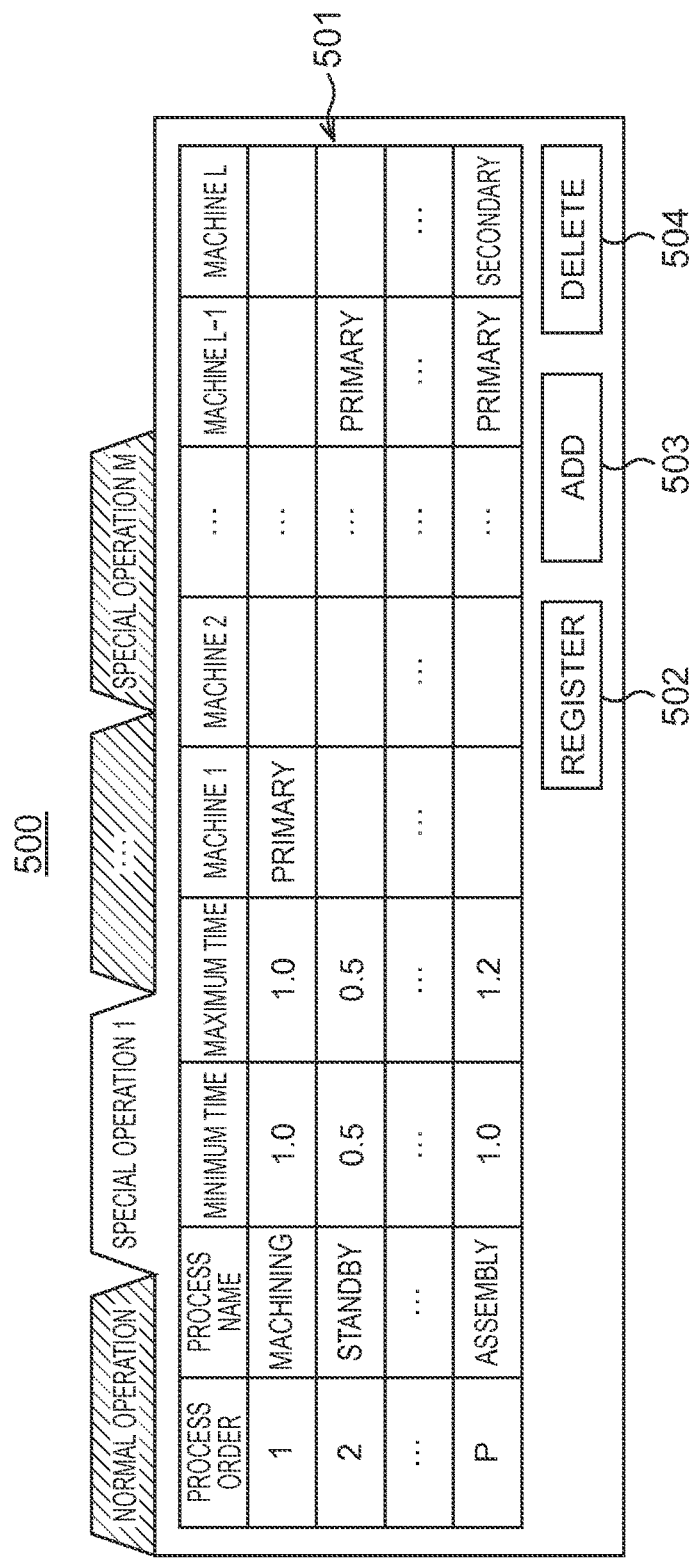
FIG. 5C is the process registration screen to which process information related to processes executed in a product class named "special operation 1" is inputted.

FIG. 5 are diagrams illustrating an example of a process registration screen 500. Specifically, FIG. 5A is a diagram illustrating an example of an initial state of the process registration screen 500. FIG. 5B is a diagram illustrating an example of the process registration screen 500 to which process information related to processes executed by a product class named "normal operation" is inputted. FIG. 5C is the process registration screen 500 to which process information related to processes executed in a product class named "special operation 1" is inputted.

In FIG. 5, the process registration screen 500 is a GUI and has a process input field 501, a register button 502, an add button 503, and a delete button 504.

The process registration screen 500 is a screen for registering attributes of processes for every product class.

In the process registration screen 500 of this embodiment, the name of "product class" registered in the product class input registration unit 102 is displayed on a tab of each process registration screen 500. Among the tabs displayed on the process registration screen 500 of FIG. 5A to FIG. 5C, an input operation to a non-hatched tab is effective. For example, when the user operates the input device to press down the "tab on which characters of 'special operation 1' are displayed" of the process registration screen 500 illustrated in FIG. 5A, FIG. 5B, the process registration screen 500 illustrated in FIG. 5C is displayed. Then, in this embodiment, by inputting and registering process information as follows in each process registration screen 500, the process information related to processes executed for each product class are registered. The contents of the process registration screen 500 will be described below.

As illustrated in FIG. 5A to FIG. 5C, in this embodiment, initial attributes of a process are "processing order", "process name", "minimum time", "maximum time", and "'machine 1', 'machine 2', 'machine L-1', 'machine L'".

The "process order" means the order of executing this process for the product class to which the process as a registration target belongs. In this embodiment, "1" is automatically displayed in the first input field of the "process order". Thereafter, an integer is automatically assigned (displayed) sequentially in ascending order from an upper line.

The "process name" means a name of the process as the registration target. In this embodiment, for example, texts of the process name can be inputted in a column where characters of "process name" are displayed.

"Minimum time" indicates a minimum value [hour] of a time period allowed for a raw material, an intermediate product, and a product to stay in the process of the registration target. In this embodiment, for example, in the column where characters of "minimum time" are displayed, this value (numeral) can be inputted as the minimum time.

"Maximum time" indicates a maximum value [hour] of a time period allowed for a raw material, an intermediate product, and a product to stay in the process of the registration target. In this embodiment, for example, in the column where characters of "maximum time" are displayed, this value (numeral) can be inputted as the maximum time.

"'machine 1', 'machine 2', . . . 'machine L-1', 'machine L'" indicates resource names registered by the resource input registration unit 101 (see FIG. 3). In this embodiment, for example, in the columns where characters of "'machine 1', 'machine 2', 'machine L-1', 'machine L'" are displayed, any of "primary", "secondary", or "blank" can be selectively inputted. This selective input can be realized by performing a pull-down menu display for example. Here, the "primary" indicates a primary resource used in the process as the registration target. The "secondary" indicates that a secondary resource used in the process as the registration target. The "blank" means that the resource of this "resource name ("machine 1", "machine 2", . . . "machine L-1", "machine L")" being blank is not used in the process as the registration target.

The bottom line of the process registration screen 500 illustrated in FIG. 5C indicates a state that process information is inputted indicating that, among processes used in the product class named "special operation 1", the "process name" of the process whose "process order" is "P"-th is "assembly", and the "minimum time" of this process is "1.0 [hour]", and the "maximum time" of this process is "1.2 [hour]", and that resources to be used in this process are "machine L-1" and "machine L", the "machine L-1" is used as a primary resource, and the "machine L" is used as a secondary resource.

When the user operates the input device to press down the add button 503 in a state that a certain line or column of a process input field 501 of the process registration screen 500 is specified, a line or a column is added next to the specified line or column. Thus, an attribute of the process can be added or the number of processes can be added.

Further, when the user operates the input device to press down the delete button 504 in a state that a certain line or column is specified in the process input field 501 of the process registration screen 500, the specified line or column is deleted. Thus, an attribute of the process can be deleted or the number of processes can be deleted. However, in this embodiment, deleting the initial attributes and input field (field of the resource name ("machine 1", "machine 2", . . . "machine L-1", "machine L")) of resource is not allowed. Note that of course it may also be structured to allow deleting the initial attributes.

Note that these methods of adding and deleting a line or a column are the same as the methods described for the resource registration screen 300 illustrated in FIG. 3, and thus the detailed description thereof is omitted here.

As described above, when the input operation to the process input field 501 for all the product classes of the process registration screen 500 is finished, and the register button 502 is pressed down by the user operating the input device, the process input registration unit 103 stores the contents inputted regarding each product class in the process input field 501 in the storage medium when the register button 502 is pressed down. For example, the process input registration unit 103 stores information in which "'process order', 'processing amount', 'minimum time', 'maximum time', and 'resource (machine 1, machine 2, . . . machine L)'" registered in respective lines of the process input field 501 are mutually associated as product order information.

As described above, by using this process registration screen 500, the product class and the resources are mutually associated via the process (see FIG. 2).

The process input registration unit 103 is realized by that, for example, the CPU generates display data for displaying the process registration screen 500 according to the contents of the input operation by the user and outputs them to the display device, and stores the resource information in the HDD or the like.

(Product Order Input Registration Unit 104)

A product order input registration unit 104 first displays a product order registration screen on the display device.

FIG. 6 are diagrams illustrating an example of a product order registration screen 600. Specifically, FIG. 6A is a diagram illustrating an example of an initial state of the product order registration screen 600. FIG. 6B is a diagram illustrating an example of the product order registration screen 600 to which product order information is inputted.

In FIG. 6, the product order registration screen 600 is a GUI and has a product order input field 601, a register button 602, an add button 603, and a delete button 604.

The product order registration screen 600 is a screen for registering attributes of each product order.

As illustrated in FIG. 6, in this embodiment, initial attributes of the product order are "order number", "name", "lot", "product class", "delivery date", and "delivery delay tolerance".

The "order number" is an identification number of a product order as a target of registration. In this embodiment, in the first input field of the "order number" of the product order input field 601, "00001" is automatically displayed. Thereafter, an integer is automatically assigned (displayed) sequentially in ascending order from an upper line.

The "name" means the name of the product order as the target of registration. In this embodiment, for example, in the column where characters of "name" are displayed in the product order input field 601, texts of the name of the product order can be inputted.

The "lot" means identification information of a lot to which the product order as the target of registration belongs. In this embodiment, for example, in the column where characters of "lot" are displayed in the product order input field 601, numerals and alphabets can be inputted as this identification information.

The "product class" means the names of "product class" registered in the product class input registration unit 102 (see FIG. 4). In this embodiment, for example, in the column where characters of "product class" are displayed in the product order input field 601, one of these names of product class can be selectively inputted. This selective input can be realized by performing a pull-down menu display for example.

The "processing amount" means the amount of a product order as the target of registration. In this embodiment, for example, in the column where characters of "processing amount" are displayed in the product order input field 601, for example, a value (numeral) of this amount [ton] can be inputted as the processing amount.

The "delivery date" means the delivery date of the product order as the target of registration. In this embodiment, for example, in the column where characters of the "delivery date" are displayed in the product order input field 601, this date (numerals) can be inputted as the delivery date. The "delivery delay tolerance" means the number of tolerated days of delay from the delivery date of the product order as the registration target. In this embodiment, for example, in a column where characters of the "delivery delay tolerance" are displayed in the product order input field 601, this date (number) can be inputted as the delivery delay tolerance.

The second line of the product order registration screen 600 illustrated in FIG. 6B indicates a state that product order information is inputted indicating that the "order number" is "00001", the name is "1 for company A", the identification information of the belonging "lot" is "L001", the belonging "product class" is "normal operation", the "processing amount" is "5.0 [ton]", the "delivery date" is "10 Dec. 2011", and the "delivery delay tolerance" is "3 [days]".

When the user operates the input device to press down the add button 603 in a state that a certain line or column is specified in the product order input field 601 of the product order registration screen 600, a line or a column is added next to the specified line or column. Thus, an attribute of the product order can be added or the number of product orders can be added.

Further, when the user operates the input device to press down the delete button 604 in a state that a certain line or column is specified in the product order input field 601 of the product order registration screen 600, the specified line or column is deleted. Thus, an attribute of the product order can be deleted or the number of product orders can be deleted. However, in this embodiment, the initial attributes cannot be deleted. Note that of course it may also be structured to allow deleting the initial attributes.

Note that these methods of adding and deleting a line or a column are the same as the methods described for the resource registration screen 300 illustrated in FIG. 3, and thus the detailed description thereof is omitted here.

As described above, when the input operation to the product order input field 601 in the product order registration screen 600 is finished, and the register button 602 is pressed down by the user operating the input device, the product order input registration unit 104 stores the contents inputted in the product order input field 601 in the storage medium when the register button 602 is pressed down. For example, the product order input registration unit 104 stores information in which "'order number', 'name', 'lot', 'product class', 'delivery date', and 'delivery delay tolerance'" registered in respective lines of the product order input field 601 are mutually associated as the product order information.

The product order input registration unit 104 is realized by that, for example, the CPU generates display data for displaying the product order registration screen 600 according to the contents of the input operation by the user and outputs them to the display device, and stores the product order information in the HDD or the like.

As described above, by using this product order registration screen 600, the product order and the product class are mutually associated (see FIG. 2). As already described, by using the process registration screen 500, the product class and the resources are mutually associated via the process. Therefore, the process and the product order are mutually associated via the product class. Therefore, the resources, the product class, the process, and the product order are registered in a mutually associated manner.

(Variable/Constant Construction Unit 105)

A variable/constant construction unit 105 automatically constructs variables and constants used when an objective function and a constraint expression are formulated according to the mathematical programming.

In this embodiment, variables described in following (a) to (c) are constructed as decision variables.

(a) Start time$_{order\ number,\ process\ name,\ resource\ name}$, end time$_{order\ number,\ process\ name,\ resource\ name}$ (b) Availability$_{order\ number,\ process\ name,\ resource\ name}$ (c) Prior and subsequent judgment$_{order\ number,\ order\ number,\ process\ name,\ resource\ name}$ The start time$_{order\ number,\ process\ name,\ resource\ name}$ and end time$_{order\ number,\ process\ name,\ resource\ name}$ are a start time and an end time of each order number/each process name/each resource name.

The availability$_{order\ umber,\ process\ name,\ resource\ name}$ is a 0-1 variable. When the value of the availability$_{order\ number,\ process\ name,\ resource\ name}$ is "1", it indicates that the resource of "resource name" is used when the process of "process name" is executed with respect to the product order of "order number", and when it is "0", it indicates that such a resource is not used.

The prior and subsequent judgment$_{order\ number\ 1,\ order\ number\ 2,\ process\ name,\ resource\ name}$ is a 0-1 variable. When the value of the prior and subsequent judgment$_{order\ number\ 1,\ order\ number\ 2,\ process\ name,\ resource\ name}$ is "1", it indicates that in the process of "process name", the resource of "resource name" is used with respect to the product order of "order number 1" before the product order of "order number 2". On the other hand, when this value is "0", in the process of "process name", the resource of "resource name" is used with respect to the product order of "order number 1" after the product order of "order number 2". Note that when it is decided in advance which of the two product orders is desired to be executed first, a constraint to set the value of the "prior and subsequent judgment$_{order\ number,\ order\ number,\ process\ name,\ resource\ name}$" corresponding to these two product orders to "0" or "1" can be provided.

Here, an example of a construction method of the variable (start time$_{order\ number,\ process\ name,\ resource\ name}$, end time$_{order\ number,\ process\ name,\ resource\ name}$) of (a) will be described here.

First, the variable/constant construction unit 105 extracts the "product class" from the "product order information of each order number" registered in the product order input registration unit 104 (see FIG. 6), and extracts process information belonging to the extracted "product class" from the process information registered in the process input registration unit 103 (see FIG. 5).

Next, based on the results of extraction as above, the variable/constant construction unit 105 constructs as decision variables a start time and an end time of each "order number" of the product order, each "process name" registered in association with this order number, and each "resource name" registered as the primary resource and the secondary resource in association with this order number.

In this embodiment, for example, the following decision variables are constructed.

Start time$_{00001,\ machining,\ machine\ 1}$, end time$_{00001,\ machining,\ machine\ 1}$
Start time$_{00001,\ machining,\ machine\ 2}$, end time$_{00001,\ machining,\ machine\ 2}$
Start time$_{00001,\ standby,\ machine\ 1}$, end time$_{00001,\ standby,\ machine\ 1}$
Start time$_{00001,\ standby,\ machine\ 2}$, end time$_{00001,\ standby,\ machine\ 2}$
. . .
Start time$_{00001,\ assembly,\ machine\ 1}$, end time$_{00001,\ assembly,\ machine\ 1}$
Start time$_{00001,\ assembly,\ machine\ L-1}$, end time$_{00001,\ assembly,\ machine\ L-1}$
Start time$_{00001,\ assembly,\ machine\ L}$, end time$_{00001,\ assembly,\ machine\ L}$
Start time$_{00002,\ machining,\ machine\ 1}$, end time$_{00002,\ machining,\ machine\ 1}$
Start time$_{00002,\ machining,\ machine\ 2}$, end time$_{00002,\ machining,\ machine\ 2}$
Start time$_{00002,\ standby,\ machine\ 2}$, end time$_{00002,\ standby,\ machine\ 2}$
Start time$_{00002,\ standby,\ machine\ 2}$, end time$_{00002,\ standby,\ machine\ 2}$
. . .
Start time$_{00002,\ assembly,\ machine\ 1}$, end time$_{00002,\ assembly,\ machine\ 1}$
Start time$_{00002,\ assembly,\ machine\ L-1}$, end time$_{00002,\ assembly,\ machine\ L-1}$
Start time$_{00002,\ assembly,\ machine\ L}$, end time$_{00002,\ assembly,\ machine\ L}$
. . .
Start time$_{0000N,\ machining,\ machine\ 1}$, end time$_{0000N,\ machining,\ machine\ 1}$
Start time$_{0000N,\ standby,\ machine\ L-1}$, end time$_{0000N,\ standby,\ machine\ L-1}$
. . .
Start time$_{0000N,\ assembly,\ machine\ L-1}$, end time$_{0000N,\ assembly,\ machine\ L-1}$
Start time$_{0000N,\ assembly,\ machine\ L}$, end time$_{0000N,\ assembly,\ machine\ L}$ An example of a construction method of the variable (availability$_{order\ number,\ process\ name,\ resource\ name}$) of (b) will be described.

First, the variable/constant construction unit 105 extracts the "product class" from the "product order information of each order number" registered in the product order input registration unit 104 (see FIG. 6), and extracts process information belonging to the extracted "product class" from the process information registered in the process input registration unit 103 (see FIG. 5).

Next, based on the results of extraction as above, the variable/constant construction unit 105 constructs as decision variables availability of each "order number" of the product order, each "process name" registered in association with this order number, and each "resource name" registered as the primary resource and the secondary resource in association with this order number.

In this embodiment, for example, the following decision variables are constructed.

Availability$_{00001,\ machining,\ machine\ 1}$
Availability$_{00001,\ machining,\ machine\ 2}$
Availability$_{00001,\ standby,\ machine\ 1}$
Availability$_{00001,\ standby,\ machine\ 2}$
. . .
Availability$_{00001,\ assembly,\ machine\ 1}$
Availability$_{00001,\ assembly,\ machine\ L-1}$
Availability$_{00001,\ assembly,\ machine\ L}$
Availability$_{00002,\ machining,\ machine\ 1}$
Availability$_{00002,\ machining,\ machine\ 2}$
Availability$_{00001,\ standby,\ machine\ 2}$
Availability$_{00002,\ standby,\ machine\ 2}$
. . .
Availability$_{00002,\ assembly,\ machine\ 1}$
Availability$_{00002,\ assembly,\ machine\ L-1}$
Availability$_{00002,\ assembly,}$ machine L
. . .
Availability$_{0000N,\ machining,\ machine\ 1}$
Availability$_{0000N,\ standby,\ machine\ L-1}$
. . .
Availability$_{0000N,\ assembly,\ machine\ L-1}$
Availability$_{0000N,\ assembly,\ machine\ L}$ Next, an example of a construction method of the variable (prior and subsequent judgment$_{order\ number,\ order\ number,\ process\ name,\ resource\ name}$) of (c) will be described.

First, the variable/constant construction unit 105 extracts the "product class" from the "product order information of each order number" registered in the product order input registration unit 104 (see FIG. 6), and extracts process information belonging to the extracted "product class" from the process information registered in the process input registration unit 103 (see FIG. 5).

Next, based on the results of extraction as above, the variable/constant construction unit 105 constructs as decision variables prior and subsequent judgment of each "order number" of two different product orders, each "process name" registered in association with this order number, and each "resource name" registered as the primary resource and the secondary resource in association with this order number.

In this embodiment, for example, the following decision variables are constructed.

Prior and subsequent judgment$_{00001,00002,\ machining,\ machine\ 1}$
Prior and subsequent judgment$_{00001,00002,\ machining,\ machine\ 2}$
Prior and subsequent judgment$_{00001,00002,\ standby,\ machine\ 1}$
Prior and subsequent judgment$_{00001,00002,\ standby,\ machine\ 2}$
. . .
Prior and subsequent judgment$_{00001,00002,\ assembly,\ machine\ 1}$
Prior and subsequent judgment$_{00001,00002,\ assembly,\ machine\ L-1}$
Prior and subsequent judgment$_{00001,00002,\ assembly,\ machine\ L}$
. . .
Prior and subsequent judgment$_{00001,0000N,\ machining,\ machine\ 1}$
Prior and subsequent judgment$_{00001,0000N,\ machining,\ machine\ 2}$
Prior and subsequent judgment$_{00001,0000N,\ standby,\ machine\ 1}$ Prior and subsequent judgment$_{00001, 0000N, \text{standby, machine 2}}$
...
Prior and subsequent judgment$_{00001, 0000N, \text{assembly, machine 1}}$
Prior and subsequent judgment$_{00001, 0000N, \text{assembly, machine L-1}}$
Prior and subsequent judgment$_{00001, 0000N, \text{assembly, machine L}}$
...
Prior and subsequent judgment$_{0000(N-1), 0000N, \text{machining, machine 1}}$
Prior and subsequent judgment$_{0000(N-1), 0000N, \text{machining, machine 2}}$
Prior and subsequent judgment$_{0000(N-1), 0000N, \text{standby, machine 1}}$
Prior and subsequent judgment$_{0000(N-1), 0000N, \text{standby, machine 2}}$
...
Prior and subsequent judgment$_{0000(N-1), 0000N, \text{assembly, machine 1}}$
Prior and subsequent judgment$_{0000(N-1), 0000N, \text{assembly, machine L-1}}$
Prior and subsequent judgment$_{0000(N-1), 0000N, \text{assembly, machine L}}$ After finishing construction of decision variables as above, the variable/constant construction unit 105 automatically constructs as constants newly registered attributes as attributes of resource, product class, process, and product order.

In the example illustrated in FIG. 3B, as an attribute of resource, an "availability start date" is newly set. Then, the variable/constant construction unit 105 constructs constants described in (c) below.

(c) Availability start date$_{\text{resource name}}$

The availability start date$_{\text{resource name}}$ is an availability start date of each resource name.

In this embodiment, for example, following variables are constructed.

Availability start date$_{\text{machine 1}}$=2011/12/10
Availability start date$_{\text{machine 2}}$=2011/12/7
...
Availability start date$_{\text{machine L}}$=2011/12/12

The variable/constant construction unit 105 is realized by that, for example, the CPU reads the product order information and the process information from the HDD or the like and creates the above-described variables and constants, and stores the data thereof in the RAM or the like.

(Constraint Condition Input Setting Unit 106)

In this embodiment, as will be described later, the constraint expression obtained by formulating the constraint described using at least one of "product class, process, and resource" according to the mathematical programming is used.

Accordingly, the constraint condition input setting unit 106 displays a constraint setting screen displaying at least the contents of the constraint expression, which describes the contents of this constraint by using at least one selection input field of the identification information of "product class, process, and resource" which are mutually associated as described above. Then, the constraint condition input setting unit 106 sets the contents of constraint based on results selectively inputted by the user to the selection input field of this constraint setting screen. In this embodiment, following constraint conditions (A) to (G) are set. An example of constraint conditions registered in the constraint condition input setting unit 106 will be described below.

(A) Resource Simultaneous Use Constraint

Figure 7A:
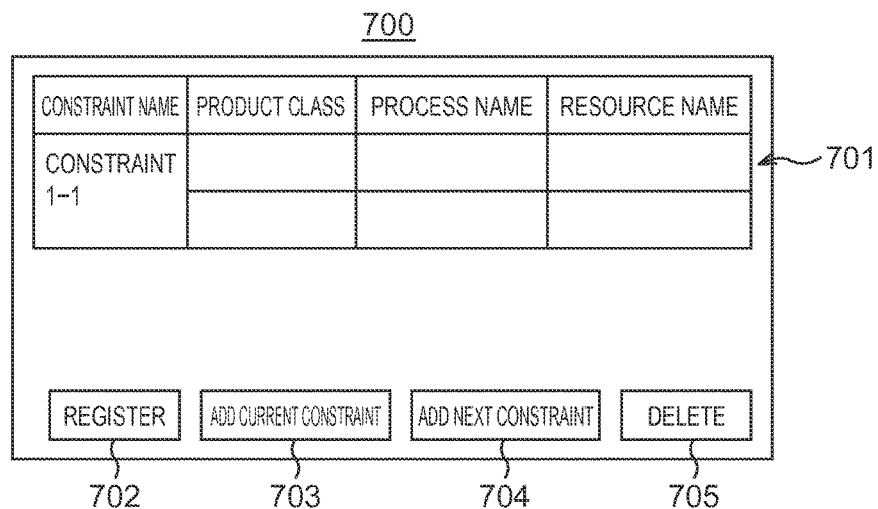
FIG. 7A is a diagram illustrating an example of an initial state of a resource simultaneous use constraint setting screen.
Figure 7B:
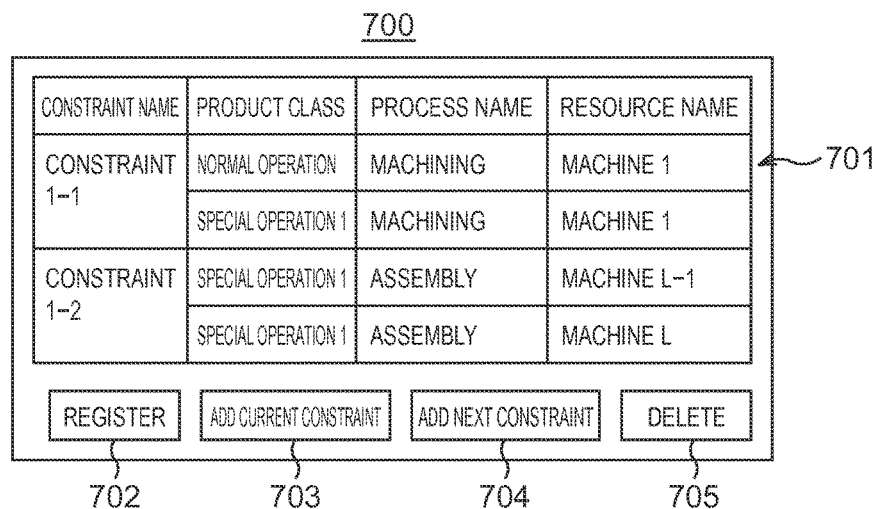
FIG. 7B is a diagram illustrating an example of the resource simultaneous use constraint setting screen to which information of resource simultaneous use constraint is inputted.

The constraint condition input setting unit 106 displays a resource simultaneous use constraint setting screen 700 illustrated in FIG. 7 on the display device. FIG. 7A is a diagram illustrating an example of an initial state of the resource simultaneous use constraint setting screen 700. FIG. 7B is a diagram illustrating an example of the resource simultaneous use constraint setting screen 700 to which information of resource simultaneous use constraint is inputted.

In FIG. 7, the resource simultaneous use constraint setting screen 700 is a GUI and has a constraint condition input field 701, a register button 702, an add current constraint button 703, an add next constraint button 704, and a delete button 705.

In the constraint condition input field 701 illustrated in FIG. 7, there are provided input fields of "product class" for identifying plural product classes belonging to one resource simultaneous use constraint identified by "constraint name" ("constraint 1-$\mathsf{X}$")", "process name" for identifying a process which each "product class" passes, and "resource name" for identifying a resource used in the process which each "product class" passes.

By inputs to this constraint condition input field 701, a resource simultaneous use constraint ("constraint name" ("constraint 1-*")") can be registered which indicates that "resource (resource name)" used when a certain "product class" passes a certain "process (process name)" and "resource (resource name)" used when another one or more "product classes" pass a certain "process (process name)" cannot be used in a same period (temporally overlapping period). Details of respective fields will be described below.

The "constraint name" displayed on the constraint condition input field 701 is identification information of the resource simultaneous use constraint. In this embodiment, in the first input field of the "constraint name", "constraint 1-1" is automatically displayed. Thereafter, an integer is automatically assigned (displayed) sequentially to the part of in the term "constraint 1-*" in ascending order from an upper line ("constraint 1-1", "constraint 1-2" . . . ).

In columns where characters of "product class", "process name", "resource name" are displayed, any of the "product class" (name), "process name", "resource name" which are registered as described above can be selectively inputted respectively. This selective input can be realized by performing a pull-down menu display for example. However, here, the "process name" and the "resource name" cannot be selectively inputted unless the "product class" is selectively inputted. Then, in the input fields of "process name" and "resource name", only ones registered in mutual association with the selectively inputted "product class" can be inputted selectively. Note that it may also be structured to allow selective input of the "process name" and "resource name" before the "product class". Also in this case, the "'product class', 'process name', 'resource name'" to be selectively inputted are registered in mutual association.

For example, in the process registration screen 500 illustrated in FIG. 5B, when the "process name" used in "normal operation" is "machining", resources whose "resource names" are "machine 1" and "machine 2" are to be used (that is, registered as the primary resource or the secondary resource). In this case, when "normal operation" is selectively inputted as the "product class" of the constraint condition input field 701, and "machining" is selectively inputted as the "process name", a pull-down menu allowing selective input of only one of "machine 1" and "machine 2" as the "resource name" is displayed. Similarly, in the process registration screen 500 illustrated in FIG. 5C, in the process whose "process name" is "machining" used in the "special operation 1", the resource whose "resource name" is "machine 1" is to be used. In this case, when the "special operation 1" is selectively inputted as the "product class" of the constraint condition input field 701, and "machining" is selectively inputted as the "process name", a pull-down menu allowing selective input of only "machine 1" as the "resource name" is displayed.

In the resource simultaneous use constraint setting screen 700 illustrated in FIG. 7B, for example, as the resource simultaneous use constraint named "constraint 1-1", a resource simultaneous use constraint is set which indicates that "machine 1" cannot be used simultaneously for the "machining" in "normal operation" and the "machining" in "special operation 1". Note that in FIG. 7B, the "machine 1" is a resource which can be used simultaneously for plural product orders, and thus the resource simultaneous use constraint can be set.

When the user operates the input device to press down the add current constraint button 703 in a state that a specific line in "constraint 1-*" of the constraint condition input field 701 of the resource simultaneous use constraint setting screen 700 is specified, one blank line is added to a line next to the specified line. For example, by pressing down the add current constraint button 703 once in a state that the second line in the "constraint 1-1" of the constraint condition input field 701 is specified, the number of lines of the selection input field of the "constraint 1-1" is changed from "2" as a current value to "3". In this manner, the forming conditions of the resource simultaneous use constraint can be increased.

Further, when the user operates the input device to press down the add next constraint button 704 in a state that a region of a left end column of the constraint condition input field 701 of the resource simultaneous use constraint setting screen 700 is specified, one blank selection input field is added to a line next to this region. In this manner, the resource simultaneous use constraint can be added.

Further, when the user operates the input device to press down the delete button 705 in a state that a specific line in the "constraint 1-*" of the constraint condition input field 701 of the resource simultaneous use constraint setting screen 700 is specified, the specified line is deleted.

Further, when the user operates the input device to press down the delete button 705 in a state that a region of a second line and thereafter ("constraint 1-*") of the left end column of the constraint condition input field 701 of the resource simultaneous use constraint setting screen 700 is specified, (all of) the selection input fields of the specified region ("constraint 1-*") are deleted. For example, in the state illustrated in FIG. 7B, when the delete button 705 is pressed down in a state that the region of "constraint 1-2" of the left end column is specified, all the selection input fields for the "constraint 1-2" are deleted.

When the input operation to the constraint condition input field 701 of the resource simultaneous use constraint setting screen 700 is thus finished and the user operates the input device to press down the register button 702, the constraint condition input setting unit 106 stores in the storage medium the contents inputted to the constraint condition input field 701 when the register button 702 is pressed down.

(B) Resource Use Pattern Constraint

The constraint condition input setting unit 106 displays a resource use pattern constraint setting screen 800 illustrated in FIG. 8A on the display device. FIG. 8A is a diagram illustrating an example of an initial state of the resource use pattern constraint setting screen 800. FIG. 8B is a diagram illustrating an example of the resource use pattern constraint setting screen 800 to which information of resource use pattern constraint is inputted.

In FIG. 8, the resource use pattern constraint setting screen 800 is a GUI and has a constraint condition input field 801, a register button 802, an add current constraint button 803, an add next constraint button 804, and a delete button 805.

In the constraint condition input field 801 illustrated in FIG. 8, there are provided input fields of "product class" for identifying a product class belonging to the resource use pattern constraint identified by "constraint name ("constraint 2-*")", "process name" and "resource name" for identifying the "process" and "resource" corresponding to "condition" in this "product class", and "process name" and "resource name" for identifying the "process" and "resource" corresponding to a "result" with respect to this "condition.

By an input to this constraint condition input field 801, a resource use pattern constraint ("constraint name ("constraint 2-*")") can be registered which indicates that, when there is a "condition" that a certain "resource (resource name)" is used when passing through a certain "process (process name)" in a certain "product class", a "result" should be obtained which indicates that a specific "resource (resource name)" should be used when this "product class" passes through a specific "process (process name)". Details of respective fields will be described below.

The "constraint name" displayed on the constraint condition input field 801 is identification information of the resource use pattern constraint. In this embodiment, in the first input field of the "constraint name", "constraint 2-1" is automatically displayed. Thereafter, an integer is automatically assigned (displayed) sequentially to the part of * in the term "constraint 2-*" in ascending order from an upper line ("constraint 2-1", "constraint 2-2" . . . ).

In columns where characters of "product class", "process name", "resource name" are displayed, any of the "product class" (name), "process name", "resource name" which are registered as described above can be selectively inputted respectively. This selective input can be realized by performing a pull-down menu display for example. However, here, the "process name" and the "resource name" cannot be selectively inputted unless the "product class" is selectively inputted. Then, in the input fields of "process name" and "resource name", only ones registered in mutual association with the selectively inputted "product class" can be inputted selectively. Note that it may also be structured to allow selective input of the "process name" and "resource name" before the "product class". Also in this case, the "'product class', 'process name', 'resource name'" to be selectively inputted are registered in mutual association.

In the resource use pattern constraint setting screen 800 illustrated in FIG. 8B, when "machine 1" is used for "machining" in "normal operation" as the resource use pattern constraint named "constraint 2-1", the resource use pattern constraint indicating that the "machine 1" should be used for "standby" and "assembly" in the "normal operation" is set.

When the user operates the input device to press down the add current constraint button 803 in a state that a certain line in the "constraint 2-*" of the constraint condition input field 801 of the resource use pattern constraint setting screen 800 is specified, one blank line is added to a line next to the specified line. In this manner, the forming conditions of the resource use pattern constraint can be increased.

Further, when the user operates the input device to press down the add next constraint button 804 in a state that a region of a left end column of the constraint condition input field 801 of the resource use pattern constraint setting screen 800 is specified, one blank selection input field is added to a line next to this region. In this manner, the resource use pattern constraint can be added.

Further, when the user operates the input device to press down the delete button 805 in a state that a specific line in the "constraint 2-*" of the constraint condition input field 801 of the resource use pattern constraint setting screen 800 is specified, the specified line is deleted.

Further, when the user operates the input device to press down the delete button 805 in a state that a region of a second line and thereafter ("constraint 2-*") of the left end column of the constraint condition input field 801 of the resource use pattern constraint setting screen 800 is specified, (all of) the selection input fields of the specified region ("constraint 2-*") are deleted.

When the input operation to the constraint condition input field 801 of the resource use pattern constraint setting screen 800 is thus finished and the user operates the input device to press down the register button 802, the constraint condition input setting unit 106 stores in the storage medium the contents inputted to the constraint condition input field 801 when the register button 802 is pressed down.

(C) Resource Use Pattern Processing Time Constraint

Figure 9A:
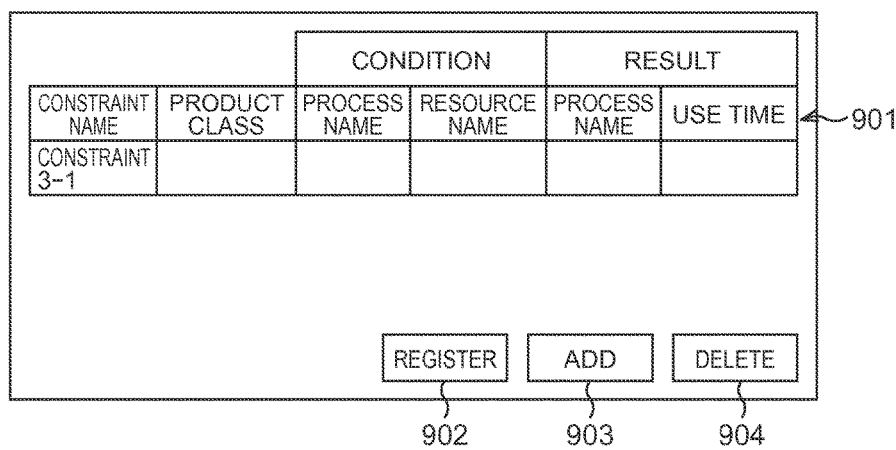
FIG. 9A is a diagram illustrating an example of an initial state of a resource use pattern processing time constraint setting screen.
Figure 9B:
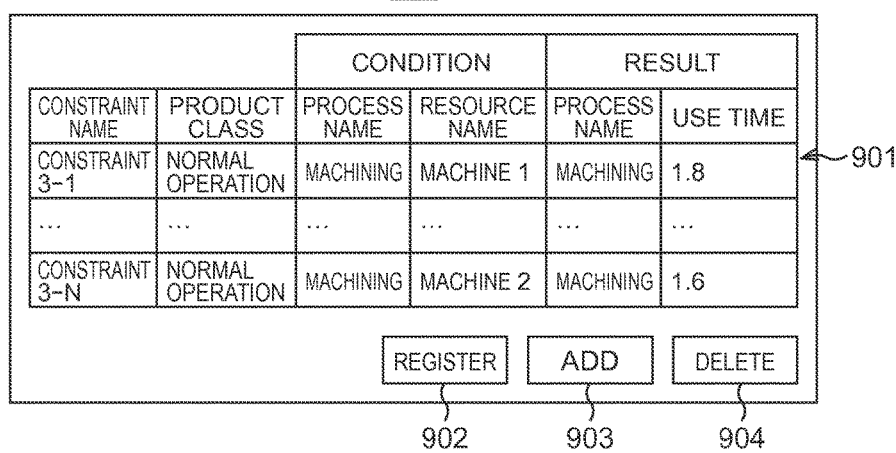
FIG. 9B is a diagram illustrating an example of the resource use pattern processing time constraint setting screen to which information of resource use pattern constraint is inputted.

The constraint condition input setting unit 106 displays a resource use pattern processing time constraint setting screen 900 illustrated in FIG. 9 on the display device. FIG. 9A is a diagram illustrating an example of an initial state of the resource use pattern processing time constraint setting screen 900. FIG. 9B is a diagram illustrating an example of the resource use pattern processing time constraint setting screen 900 to which information of resource use pattern constraint is inputted.

In FIG. 9, the resource use pattern processing time constraint setting screen 900 is a GUI and has a constraint condition input field 901, a register button 902, an add button 903, and a delete button 904.

In the constraint condition input field 901 illustrated in FIG. 9, there are provided input fields of "product class" for identifying a product class belonging to the resource use pattern processing time constraint identified by "constraint name ("constraint 3-*")", "process name" and "resource name" for identifying the "process" and "resource" corresponding to "condition" in this "product class", and "process name" and "use time" for identifying the "process" and "use time" corresponding to a "result" with respect to this "condition.

By an input to this constraint condition input field 901, a resource use pattern processing time constraint ("constraint name ("constraint 3-*")") can be registered which indicates that, when there is a "condition" that a "resource (resource name)" is used when passing through a certain "process (process name)" in a certain "product class", a "result" should be obtained which indicates that a "use time" of a specific "process (process name)" in this "product class" is limited. Details of respective fields will be described below.

The "constraint name" displayed on the constraint condition input field 901 is identification information of the resource use pattern processing time constraint. In this embodiment, in the first input field of the "constraint name", "constraint 3-1" is automatically displayed. Thereafter, an integer is automatically assigned (displayed) sequentially to the part of * in the term "constraint 3-*" in ascending order from an upper line.

In columns where characters of "product class", "process name", "resource name" are displayed, any of the "product class" (name), "process name", "resource name" which are registered as described above can be selectively inputted respectively. This selective input can be realized by performing a pull-down menu display for example. However, here, the "process name" and the "resource name" cannot be selectively inputted unless the "product class" is selectively inputted. Then, in the "process name" and "resource name", only ones registered in mutual association with the selectively inputted "product class" can be inputted selectively. Note that it may also be structured to allow selective input of the "process name" and "resource name" before the "product class". Also in this case, the "'product class', 'process name', 'resource name'" to be selectively inputted are registered in mutual association.

Further, in the column where characters of "use time" are displayed, a value (numeral) of the above-described "use time" can be inputted. Note that the "use time" for a certain "process name" of a certain "product class" is inputted in the range of "minimum time" or more to "maximum time" or less registered with respect to this "process name" of this "product class" (see FIG. 5 regarding the "minimum time", "maximum time").

In the resource use pattern processing time constraint setting screen 900 illustrated in FIG. 9B, when "machine 1" is used for "machining" in "normal operation" as the resource use pattern processing time constraint named "constraint 3-1", the resource use pattern processing time constraint indicating that the "use time" of the "machining" in the "normal operation" should be limited to 1.8 [hour] is set.

When the user operates the input device to press down the add button 903 in a state that a certain line in the constraint condition input field 901 of the resource use pattern processing time constraint setting screen 900 is specified, one blank input field is added to a line next to the specified line. In this manner, the resource use pattern processing time constraint can be increased.

Further, when the user operates the input device to press down the delete button 904 in a state that a specific line of the constraint condition input field 901 of the resource use pattern processing time constraint setting screen 900 is specified, (all of) the input fields of the specified line are deleted.

When the input operation to the constraint condition input field 901 of the resource use pattern processing time constraint setting screen 900 is thus finished and the user operates the input device to press down the register button 902, the constraint condition input setting unit 106 stores in the storage medium the contents inputted to the constraint condition input field 901 when the register button 902 is pressed down.

(D) Same Lot Constraint

Figure 10A:
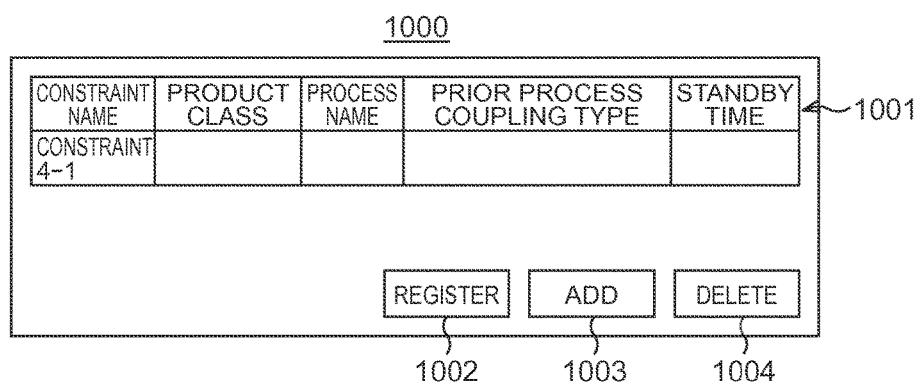
FIG. 10A is a diagram illustrating an example of an initial state of a same lot constraint setting screen.
Figure 10B:
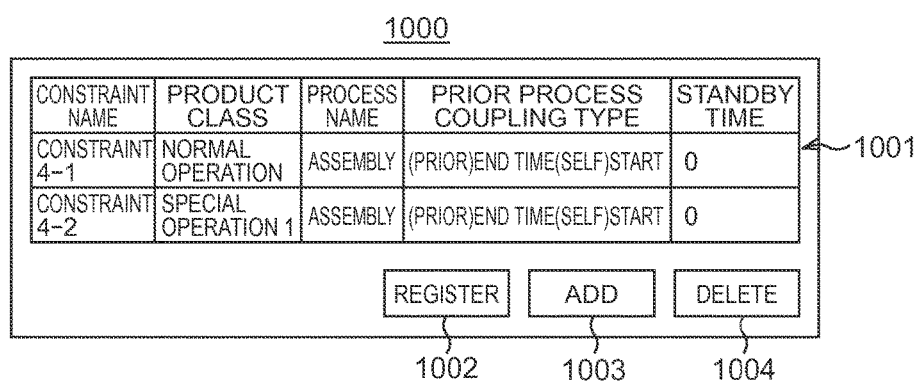
FIG. 10B is a diagram illustrating an example of the same lot constraint setting screen to which information of same lot constraint is inputted.

The constraint condition input setting unit 106 displays a same lot constraint setting screen 1000 illustrated in FIG. 10 on the display device. FIG. 10A is a diagram illustrating an example of an initial state of the same lot constraint setting screen 1000. FIG. 10B is a diagram illustrating an example of the same lot constraint setting screen 1000 to which information of same lot constraint is inputted.

In FIG. 10, the same lot constraint setting screen 1000 is a GUI and has a constraint condition input field 1001, a register button 1002, an add button 1003, and a delete button 1004.

An initial state of the same lot constraint setting screen 1000 is such that input items (region where characters of "constraint name", "product class", "process name", "prior process coupling type", "standby time" are displayed) of the constraint condition input field 1001, a first input field (input field for "constraint 4-1"), the register button 1002, the add button 1003, and the delete button 1004 are displayed. Here, the lot means a set of plural product orders, and manufacturing of product orders is carried out in units of this lot. Product orders of the same product class belong to the same lot.

In the constraint condition input field 1001 illustrated in FIG. 10, there are provided input fields of "product class" for identifying a product class belonging to the same lot constraint identified by "constraint name ("constraint 4-*")", "process name" for identifying a "process" which this "product class" passes, "prior process coupling type" defining a temporally prior and subsequent relation of two product orders belonging to this "product class" when passing through this "process", and "standby time" of a product order passing through this "process" temporally subsequently out of the two product orders.

By inputs to this constraint condition input field 1001, for a product order which passes the "process (process name)" temporally subsequently out of two product orders, which are temporally prior and subsequent, belonging to a certain "product order", a same lot constraint ("constraint name ("constraint 4-*")") which indicates that the product order should pass through this "process (process name)" in the relation indicated by the "prior process coupling type" after waited by the "standby time" can be registered. Details of respective fields will be described below.

The "constraint name" displayed on the constraint condition input field 1001 is identification information of the same lot constraint. In this embodiment, in the first input field of the "constraint name", "constraint 4-1" is automatically displayed. Thereafter, an integer is automatically assigned (displayed) sequentially to the part of * in the term "constraint 4-*" in ascending order from an upper line.

In columns where characters of "product class", "process name" are displayed, any of the "product class" (name), "process name" which are registered as described above, can be selectively inputted respectively. This selective input can be realized by performing a pull-down menu display for example. However, here, the "process name" cannot be selectively inputted unless the "product class" is selectively inputted. Then, in the input field of "process name", only one registered in mutual association with the selectively inputted "product class" can be selectively inputted. Note that it may also be structured to allow selective input of the "process name" before the "product class". Also in this case, the "'product class', 'process name'" to be selectively inputted are registered in mutual association.

The "prior process coupling type" indicates, out of "two 'product orders' in the same lot" executed temporally sequentially in a process inputted in the input field of the "process name", a temporally relation in this process between one for which this process is executed first and one for which this process is executed later. In this embodiment, it is possible to selectively input the "prior process coupling type" among preset ones. This selective input can be realized by performing a pull-down menu display for example. Note that in the following description, the "product order executed later" will be referred to as "self order" as necessary, and the "product order executed first" will be referred to as "prior order" as necessary.

In this embodiment, "(prior) end time (self) start" and "(prior) start time (self) start" are set in advance as the "prior process coupling type". The "(prior) end time (self) start" indicates that "process inputted to the input field of 'process name'" is started for a first raw material/intermediate product/product of the self order after "process inputted to the input field of 'process name'" is finished for a last raw material/intermediate product/product of the prior order. The "(prior) start time (self) start" indicates that "process inputted to the input field of 'process name'" is started for a first raw material/intermediate product/product of the self order after "process inputted to the input field of 'process name'" is started for a first raw material/intermediate product/product of the prior order.

In the column where characters of "standby time" are displayed, a value (numeral) of standby time of the self order with respect to the prior order can be inputted.

In the same lot constraint setting screen 1000 illustrated in FIG. 10B, for example, as the same lot constraint named "constraint 4-1", when the product class belonging to the same lot is "normal operation" and "assembly" is performed in the prior order and the self order belonging to this lot, a same lot constraint is set ("constraint name ("constraint 4-1")") which indicates that "assembly" of the first raw material/intermediate product of the self order is started as soon as "assembly" of the last raw material/intermediate product of the prior order is finished (after 0 [min]). Further, as the same lot constraint named "constraint 4-2", when the product class belonging to the same lot is "special operation 1" and "assembly" is performed in the prior order and the self order belonging to this lot, a same lot constraint is set (("constraint name ("constraint 4-2")")) which indicates that "assembly" of the first raw material/intermediate product of the self order is started as soon as "assembly" of the last raw material/intermediate product of the prior order is finished (after 0 [min]).

When the user operates the input device to press down the add button 1003 in a state that a specific line in "constraint 4-*" of the constraint condition input field 1001 of the same lot constraint setting screen 1000 is specified, one blank line is added to a line next to the specified line. In this manner, the resource use pattern constraint can be added.

Further, when the user operates the input device to press down the delete button 1004 in a state that a specific line of the constraint condition input field 1001 of the same lot constraint setting screen 1000 is specified, (all of) the input fields of the specified line are deleted.

When the input operation to the constraint condition input field 1001 of the same lot constraint setting screen 1000 is thus finished and the user operates the input device to press down the register button 1002, the constraint condition input setting unit 106 stores in the storage medium the contents inputted to the constraint condition input field 1001 when the register button 1002 is pressed down.

(E) Different Lot Constraint

Figure 11A:
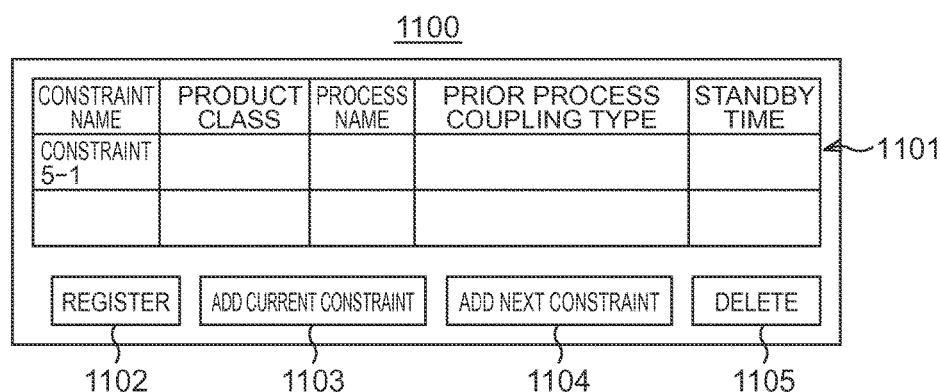
FIG. 11A is a diagram illustrating an example of an initial state of a different lot constraint setting screen.
Figure 11B:
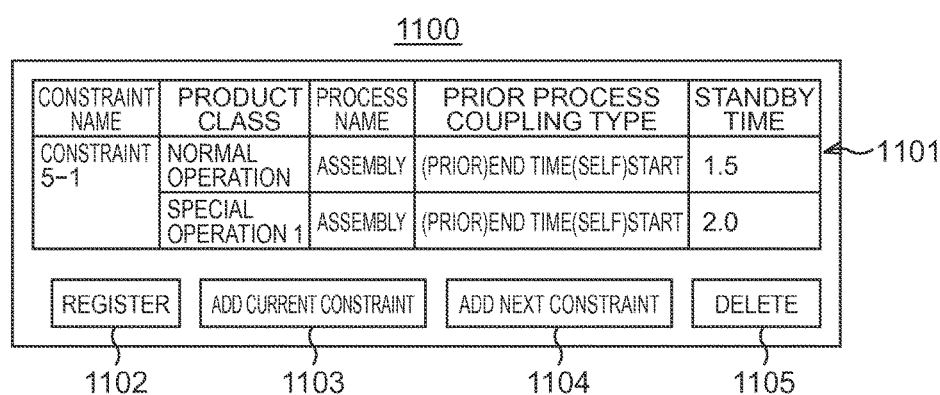
FIG. 11B is a diagram illustrating an example of the different lot constraint setting screen to which information of different lot constraint is inputted.

The constraint condition input setting unit 106 displays a different lot constraint setting screen 1100 illustrated in FIG. 11 on the display device. FIG. 11A is a diagram illustrating an example of an initial state of the different lot constraint setting screen 1100. FIG. 11B is a diagram illustrating an example of the different lot constraint setting screen 1100 to which information of different lot constraint is inputted.

In FIG. 11, the different lot constraint setting screen 1100 is a GUI and has a constraint condition input field 1101, a register button 1102, an add current constraint button 1103, an add next constraint button 1104, and a delete button 1105.

In the constraint condition input field 1101 illustrated in FIG. 11, there are provided input fields of "product class" for identifying plural product classes belonging to the different lot constraint identified by "constraint name ("constraint 5-*")", "process names" for respectively identifying "processes" which these "product classes" pass, "prior process coupling type" defining a temporally prior and subsequent relation of each of two lots belonging to this "product class"

when passing through these "processes", and "standby time" of a lot passing through the "process" temporally subsequently out of the two lots.

By inputs to this constraint condition input field 1101, for a lot which passes the "process (process name)" temporally subsequently out of two lots, which are temporally prior and subsequent, belonging to same or different "product classes", a different lot constraint ("constraint name ("constraint 5-*")") which indicates that the lot should pass through this "process (process name)" in the relation indicated by the "prior process coupling type" after waited by the "standby time" can be registered. Details of respective fields will be described below.

The "constraint name" displayed on the constraint condition input field 1101 is identification information of the different lot constraint. In this embodiment, in the first input field of the "constraint name", "constraint 5-1" is automatically displayed. Thereafter, an integer is automatically assigned (displayed) sequentially to the part of * in the term "constraint 5-*" in ascending order from an upper line.

In columns where characters of "product class", "process name" are displayed, any of the "product class" (name), "process name" which are registered as described above, can be selectively inputted respectively. This selective input can be realized by performing a pull-down menu display for example. However, here, the "process name" cannot be selectively inputted unless the "product class" is selectively inputted. Then, in the input field of "process name", only one registered in mutual association with the selectively inputted "product class" can be selectively inputted. Note that it may also be structured to allow selective input of the "process name" before the "product class". Also in this case, the "'product class', 'process name'" to be selectively inputted are registered in mutual association.

The "prior process coupling type" indicates, out of two lots executed temporally sequentially in a process inputted in the input field of the "process name", a temporally relation in this process between a lot for which this process is executed first and a lot for which this process is executed later. In this embodiment, it is possible to selectively input the "prior process coupling type" among preset ones. This selective input can be realized by performing a pull-down menu display for example. Note that in the following description, the "lot executed later" will be referred to as "self lot" as necessary, and the "lot executed first" will be referred to as "prior lot" as necessary.

In this embodiment, "(prior) end time (self) start" and "(prior) start time (self) start" are set in advance as the "prior process coupling type". The "(prior) end time (self) start" indicates that "process inputted to the input field of 'process name'" is started for a first raw material/intermediate product/product of the self lot after "process inputted to the input field of 'process name'" is finished for a last raw material/intermediate product/product of the prior lot. The "(prior) start time (self) start" indicates that "process inputted to the input field of 'process name'" is started for a first raw material/intermediate product/product of the self lot after "process inputted to the input field of 'process name'" is started for a first raw material/intermediate product/product of the prior lot.

In the column where characters of "standby time" are displayed, a value (numeral) of standby time of the self lot with respect to the prior lot can be inputted.

In the different lot constraint setting screen 1100 illustrated in FIG. 11B, the following first to four different lot constraints are set as a resource use pattern constraint named "constraint 5-1".

First, when the product class to which the prior lot belongs is "normal operation" and the product class to which the self lot belongs is "normal operation", and "assembly" is performed between the prior lot and the self lot, a different lot constraint is set which indicates that "assembly" of the first raw material/intermediate product of the self lot is started at 1.5 [min] after "assembly" of the last raw material/intermediate product of the prior lot is finished.

Second, when the product class to which the prior lot belongs is "normal operation" and the product class to which the self lot belongs is "special operation 1", and "assembly" is performed between the prior lot and the self lot, a different lot constraint is set which indicates that "assembly" of the first raw material/intermediate product of the self lot is started at 2.0 [min] after "assembly" of the last raw material/intermediate product of the prior lot is finished. When the product classes to which the prior lot and the self lot belong are thus different, a value of "standby time" set to the self lot is employed.

Third, when the product class to which the prior lot belongs is "special operation 1" and the product class to which the self lot belongs is "special operation 1", and "assembly" is performed between the prior lot and the self lot, a different lot constraint is set which indicates that "assembly" of the first raw material/intermediate product of the self lot is started at 2.0 [min] after "assembly" of the last raw material/intermediate product of the prior lot is finished.

Fourth, when the product class to which the prior lot belongs is "special operation 1" and the product class to which the self lot belongs is "normal operation", and "assembly" is performed between the prior lot and the self lot, a different lot constraint is set which indicates that "assembly" of the first raw material/intermediate product of the self lot is started at 1.5 [min] after "assembly" of the last raw material/intermediate product of the prior lot is finished.

When the user operates the input device to press down the add current constraint button 1103 in a state that a specific line in "constraint 5-*" of the constraint condition input field 1101 of the different lot constraint setting screen 1100 is specified, one blank line is added to a line next to the specified line. In this manner, the forming conditions of the different lot constraint can be increased.

Further, when the user operates the input device to press down the add next constraint button 1104 in a state that a region of a left end column of the constraint condition input field 1101 of the different lot constraint setting screen 1100 is specified, one blank input field is added to a line next to this region. In this manner, the different lot constraint can be added.

Further, when the user operates the input device to press down the delete button 1105 in a state that a specific line in the "constraint 5-*" of the constraint condition input field 1101 of the different lot constraint setting screen 1100 is specified, the specified line is deleted.

Further, when the user operates the input device to press down the delete button 1105 in a state that a region of a second line and thereafter ("constraint 5-*") of the left end column of the constraint condition input field 1101 of the different lot constraint setting screen 1100 is specified, (all of) the selection input fields of the specified region ("constraint 5-*") are deleted.

When the input operation to the constraint condition input field 1101 of the different lot constraint setting screen 1100 is thus finished and the user operates the input device to press down the register button 1102, the constraint condition input setting unit 106 stores in the storage medium the contents inputted to the constraint condition input field 1101 when the register button 1102 is pressed down.

(F) Resource Operation Constraint

Figure 12A:
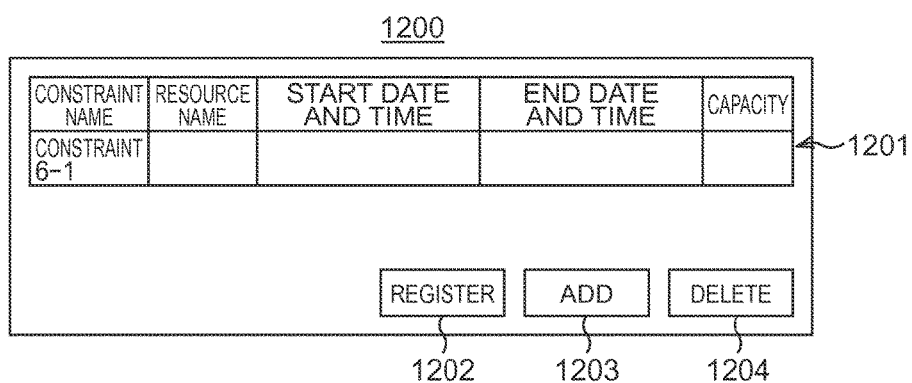
FIG. 12A is a diagram illustrating an example of an initial state of a resource operation constraint setting screen.
Figure 12B:
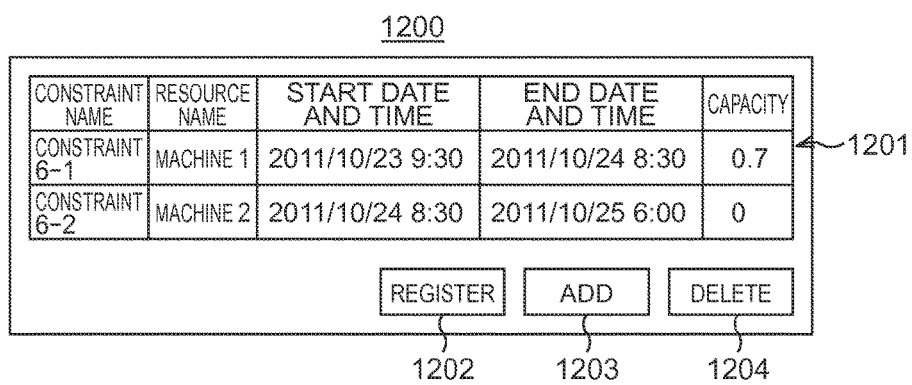
FIG. 12B is a diagram illustrating an example of the resource operation constraint setting screen to which information of resource operation constraint is inputted.

The constraint condition input setting unit 106 displays a resource operation constraint setting screen 1200 illustrated in FIG. 12 on the display device. FIG. 12A is a diagram illustrating an example of an initial state of the resource operation constraint setting screen 1200. FIG. 12B is a diagram illustrating an example of the resource operation constraint setting screen 1200 to which information of resource operation constraint is inputted.

In FIG. 12, the resource operation constraint setting screen 1200 is a GUI and has a constraint condition input field 1201, a register button 1202, an add button 1203, and a delete button 1204.

An initial state of the resource operation constraint setting screen 1200 is such that input items (region where characters of "constraint name", "resource name", "start date and time", "end date and time", "capacity" are displayed) of the constraint condition input field 1201, a first input field (input field for "constraint 6-1"), the register button 1202, the add button 1203, and the delete button 1204 are displayed. In the initial state of the resource operation constraint setting screen 1200, the first input fields are all blank.

In the constraint condition input field 1201 illustrated in FIG. 12, there are provided input fields of "resource name" for identifying a "resource" belonging to the resource operation constraint identified by "constraint name ("constraint 6-*")", "start date and time" and "end date and time" of limiting "capacity" of this "resource", and "capacity (magnification to maximum capacity)" when it is limited by it.

By inputs to this constraint condition input field 1201, a resource operation constraint ("constraint name ("constraint 6-*")") indicating a limited "capacity" in a period from the "start date and time" to the "end date and time" of the "resource (resource name)" can be registered. Details of respective fields will be described below.

The "constraint name" displayed on the constraint condition input field 1201 is identification information of the resource operation constraint. In this embodiment, in the first input field of the "constraint name", "constraint 6-1" is automatically displayed. Thereafter, an integer is automatically assigned (displayed) sequentially to the part of * in the term "constraint 6-*" in ascending order from an upper line.

In columns where characters of "resource name" are displayed, any of the "resource names" which are registered as described above can be selectively inputted. This selective input can be realized by performing a pull-down menu display for example.

The "start date and time" means timing to start limiting of the capacity of the resource. In this embodiment, for example, in the column where characters of "start date and time" are displayed, a date and time (numerals) representing this timing can be inputted as the start date and time.

The "end date and time" means timing to end limiting of the capacity of the resource. In this embodiment, for example, in the column where characters of "end date and time" are displayed, a date and time (numerals) representing this timing can be inputted as the end date and time.

The "capacity" means a capacity of the resource in the period in which the capacity of this resource is limited. In this embodiment, for example, a magnification (numeral) with respect to the maximum capacity can be inputted as the capacity.

In the resource operation constraint setting screen 1200 illustrated in FIG. 12B, for example, as a resource operation constraint named "constraint 6-1", a resource operation constraint is set which indicates that the resource whose resource name is "machine 1" should use capacity of 0.7 time of its maximum capacity from 9:30 of 23 Oct. 2011 to 8:30 of 24 Oct. 2011.

When the user operates the input device to press down the add button 1203 in a state that a specific line of the constraint condition input field 1201 of the resource operation constraint setting screen 1200 is specified, one blank input field is added to a line next to the specified line. In this manner, the resource operation constraint can be added.

Further, when the user operates the input device to press down the delete button 1204 in a state that a specific line of the constraint condition input field 1201 of the resource operation constraint setting screen 1200 is specified, (all of) the input fields of the specified line are deleted.

When the input operation to the constraint condition input field 1201 of the resource operation constraint setting screen 1200 is thus finished and the user operates the input device to press down the register button 1202, the constraint condition input setting unit 106 stores in the storage medium the contents inputted to the constraint condition input field 1201 when the register button 1202 is pressed down.

(G) Resource Maximum Capacity Constraint

Figure 13A:
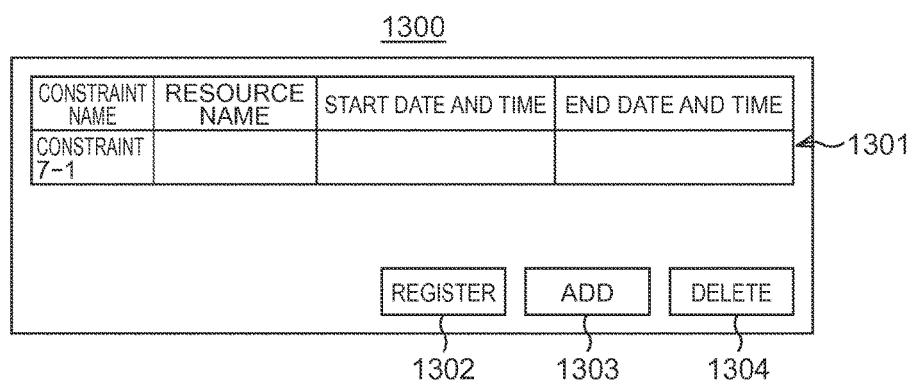
FIG. 13A is a diagram illustrating an example of an initial state of a resource maximum capacity constraint setting screen.
Figure 13B:
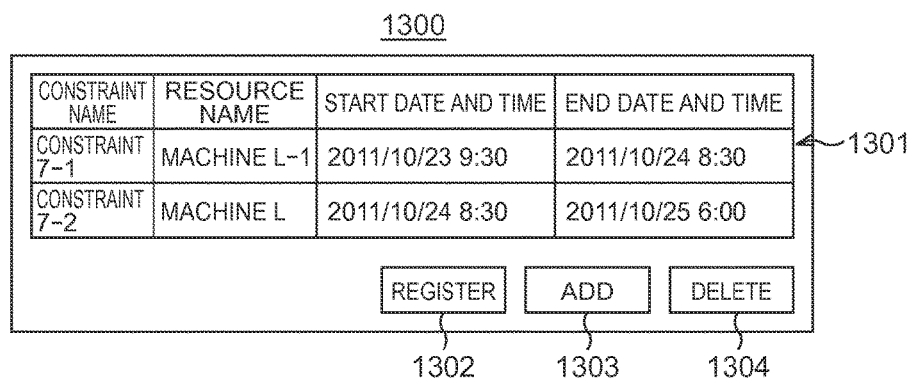
FIG. 13B is a diagram illustrating an example of the resource maximum capacity constraint setting screen to which information of resource maximum capacity constraint is inputted.

The constraint condition input setting unit 106 displays a resource maximum capacity constraint setting screen 1300 illustrated in FIG. 13 on the display device. FIG. 13A is a diagram illustrating an example of an initial state of the resource maximum capacity constraint setting screen 1300. FIG. 13B is a diagram illustrating an example of the resource maximum capacity constraint setting screen 1300 to which information of resource maximum capacity constraint is inputted.

In FIG. 13, the resource maximum capacity constraint setting screen 1300 is a GUI and has a constraint condition input field 1301, a register button 1302, an add button 1303, and a delete button 1304.

An initial state of the resource maximum capacity constraint setting screen 1300 is such that input items (region where characters of "constraint name", "resource name", "start date and time", "end date and time" are displayed) of the constraint condition input field 1301, the first input field (input field for "constraint 7-1"), the register button 1302, the add button 1303, and the delete button 1304 are displayed. In the initial state of the resource maximum capacity constraint setting screen 1300, the first input fields are all blank.

In the constraint condition input field 1301 illustrated in FIG. 13, there are provided input fields of "resource name" for identifying a "resource" belonging to the resource maximum capacity constraint identified by "constraint name ("constraint 7-*")", and "start date and time" and "end date and time" of use of this "resource" at maximum capacity.

By inputs to this constraint condition input field 1301, a resource maximum capacity constraint ("constraint name ("constraint 7-*")") indicating a period (period from the "start date and time" to the "end date and time") in which the "resource (resource name)" can be used at its maximum capacity can be registered.

Note that in the above-described resource operation constraint of (F), a period in which a resource cannot be used or a period in which the capacity of a resource is dropped is specified, whereas the resource maximum capacity constraint of (G) specifies a resource which can use the maximum capacity and a period in which it can be used at its maximum capacity. Details of respective fields will be described below.

The "constraint name" displayed on the constraint condition input field 1301 is identification information of the resource maximum capacity constraint. In this embodiment, in the first input field of the "constraint name", "constraint 7-1" is automatically displayed. Thereafter, an integer is automatically assigned (displayed) sequentially to the part of in the term "constraint 7-*" in ascending order from an upper line.

In the column where characters of "resource name" are displayed, any of the "resource names" which are registered as described above can be selectively inputted. This selective input can be realized by performing a pull-down menu display for example.

The "start date and time" means timing to start use of the maximum capacity of the resource. In this embodiment, for example, in the column where characters of "start date and time" are displayed, a date and time (numerals) representing this timing can be inputted as the start date and time.

The "end date and time" means timing to end use of the maximum capacity of the resource. In this embodiment, for example, in the column where characters of "end date and time" are displayed, a date and time (numerals) representing this timing can be inputted as the end date and time.

In the resource maximum capacity constraint setting screen 1300 illustrated in FIG. 13, for example, as a resource maximum capacity constraint named "constraint 7-1", a resource maximum capacity constraint is set which indicates that the resource whose resource name is "machine L-1" can be used at its maximum capacity from 9:30 of 23 Oct. 2011 to 8:30 of 24 Oct. 2011.

When the user operates the input device to press down the add button 1303 in a state that a specific line of the constraint condition input field 1301 of the resource maximum capacity constraint setting screen 1300 is specified, one blank line is added to a line next to the specified line. In this manner, the resource maximum capacity constraint can be added.

Further, when the user operates the input device to press down the delete button 1304 in a state that a specific line of the constraint condition input field 1301 of the resource maximum capacity constraint setting screen 1300 is specified, (all of) the input fields of the specified line are deleted.

When the input operation to the constraint condition input field 1201 of the resource maximum capacity constraint setting screen 1300 is thus finished and the user operates the input device to press down the register button 1302, the constraint condition input setting unit 106 stores in the storage medium the contents inputted to the constraint condition input field 1301 when the register button 1302 is pressed down.

(H) New Constraint

Figure 14A:
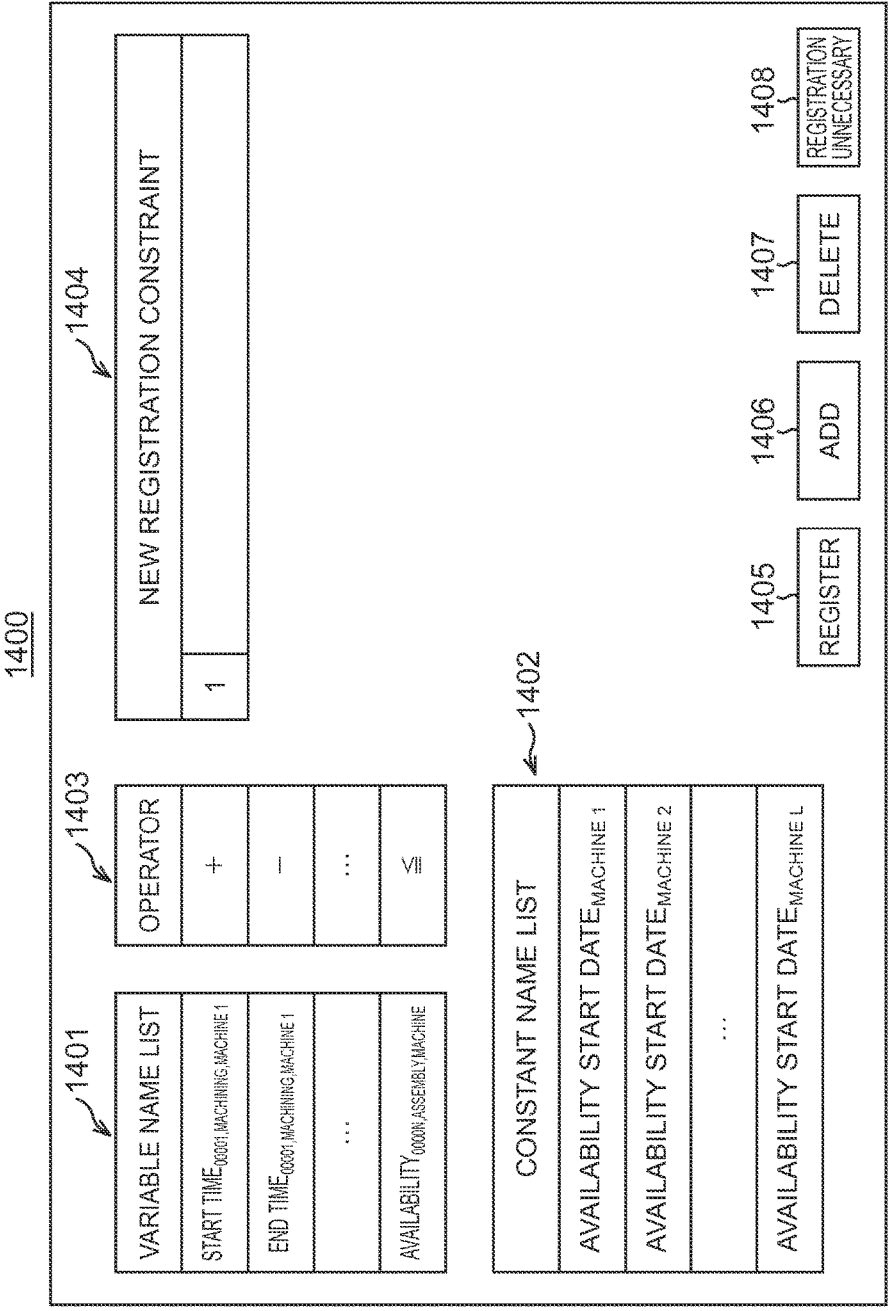
FIG. 14A is a diagram illustrating an example of an initial state of a new constraint setting screen.
Figure 14B:
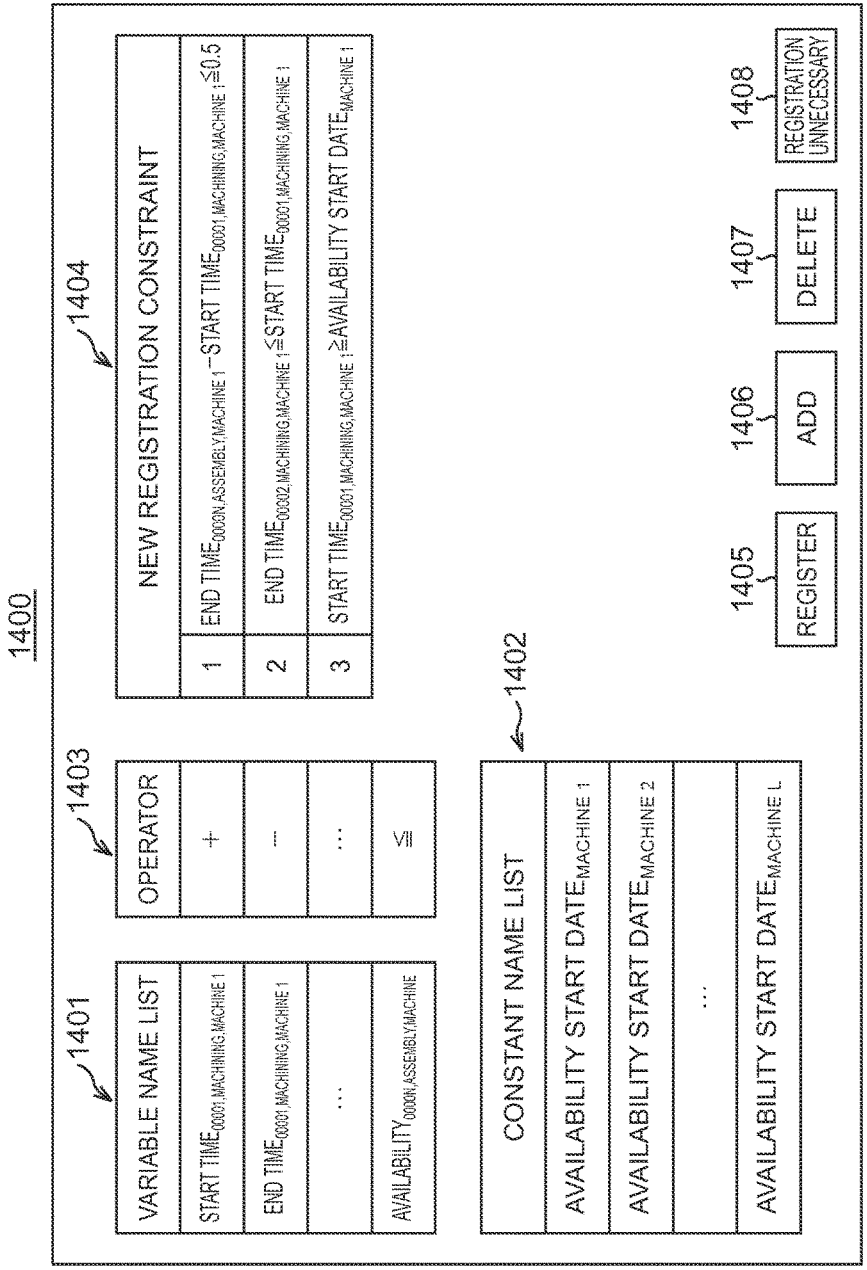
FIG. 14B is a diagram illustrating an example of the new constraint setting screen to which information of new constraint is inputted.

The above constraints of (A) to (G) are determined in advance except the parts inputted by the user. In this embodiment, in addition to these constraints, new constraint condition can be set. Accordingly, the constraint condition input setting unit 106 displays a new constraint setting screen 1400 illustrated in FIG. 14 on the display device. FIG. 14A is a diagram illustrating an example of an initial state of the new constraint setting screen 1400. FIG. 14B is a diagram illustrating an example of the new constraint setting screen 1400 to which information of new constraint is inputted.

In FIG. 14, the new constraint setting screen 1400 is a GUI and has a variable name list 1401, a constant name list 1402, an operator list 1403, a new registration constraint input field 1404, a register button 1405, an add button 1406, a delete button 1407, and a registration unnecessary button 1408.

In the new constraint setting screen 1400 illustrated in FIG. 14, there are provided the "variable name list 1401" for selecting a variable, the "constant name list 1402" for selecting a constant, the operator list 1403 for selecting an operator, and the new registration constraint input field 1404 displaying a constraint expression formulated by these selections.

By inputs to them, a constraint expression formulated freely by the operator from a "variable (variable name list)" and a "constant (constant name list)" by using an "operator" can be registered as a new constraint (newly registered constraint)". Details of respective fields will be described below.

In the variable name list 1401, variables constructed by the variable/constant construction unit 105 are listed. When all the variables are not listed, a scroll bar can be displayed on the variable name list 1401 to scroll display the variables.

In the constant name list 1402, constants constructed by the variable/constant construction unit 105 are listed. When all the constants are not listed, a scroll bar can be displayed on the constant name list 1402 to scroll display the variables.

In the operator list 1403, operators used when performing formulation according to the mathematical programming are listed. When all the constants are not listed, a scroll bar can be displayed on the operator list 1403 to scroll display the operators. Note that in this embodiment, the case where mixed integer programming (linear programming) is used as the mathematical programming is exemplified, and thus operators used when performing formulation according to the mixed integer programming (linear programming) are listed.

In the new registration constraint input field 1404, ones selected by the user by operating the input device from the variables displayed on the variable name list 1401, the constants displayed on the constant name list 1402, and the operators displayed on the operator list 1403 are displayed from a left side when facing toward the diagram in the order of selection. Further, in the new registration constraint input field 1404, numerals can be inputted by the user inputting the input device. In the example illustrated in FIG. 14B, first the region where "end time$_{0000N, assembly, machine\ 1}$" is displayed is specified from the variable name list 1401, then the region where "-" is displayed is specified from the operator list 1403, then the region where "start time$_{00001, assembly, machine\ 1}$" is displayed is specified from the variable name list 1401, then the region where "≤" is displayed is specified from the operator list 1403, and finally "0.5" is inputted, thereby displaying a constraint expression of the first input field (input field of number "1") of the newly registered constraint.

When the user operates the input device to press down the add button 1406 in a state that a certain line (line with a numeral added to a left end) of the new registration constraint input field 1404 of the new constraint setting screen 1400 is specified, one blank input line is added next to the specified line. Thus, a new constraint can be added.

Further, when the user operates the input device to press down the delete button 1407 in a state that a certain line (line with a numeral added to a left end) of the new registration constraint input field 1404 of the new constraint setting screen 1400 is specified, (all of) the input fields of the specified line are deleted.

When the input operation to the new registration constraint input field 1404 of the new constraint setting screen 1400 is thus finished and the user operates the input device to press down the register button 1405, the constraint condition input setting unit 106 stores in the storage medium the contents inputted to the new registration constraint input field 1404 when the register button 1405 is pressed down.

Further, when the new constraint is not to be registered, the user operates the input device to press down the registration unnecessary button 1408. Thus, the new constraint is not registered.

The constraint condition input setting unit 106 is realized by that, for example, the CPU reads process information and the product order information from the HDD or the like, reads variables and constants from the RAM or the like, generates display data for displaying the resource simultaneous use constraint setting screen 700, resource use pattern constraint setting screen 800, resource use pattern processing time constraint setting screen 900, same lot constraint setting screen 1000, different lot constraint setting screen 1100, resource operation constraint setting screen 1200, resource maximum capacity constraint setting screen 1300, and new constraint setting screen 1400 and outputs them to the display device, and stores the constraints obtained from information inputted by the user in the RAM or the like.

(Objective Function Input Setting Unit 107)

FIG. 15 is a diagram illustrating an example of an object setting screen 1500. The objective function input setting unit 107 displays an object setting screen 1500 illustrated in FIG. 15 on the display device. Note that an initial state of the object setting screen 1500 is such that check boxes illustrated in FIG. 15 and lines of a column of a region where characters of "importance (0 to 10)" are displayed are all non-inputted.

In FIG. 15, the object setting screen 1500 is a GUI and has an objective function input field 1501 and a register button 1502.

"Function number" displayed on the objective function input field 1501 is identification information of the objective function. A number of function numbers (number of objective functions) set in advance are displayed in ascending order from "00001" in the objective function input field 1501.

"Effectiveness necessity" is information indicating whether objective functions of respective lines of the objective function input field 1501 are employed or not. In this embodiment, by checking a checkbox, the object specified by information of a line where this checkbox is located is employed.

In a column where characters of "product class" and "process" are displayed, all of combinations of product classes and processes registered in mutual association as described above are displayed.

In a column where characters of "object" are displayed, characters indicating what object the object of setting target is are displayed. The contents of this "object" are set in advance based on ones registered as initial attributes in the above-described respective screens 300, 500, 600, 700, 800, 900, 1000, 1100, 1200, 1300.

"Importance" indicates importance of the object of setting target. As a value of this importance, any of integers "0" to "10" can be inputted in a column where characters of the "importance" are displayed.

Note that when information of all objects cannot be displayed at once in the objective function input field 1501, it may be structured to perform scroll display.

The user operates the input device to check the checkbox of the "effectiveness necessity" corresponding to a desired object, and inputs a value of importance to the field of "importance".

When the input operation to the objective function input field 1501 of the object setting screen 1500 is thus finished and the user operates the input device to press down the register button 1502, the objective function input setting unit 107 stores in the storage medium the contents inputted to the objective function input field 1501 when the register button 1502 is pressed down. In the object setting screen 1500 illustrated in FIG. 15, there are employed having an object of "process time minimum" of "machining" executed in "normal operation" and having an object of "delivery on time" of "assembly" executed in the "special operation".

As described above, in this embodiment, the objective function input field 1501 of the object setting screen 1500 displays at least the contents of an objective function described using a product class and a process mutually associated, characters indicating contents of an object, and importance of the object, and a selection input field (checkbox) of the contents thereof, and the user selects desired information from among the displayed information, to thereby select the contents of an object to be set. Note that such a selection input field is not limited to the checkbox.

The information displayed on the objective function input field 1501 of the object setting screen 1500 illustrated in FIG. 15 is objects set in advance. In this embodiment, in addition to these objects, a new object can be set. Accordingly, the objective function input setting unit 107 displays a new object setting screen including a selection field of "variable and constant" constructed as described above, a selection field of operator, and a display field of part of expression of an objective function constituted of a combination of selected "variable, constant and operator".

Specifically, the objective function input setting unit 107 displays the new object setting screen 1600 illustrated in FIG. 16 on the display device. FIG. 16A is a diagram illustrating an example of an initial state of the new object setting screen 1600. FIG. 16B is a diagram illustrating an example of the new object setting screen 1600 to which information of new objects is inputted.

In FIG. 16, the new object setting screen 1600 is a GUI and has a variable name list 1601 corresponding to a selection field of variable, a constant name list 1602 corresponding to a selection field of constant, an operator list 1603 corresponding to a selection field of operator, a new registration object input field 1604, a register button 1605, an add button 1606, a delete button 1607, and a registration unnecessary button 1608.

The new object setting screen 1600 is the same as the new constraint setting screen 1400 illustrated in FIG. 14 except that the input target in the new registration object input field 1604 is the objective function whereas the input target in the new registration constraint input field 1404 is the constraint expression. Thus, a detailed description thereof is omitted.

The objective function input setting unit 107 is realized by that, for example, the CPU reads process information from the HDD or the like and reads variables and constants from the RAM or the like, generates display data for displaying the object setting screen 1500 and the new object setting screen 1600 and outputs them to the display device, and stores the data indicating contents of an objective function obtained from information inputted by the user in the RAM or the like.

(Formulation Unit 108)

A formulation unit 108 formulates a constraint expression based on the variables and constants constructed in the variable/constant construction unit 105, the "product, process, resource and product order" registered in mutual association as described above, and the contents of constraint set in the constraint condition input setting unit 106.

An example of constraint expressions formulated in this embodiment will be described below.

<Constraint of Start, End>

The formulation unit 108 formulates a constraint expression described in following expression (1) by using the variables constructed in the variable/constant construction unit 105.

[Expression 1]

$$\left.\begin{array}{l}\text{Start } time_{00001, process, machine\,1} \leq \text{end } time_{00001, process, machine\,1} \\ \text{Start } time_{00001, standby, machine\,2} \leq \text{end } time_{00001, standby, machine\,2} \\ \ldots \\ \text{Start } time_{00001, assembly, machine\,L-1} \leq \text{end } time_{00001, assembly, machine\,L-1} \\ \text{Start } time_{00001, assembly, machine\,L} \leq \text{end } time_{00001, assembly, machine\,L} \end{array}\right\} \quad (1)$$

Expression (1) expresses that the start time and the end time of each resource should not be reversed in the same order number and the same process. Note that the constraint expression of expression (1) is a constraint expression (determined from a physical reason) different from the contents of the constraint expression set in the constraint condition input setting unit 106.

<Constraint Expression Between Processes>

The formulation unit 108 formulates a constraint expression described in following expression (2) using the variables constructed in the variable/constant construction unit 105 based on process information registered by the process input registration unit 103 and the product order information registered in the product order input registration unit 104.

[Expression 2]

$$\left.\begin{array}{l}\text{End } time_{00001, process, machine\,1} \leq \text{start } time_{00001, standby, machine\,2} \\ \text{End } time_{00001, standby, machine\,2} \leq \text{start } time_{00001, \ldots, \ldots} \\ \ldots \\ \text{End } time_{00001, \ldots, \ldots} \leq \text{start } time_{00001, assembly, machine\,L-1} \\ \text{End } time_{00001, assembly, machine\,L-1} \leq \text{start } time_{00001, assembly, machine\,L} \end{array}\right\} \quad (2)$$

A constraint expression similar to expression (1) is formulated also for the other order numbers 00002, . . . , 0000N.

Expression (2) expresses that in the same order number, each resource should be used in the order of processes defined for the product order of this order number.

<Constraint Expression of Use Time>

The formulation unit 108 formulates a constraint expression described in following expression (3) using the variables constructed in the variable/constant construction unit 105 based on the process information registered by the process input registration unit 103 and the product order information registered in the product order input registration unit 104.

[Expression 3]

$$\left.\begin{array}{l}\text{End } time_{00001, process, machine\,1} - \\ \text{start } time_{00001, process, machine\,1} = 2.0 \\ 0.5 \leq \text{end } time_{00001, standby, machine\,2} - \\ \text{start } time_{00001, standby, machine\,2} \leq 1.5 \\ \ldots \\ 1.2 \leq \text{end } time_{00001, assembly, machine\,L} - \\ \text{start } time_{00001, assembly, machine\,L} \leq 1.5 \end{array}\right\} \quad (3)$$

A constraint expression similar to expression (1) is formulated also for the other order numbers 00002, . . . , 0000N.

Expression (3) expresses the use time or the range of use time of each resource in the same order number and the same process.

<Constraint Expression of Resource Simultaneous Use Constraint>

The formulation unit 108 formulates a constraint expression described in following expression (4) using the variables and constants constructed in the variable/constant construction unit 105 based on the process information registered by the process input registration unit 103, the product order information registered in the product order input registration unit 104, and the contents of the resource simultaneous use constraint set by the constraint condition input setting unit 106 by using the resource simultaneous use constraint setting screen 700 illustrated in FIG. 7.

[Expression 4]

$$\left.\begin{array}{l}\text{Start } time_{00001, process, machine\,1} - \\ \text{end } time_{00002, process, machine\,1} + M \times \\ \text{prior and subsequent } judgement_{00001, 00002, process, machine\,1} \geq \\ \text{minimum use } interval_{machine\,1} \\ \text{End } time_{00001, process, machine\,1} - \\ \text{start } time_{00002, process, machine\,1} - M \times (1 - \\ \text{prior and subsequent } judgement_{00001, 00002, process, machine\,1}) \leq \\ -\text{minimum use } interval_{machine\,1} \end{array}\right\} \quad (4)$$

In expression (4), M is a sufficiently large positive value.

A constraint expression similar to expression (4) is formulated also for the order numbers 00001, 0000N, and order numbers 00002, 0000N.

<Constraint Expression of Resource Use Pattern Constraint>

The formulation unit 108 formulates a constraint expression described in following expression (5) using the variables constructed in the variable/constant construction unit 105 based on the process information registered by the process input registration unit 103, the product order information registered in the product order input registration unit 104, and the contents of the resource use pattern constraint set by the constraint condition input setting unit 106 by using the resource use pattern constraint setting screen 800 illustrated in FIG. 8.

[Expression 5]

$$\left.\begin{array}{l} Availability_{00001, standby, machine\ 1} + \\ M \times (1 - availability_{00001, process, machine\ 1}) \geq 1 \\ Availability_{00001, assembly, machine\ 1} + \\ M \times (1 - availability_{00001, process, machine\ 1}) \geq 1 \end{array}\right\} \quad (5)$$

In expression (5), M is a sufficiently large positive value.

<Constraint Expression of the Resource Use Pattern Processing Time Constraint>

The formulation unit 108 formulates a constraint expression described in following expression (6) using the variables constructed in the variable/constant construction unit 105 based on the process information registered by the process input registration unit 103, the product order information registered in the product order input registration unit 104, and the contents of the resource use pattern processing time constraint set by the constraint condition input setting unit 106 by using the resource use pattern processing time constraint setting screen 900 illustrated in FIG. 9.

[Expression 6]

$$M \times (availability_{00001, standby, machine\ 1} - 1) + \text{end time}_{00001, process, machine\ 1} - \text{start time}_{00001, process, machine\ 1} = 1.8 \quad (6)$$

In expression (6), M is a sufficiently large positive value.

Also for the order number 00002, a constraint expression similar to expression (6) is formulated.

<Constraint Expression of Same Lot Constraint>

The formulation unit 108 formulates a constraint expression described in following expression (7) using the variables constructed in the variable/constant construction unit 105 based on the process information registered by the process input registration unit 103, the product order information registered in the product order input registration unit 104, and the contents of the same lot constraint set by the constraint condition input setting unit 106 by using the same lot constraint setting screen 1000 illustrated in FIG. 10.

[Expression 7]

$$\text{Start time}_{00002, assembly, machine\ 1} - \text{end time}_{00001, assembly, machine\ 1} = 0 \quad (7)$$

<Constraint Expression of Different Lot Constraint>

The formulation unit 108 formulates a constraint expression described in following expression (8) using the variables constructed in the variable/constant construction unit 105 based on the process information registered by the process input registration unit 103, the product order information registered in the product order input registration unit 104, and the contents of the different lot constraint set by the constraint condition input setting unit 106 by using the different lot constraint setting screen 1100 illustrated in FIG. 11.

[Expression 8]

$$\text{Start time}_{00003, assembly, machine\ 1} - \text{end time}_{00002, assembly, machine\ 1} + M \times (1 - \text{prior and subsequent judgment}_{00002, 00003, assembly, machine\ 1}) \geq 2.0 \quad (8)$$

<Constraint Expression of Resource Operation Constraint>

The formulation unit 108 formulates a constraint expression described in following expression (9) using the variables constructed in the variable/constant construction unit 105 based on the process information registered by the process input registration unit 103, the product order information registered in the product order input registration unit 104, and the contents of the resource operation constraint set by the constraint condition input setting unit 106 by using the resource operation constraint setting screen 1200 illustrated in FIG. 12.

[Expression 9]

$$\left.\begin{array}{l} 0.7 \times \left( \begin{array}{l} \text{end time}_{00001, process, machine\ 1} - \\ \text{start time}_{00001, process, machine\ 1} \end{array} \right) + \\ M \times (1 - availability_{00001, process, machine\ 1}) \geq 5.0 \\ 0.7 \times \left( \begin{array}{l} \text{end time}_{00001, standby, machine\ 1} - \\ \text{start time}_{00001, standby, machine\ 1} \end{array} \right) + \\ M \times (1 - availability_{00001, standby, machine\ 1}) \geq 5.0 \\ \ldots \end{array}\right\} \quad (9)$$

In expression (9), M is a sufficiently large positive value.

A constraint expression similar to expression (9) is formulated also for the "machine 2".

<Constraint Expression of Resource Maximum Capacity Constraint>

The formulation unit 108 formulates a constraint expression described in following expression (10) using the variables and constants constructed in the variable/constant construction unit 105 based on the process information registered by the process input registration unit 103, the product order information registered in the product order input registration unit 104, and the contents of the resource maximum capacity constraint set by the constraint condition input setting unit 106 by using the resource maximum capacity constraint setting screen 1300 illustrated in FIG. 13.

[Expression 10]

$$\left.\begin{array}{l} \text{Maximum } capacity_{machine\ 1} \times \left( \begin{array}{l} \text{end time}_{00001, process, machine\ 1} - \\ \text{start time}_{00001, process, machine\ 1} \end{array} \right) + \\ M \times (1 - availability_{00001, process, machine\ 1}) \geq 5.0 \\ \text{Maximum } capacity_{machine\ 1} \times \left( \begin{array}{l} \text{end time}_{00001, standby, machine\ 1} - \\ \text{start time}_{00001, standby, machine\ 1} \end{array} \right) + \\ M \times (1 - availability_{00001, standby, machine\ 1}) \geq 5.0 \\ \ldots \end{array}\right\} \quad (10)$$

In expression (10), M is a sufficiently large positive value.

A constraint expression similar to expression (10) is formulated also for the "machine 2".

Thus, the constraint expressions are formulated. Note that regarding a new constraint, it is formulated by the contents set by using the new constraint setting screen 1400 illustrated in FIG. 14.

<Formulation of Objective Function>

Next, the formulation unit 108 formulates an objective function based on the variables and constants constructed in the variable/constant construction unit 105, the "product class, process, resource and product order" registered in mutual association as described above, and the contents of the object set in the objective function input setting unit 107. An example of the objective function formulated in this embodiment will be described below.

The formulation unit 108 formulates an objective function described in following expression (11) using variables and constants constructed in the variable/constant construction unit 105 based on the contents of the object set by the objective function input setting unit 107 using the object setting screen 1500 illustrated in FIG. 15 and the new object setting screen 1600 illustrated in FIG. 16.

[Expression 11]

$$\begin{aligned}
\text{Objective function } F = \quad & 5 \times [(\text{end } time_{O0001,process,machine\ 1} - \text{start } time_{O0001,process,machine\ 1}) + \\
& (\text{end } time_{O0002,process,machine\ 1} - \\
& \text{start } time_{O0002,process,machine\ 1})] + \\
& 10 \times (\text{end } time_{O000N,assembly,machine\ L-1} - \text{delivery } date_{O000N}) + [ \\
& (\text{start } time_{O0001,process,machine\ 1} - \text{availability start } date_{machine\ 1}) + \\
& \ldots + \\
& (\text{start } time_{O000N,process,machine\ 1} - \text{availability start } date_{machine\ L})]
\end{aligned} \quad (11)$$

The formulation unit 108 is realized by that, for example, the CPU reads process information and product order information from the HDD or the like and reads the contents of variables, constants, constraints/objects from the RAM or the like, constructs the above constraint expressions and objective expressions, and stores the data thereof in the RAM or the like.

(Plan Creating Unit 109)

A plan creating unit 109 performs optimization calculation by the mixed integer programming for example, so as to obtain, as a production plan, decision variables (start $time_{order\ number,\ process\ name,\ resource\ name}$, end $time_{order\ number,\ process\ name,\ resource\ name}$) which minimize an objective function F formulated in the formulation unit 108 within the range which satisfies constraints based on the constraint expressions formulated in the formulation unit 108.

The plan creating unit 109 is realized by that, for example, the CPU reads the data of formulated objective function and constraint expression from the RAM or the like, obtains the production plan, and stores the data thereof in the RAM or the like.

(Plan Display Unit 110)

A plan display unit 110 displays the production plan (start $time_{order\ number,\ process\ name,\ resource\ name}$, end $time_{order\ number,\ process\ name,\ resource\ name}$) obtained in the plan creating unit 109 on the display device.

The plan display unit 110 is realized by that, for example, the CPU reads the decision variable (start $time_{order\ number,\ process\ name,\ resource\ name}$, end $time_{order\ number,\ process\ name,\ resource\ name}$) from the RAM or the like, generates display data of the production plan, and outputs them to the display device.

(Plan Management Unit 111)

A plan management unit 111 manages data of the production plan (start $time_{order\ number,\ process\ name,\ resource\ name}$, end $time_{order\ number,\ process\ name,\ resource\ name}$) obtained in the plan creating unit 109. More specifically, the plan management unit 111 stores input information inputted to the scheduling apparatus 100 by the operator when the production plan is made and planning result information indicating a planning result of the production plan as a set in the storage medium, and takes out and outputs them as necessary (according to a request from the operator, or the like). In this manner, for example, input information used when a previous production plan is made can be changed slightly to make and retain a new production plan again. Further, by realizing this function, a comparison of results of planning of a production plan when conditions (input information) are slightly different, or the like becomes possible.

The plan management unit 111 is realized by that, for example, the CPU reads the data of production plan from the RAM or the like and stores them in the HDD or the like.

(Plan Output Unit 112)

A plan output unit 112 outputs data of a production plan (start $time_{order\ number,\ process\ name,\ resource\ name}$, end $time_{order\ number,\ process\ name,\ resource\ name}$) managed by the plan management unit 111. For example, the plan output unit 112 can transmit a signal related to the production plan to an external device 120 via a network based on an operation of the input device by the user, or store date related to the production plan in a portable storage medium.

Based on an operation of the input device by the user, necessary one (start $time_{order\ number,\ process\ name,\ resource\ name}$, end $time_{order\ number,\ process\ name,\ resource\ name}$) can be selected from among the production plans (start $time_{order\ number,\ process\ name,\ resource\ name}$, end $time_{order\ number,\ process\ name,\ resource\ name}$) managed by the plan management unit 111. In this case, the plan output unit 112 outputs only data of the selected production plan from among the production plans managed by the plan management unit 111.

When the resource specified by a resource name is a human resource of workers or the like and when this resource is a material resource which needs an operation of a human resource of workers or the like, the plan output unit 112 transmits as a signal related to the production plan a display instruction signal for instructing display of information indicating the contents of the production plan (start $time_{order\ number,\ process\ name,\ resource\ name}$, end $time_{order\ number,\ process\ name,\ resource\ name}$) to the display device which the human resource refers to. In this case, the display device, or the information processing apparatus which performs processing to display information indicating the contents of the production plan (start $time_{order\ number,\ process\ name,\ resource\ name}$, end $time_{order\ number,\ process\ name,\ resource\ name}$) on the display device, is the external device 120. The display device or the information processing apparatus generates display data for displaying the contents of the production plan based on the signal related to this production plan and displays them on the display device. The display device is disposed in, for example, a standby place of the human resource.

When the resource specified by the resource name is a human resource of workers or the like, the human resource of workers or the like specifies the start time and the end time of an operation which the resource is in charge for based on the display of information indicating the contents of the production plan, starts the operation at this start time, and ends the operation at this end time.

When the resource specified by the resource name is a material resource which needs an operation by a human resource of workers or the like, the human resource of workers or the like specifies the start time and the end time of an operation for a material resource to which it performs the operation based on the display of information indicating the contents of the production plan, starts an operation in the material resource at this start time, and ends the operation in the material resource at this end time. As a result, the material resource complies with the production plan based on the signal related to the production plan.

When the resource specified by the resource name is one which does not need an operation by the human resource of workers or the like, the plan output unit 112 starts the operation at the start time in each process according to the production plan (start time$_{order\ number,\ process\ name,\ resource\ name}$, end time$_{order\ number,\ process\ name,\ resource\ name}$), and transmits a control signal for instructing each resource to finish operation at the end time to the relevant resource as the signal related to the production plan. In this case, the resource is the external device 120. Each resource automatically operates based on a control signal transmitted from the plan output unit 112.

As described above, when the resource specified by the resource name does not need the operation of the human resource and operates automatically, the scheduling apparatus has a function as a resource control apparatus controlling operation of the resource. In this case, a schedule management system can be structured which has the scheduling apparatus 100 having the function as the resource control device and one or more resources. In this case, as described above, the resource automatically performs specifying the start time and the end time of operation, starting the operation at this start time, and finishing the operation at the end time based on a signal (control signal) related to the production plan received from the plan output unit 112.

Further, the signal related to the production plan transmitted from the plan output unit 112 may be transmitted via a process computer without directly transmitting to the above-described information processing apparatus or the resource (material resource). In this case, the external device 120 is the process computer.

The plan output unit 112 is realized by that, for example, the CPU reads data of the production plan from the HDD or the like, and outputs the data to an outside part of the scheduling apparatus 100 via an interface.

(Operation Flow Chart of the Scheduling Apparatus 100)

Next, an example of a processing operation of the scheduling apparatus 100 will be described with reference to a flowchart of FIG. 17.

First, in step S1701 of FIG. 17A, the resource input registration unit 101 displays the resource registration screen 300.

Next, in step S1702, the resource input registration unit 101 judges whether an operation to the resource registration screen 300 is a press down of the register button 302 or not. As a result of this judgment, when the operation to the resource registration screen 300 is not the press down of the register button 302, the flow returns to step S1701 and the resource input registration unit 101 changes display contents of the resource registration screen 300 according to the contents of this operation.

Then, when there is a press down of the register button 302 to the resource registration screen 300, the flow proceeds to step S1703. When it proceeded to step S1703, the resource input registration unit 101 stores the contents (resource information) inputted in the resource input field 301 in the storage medium.

Next, in step S1704, the product class input registration unit 102 displays the product class registration screen 400.

Next, in step S1705, the product class input registration unit 102 judges whether an operation to the product class registration screen 400 is a press down of the register button 402 or not. As a result of this judgment, when the operation to the product class registration screen 400 is not the press down of the register button 402, the flow returns to step S1704 and the product class input registration unit 102 changes display contents of the product class registration screen 400 according to the contents of this operation.

Then, when there is a press down of the register button 402 to the product class registration screen 400, the flow proceeds to step S1706. When it proceeded to step S1706, the product class input registration unit 102 stores the contents (product class information) inputted in the product class input field 401 in the storage medium.

Next, in step S1707, the process input registration unit 103 displays the process registration screen 500.

Next, in step S1708, the process input registration unit 103 judges whether an operation to the process registration screen 500 is a press down of the register button 402 or not. As a result of this judgment, when the operation to the process registration screen 500 is not the press down of the register button 502, the flow returns to step S1707 and the process input registration unit 103 changes display contents of the process registration screen 500 according to the contents of this operation.

Then, when there is a press down of the register button 502 to the process registration screen 500, the flow proceeds to step S1709. When it proceeded to step S1709, the process input registration unit 103 stores the contents (process information) inputted in the process input field 501 in each product class in the storage medium.

Next, in step S1710, the product order input registration unit 104 displays the product order registration screen 600 on the display device.

Next, in step S1711, the product order input registration unit 104 judges whether an operation to the product order registration screen 600 is a press down of the register button 602 or not. As a result of this judgment, when the operation to the product order registration screen 600 is not the press down of the register button 602, the flow returns to step S1710 and the product order input registration unit 104 changes display contents of the product order registration screen 600 according to the contents of this operation.

Then, when there is a press down of the register button 602 to the product order registration screen 600, the flow proceeds to step S1712. When it proceeded to step S1712, the product order input registration unit 104 stores the contents (product order information) inputted in the product order input field 601 in the storage medium.

Figure 17B:
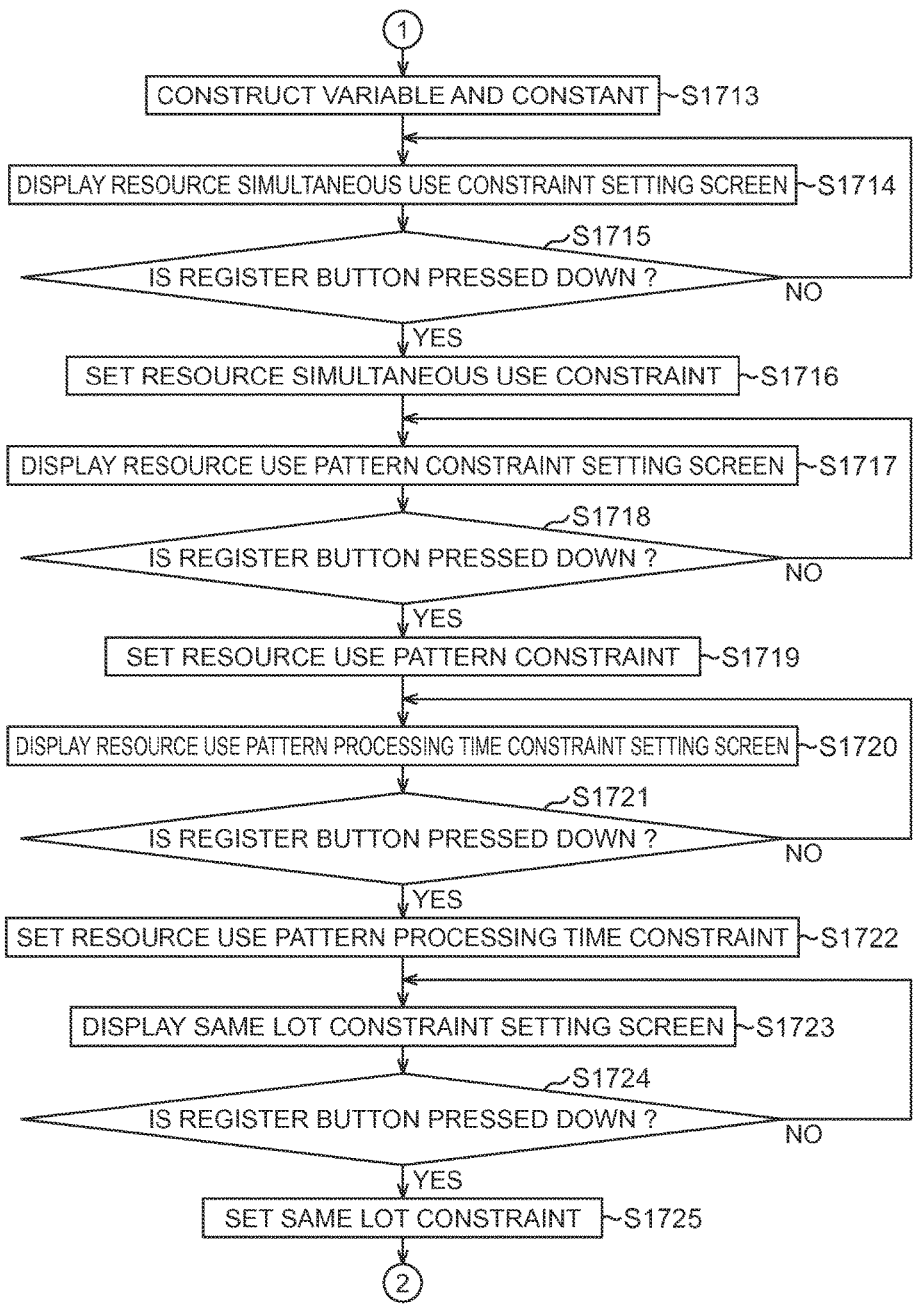
FIG. 17B is a flowchart continued from FIG. 17A.

Next, in step S1713 of FIG. 17B, the variable/constant construction unit 105 uses the process information and the product order information to construct variables (start time$_{order\ number,\ process\ name,\ resource\ name}$/end time$_{order\ number,\ process\ name,\ resource\ name}$, availability$_{order\ number,\ process\ name,\ resource\ name}$, prior and subsequent judgment$_{order\ number,\ order\ number,\ process\ name,\ resource\ name}$) and a constant (availability start date$_{resource\ name}$).

Next, in step S1714, the constraint condition input setting unit 106 displays the resource simultaneous use constraint setting screen 700.

Next, in step S1715, the constraint condition input setting unit 106 judges whether an operation to the resource simultaneous use constraint setting screen 700 is a press down of the register button 702 or not. As a result of this judgment, when the operation to the resource simultaneous use constraint setting screen 700 is not the press down of the register button 702, the flow returns to step S1714 and the constraint condition input setting unit 106 changes display contents of the resource simultaneous use constraint setting screen 700 according to the contents of this operation.

Then, when there is a press down of the register button 702 to the resource simultaneous use constraint setting screen 700, the flow proceeds to step S1716. When it proceeded to step S1716, the constraint condition input setting unit 106 stores the contents (contents of resource simultaneous use constraint) inputted in the constraint condition input field 701 in the storage medium.

Next, in step S1717, the constraint condition input setting unit 106 displays the resource use pattern constraint setting screen 800.

Next, in step S1718, the constraint condition input setting unit 106 judges whether an operation to the resource use pattern constraint setting screen 800 is a press down of the register button 802 or not. As a result of this judgment, when the operation to the resource use pattern constraint setting screen 800 is not the press down of the register button 802, the flow returns to step S1717 and the constraint condition input setting unit 106 changes display contents of the resource use pattern constraint setting screen 800 according to the contents of this operation.

Then, when there is a press down of the register button 802 to the resource use pattern constraint setting screen 800, the flow proceeds to step S1719. When it proceeded to step S1719, the constraint condition input setting unit 106 stores the contents (contents of resource use pattern constraint) inputted in the constraint condition input field 801 in the storage medium.

Next, in step S1720, the constraint condition input setting unit 106 displays the resource use pattern processing time constraint setting screen 900.

Next, in step S1721, the constraint condition input setting unit 106 judges whether an operation to the resource use pattern processing time constraint setting screen 900 is a press down of the register button 902 or not. As a result of this judgment, when the operation to the resource use pattern processing time constraint setting screen 900 is not the press down of the register button 902, the flow returns to step S1720 and the constraint condition input setting unit 106 changes display contents of the resource use pattern processing time constraint setting screen 900 according to the contents of this operation.

Then, when there is a press down of the register button 902 to the resource use pattern processing time constraint setting screen 900, the flow proceeds to step S1722. When it proceeded to step S1722, the constraint condition input setting unit 106 stores the contents (contents of resource use pattern processing time constraint) inputted in the constraint condition input field 901 in the storage medium.

Next, in step S1723, the constraint condition input setting unit 106 displays the same lot constraint setting screen 1000.

Next, in step S1724, the constraint condition input setting unit 106 judges whether an operation to the same lot constraint setting screen 1000 is a press down of the register button 1002 or not. As a result of this judgment, when the operation to the same lot constraint setting screen 1000 is not the press down of the register button 1002, the flow returns to step S1723 and the constraint condition input setting unit 106 changes display contents of the same lot constraint setting screen 1000 according to the contents of this operation.

Then, when there is a press down of the register button 1002 to the same lot constraint setting screen 1000, the flow proceeds to step S1725. When it proceeded to step S1725, the constraint condition input setting unit 106 stores the contents (contents of same lot constraint) inputted in the constraint condition input field 1001 in the storage medium.

Next, in step S1726 of FIG. 17C, the constraint condition input setting unit 106 displays the different lot constraint setting screen 1100.

Next, in step S1727, the constraint condition input setting unit 106 judges whether an operation to the different lot constraint setting screen 1100 is a press down of the register button 1102 or not. As a result of this judgment, when the operation to the different lot constraint setting screen 1100 is not the press down of the register button 1102, the flow returns to step S1726 and the constraint condition input setting unit 106 changes display contents of the different lot constraint setting screen 1100 according to the contents of this operation.

Then, when there is a press down of the register button 1102 to the different lot constraint setting screen 1100, the flow proceeds to step S1728. When it proceeded to step S1728, the constraint condition input setting unit 106 stores the contents (contents of different lot constraint) inputted in the constraint condition input field 1101 in the storage medium.

Next, in step S1729, the constraint condition input setting unit 106 displays the resource operation constraint setting screen 1200.

Next, in step S1730, the constraint condition input setting unit 106 judges whether an operation to the resource operation constraint setting screen 1200 is a press down of the register button 1202 or not. As a result of this judgment, when the operation to the resource operation constraint setting screen 1200 is not the press down of the register button 1202, the flow returns to step S1729 and the constraint condition input setting unit 106 changes display contents of the resource operation constraint setting screen 1200 according to the contents of this operation.

Then, when there is a press down of the register button 1202 to the resource operation constraint setting screen 1200, the flow proceeds to step S1731. When it proceeded to step S1731, the constraint condition input setting unit 106 stores the contents (contents of resource operation constraint) inputted in the constraint condition input field 1201 in the storage medium.

Next, in step S1732, the constraint condition input setting unit 106 displays the resource maximum capacity constraint setting screen 1300.

Next, in step S1733, the constraint condition input setting unit 106 judges whether an operation to the resource maximum capacity constraint setting screen 1300 is a press down of the register button 1302 or not. As a result of this judgment, when the operation to the resource maximum capacity constraint setting screen 1300 is not the press down of the register button 1302, the flow returns to step S1732 and the constraint condition input setting unit 106 changes display contents of the resource maximum capacity constraint setting screen 1300 according to the contents of this operation.

Then, when there is a press down of the register button 1302 to the resource maximum capacity constraint setting screen 1300, the flow proceeds to step S1734. When it proceeded to step S1734, the constraint condition input setting unit 106 stores the contents (contents of resource maximum capacity constraint) inputted in the constraint condition input field 1301 in the storage medium.

Next, in step S1735, the constraint condition input setting unit 106 displays the new constraint setting screen 1400.

Next, in step S1736, the constraint condition input setting unit 106 judges whether an operation to the new constraint setting screen 1400 is a press down of the register button 1405 or not. As a result of this judgment, when the operation to the new constraint setting screen 1400 is not the press down of the register button 1405, the flow proceeds to step S1737.

When it proceeded to step S1737, the constraint condition input setting unit 106 judges whether an operation to the new constraint setting screen 1400 is a press down of the registration unnecessary button 1408 or not. As a result of this judgment, when the operation to the new constraint setting screen 1400 is not the press down of the registration unnecessary button 1408, the flow returns to step S1735 and the constraint condition input setting unit 106 changes display contents of the new constraint setting screen 1400 according to the contents of this operation.

On the other hand, when the operation to the new constraint setting screen 1400 is the press down of the registration unnecessary button 1408, step S1738 is omitted and the flow proceeds to step S1739 which will be described later.

When it is judged in step S1736 that the operation to the new constraint setting screen 1400 is the press down of the register button 1405, the flow proceeds to step S1738. When it proceeded to step S1738, the constraint condition input setting unit 106 stores the contents (contents of new constraint (constraint expression)) inputted in the new registration constraint input field 1404 in the storage medium. Then, the flow proceeds to step S1739.

When it proceeded to step S1739, the objective function input setting unit 107 displays the object setting screen 1500.

Next, in step S1740, the objective function input setting unit 107 judges whether an operation to the object setting screen 1500 is a press down of the register button 1502 or not. As a result of this judgment, when the operation to the object setting screen 1500 is not the press down of the register button 1502, the flow returns to step S1739 and the objective function input setting unit 107 changes display contents of the object setting screen 1500 according to the contents of this operation.

Then, when there is a press down of the register button 1502 to the object setting screen 1500, the flow proceeds to step S1741. When it proceeded to step S1741, the objective function input setting unit 107 stores the contents (contents of an object checked in the checkboxes of "effectiveness necessity") of the objective function input field 1501 in the storage medium.

Figure 17D:
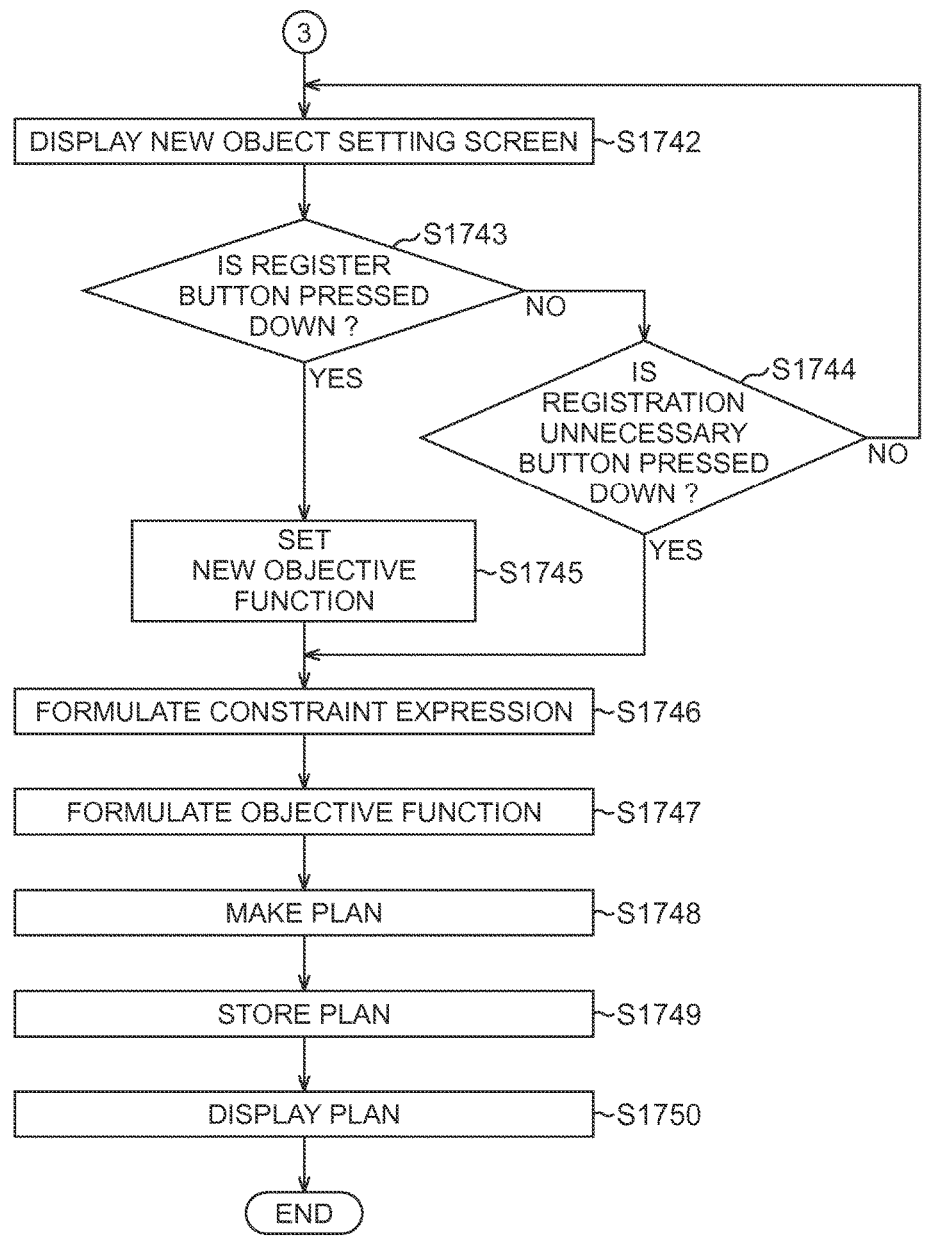
FIG. 17D is a flowchart continued from FIG. 17C.

Next, in step S1742 of FIG. 17D, the objective function input setting unit 107 displays the new object setting screen 1600.

Next, in step S1743, the objective function input setting unit 107 judges whether an operation to the new object setting screen 1600 is a press down of the register button 1605 or not. As a result of this judgment, when the operation to the new object setting screen 1600 is not the press down of the register button 1605, the flow proceeds to step S1737.

When it proceeded to step S1744, the objective function input setting unit 107 judges whether an operation to the new object setting screen 1600 is a press down of the registration unnecessary button 1608 or not. As a result of this judgment, when the operation to the new object setting screen 1600 is not the registration unnecessary button 1608, the flow returns to step S1742, the flow returns to step S1739 and the objective function input setting unit 107 changes display content of the new object setting screen 1600 according to the contents of this operation.

On the other hand, when the operation to the new object setting screen 1600 is the press down of the registration unnecessary button 1608, step S1745 is omitted and the flow proceeds to step S1746 which will be described later.

In step S1743, when it is judged that the operation to the new object setting screen 1600 is a press down of the register button 1605, the flow proceeds to step S1745. When it proceeded to step S1745, the objective function input setting unit 107 stores the contents (contents of a new object) inputted in the new registration object input field 1604 in the storage medium. Then, the flow proceeds to step S1746.

When it proceeded to step S1746, the formulation unit 108 formulates a constraint expression based on the variables and contents constructed in step S1713, the process information registered in step S1709, the product order information (information of "product class, process, product order, resource" registered in mutual association) registered in step S1712, and the contents of the constraints set in steps S1716, S1719, S1722, S1725, S1728, S1731, S1734 (see expression (1) to expression (10)).

Then, in step S1747, the formulation unit 108 formulates an objective function based on the variables and contents constructed in step S1713, the process information registered in step S1709, the product order information (information of "product class, process, product order, resource" registered in mutual association) registered in step S1712, and the contents of the object set in steps S1741, S1745 (see expression (11)).

Next, in step S1748, the plan creating unit 109 performs optimization calculation by the mixed integer programming for example, so as to obtain as decision variables (start $time_{order\ number,\ process\ name,\ resource\ name}$, end $time_{order\ number,\ process\ name,\ resource\ name}$, and so on) which minimize an objective function F formulated in step S1747 within the range which satisfies the constraint based on the constraint expression formulated in step S1746.

Next, in step S1749, the plan management unit 111 stores data of the production plan obtained in step S1748.

Next, in step S1750, the plan display unit 110 displays the production plan obtained in step S1748.

Then, the processing by the flowchart of FIG. 17 is finished.

SUMMARY

In this embodiment, as described above, resources, product classes, processes, and product orders are registered in mutual association. From the registered information, variables and constants used when formulating an objective function and a constraint expression according to the mathematical programming are constructed. The constraint setting screen including the contents of the constraint expression described by using the selection input field of these pieces of identification information of the "product classes, processes, and resources" mutually associated is displayed. Based on a result of selective input by the user to this constraint setting screen, the contents of constraint are set. Then, the constraint expression is formulated based on the constructed variables and constants, the information of "product class, process, and resource" mutually associated, and the set contents of constraint.

Further, the object setting screen is displayed which includes the contents of the object described using the "product classes and processes" mutually associated, text information indicating the contents of an object, and an importance of the object, and the selection input field thereof. The contents of the object are registered based on a result of selective input by the user to this object setting screen. Then, the constraint expression is formulated based on the constructed variables and constants, the information of the "product class, process, and resource" mutually associated, and the set contents of constraint.

Thus, it is possible to provide a general user who does not have high-level mathematical expertise with a system to make a production plan more diverse than hitherto by using the mathematical programming. Further, when the production plan is made by using the mathematical programming, erroneous input by the user can be prevented. As a result, the total time required for making the production plan can be reduced. Moreover, since the production plan is made by using the mathematical programming, it is possible to make a production plan whose optimality is mathematically ensured. By producing the products according to such a production plan whose optimality is mathematically ensured, products can be produced efficiently.

By defining and preparing items needed for the production plan clearly with respect to the resource, product class, process, and product order, it becomes unnecessary for a user who does not have special mathematical knowledge to sort out and newly define items needed for the production plan. That is, the user can make a production plan whose optimality is mathematically ensured easily and quickly and for wide targets by just performing an operation to fill in necessary items according to a screen presented by the scheduling apparatus 100.

Further, in this embodiment, the new constraint setting screen including the selection fields of the constructed variables and constants and the selection fields of operators is displayed. Then, based on a result of selective inputs of the user to this new constraint setting screen, a new constraint expression can be formulated.

Moreover, in this embodiment, the new object setting screen including the selection field of constructed variables and constants and the selection fields of operators is displayed. Then, based on a result of selective inputs of the user to this new constraint setting screen, contents of objective function can be added.

Accordingly, a more general-purpose production plan can be made by using the mathematical programming. Here, since formulation is realized by using easily understandable variables such as a start time and an end time of each product order, each process, or each resource, a user who does not have special mathematical knowledge can easily understand information to be inputted for formulation. That is, the user who does not have special mathematical knowledge can add the constraint expression and the objective function without being aware of the mathematical programming. Therefore, the production plan whose optimality is mathematically ensured can be planned flexibly.

In addition, for a request which needs to be satisfied in an actual operation and which cannot be realized without having special knowledge when making the production plan, such as reducing a processing time of a resource as much as possible or keeping a required delivery date as much as possible, the user who does not have special mathematical knowledge can easily make the production plan flexibly whose optimality is mathematically ensured.

Further, attributes of resources, attributes of processes, and attributes of product order information can be added. Thus, the more general-purpose production plan can be made by using the mathematical programming.

Modification Example

In this embodiment, the case of making the production plan has been exemplified and described. However, this embodiment can also be applied to a distribution plan. In this case, of course, terms for expressing variables and constants of objective functions and constraint expressions and objects and constraints are replaced with terms suitable for the distribution plan.

Further, in this embodiment, the case of creating the resource information, the product class information, the process information, and the product order information based on inputs to the screens has been exemplified and described. However, for example, such information may be created by an information processing apparatus different from the scheduling apparatus 100, and the created information may be taken into the scheduling apparatus 100 and registered.

Further, in this embodiment, the case of expressing the objective function by a weighted linear sum has been exemplified and described. However, the objective function is not limited to the weighted linear sum. For example, "10×(end time$_{OOOON, assembly, machine\ L\text{-}1}$−delivery date$_{OOOON}$)" on the right side of expression (11) may be "10×(end time$_{OOOON, assembly, machine\ L\text{-}1}$−delivery date$_{OOOON}$)$^2$". That is, the mathematical programming is not limited to the mixed integer programming, and for example, may be a mixed integer second order programming. Note that in this embodiment, although the case of minimizing the objective function has been exemplified and described, the objective function may be maximized according to the object.

(Hardware Structure)

Figure 18:
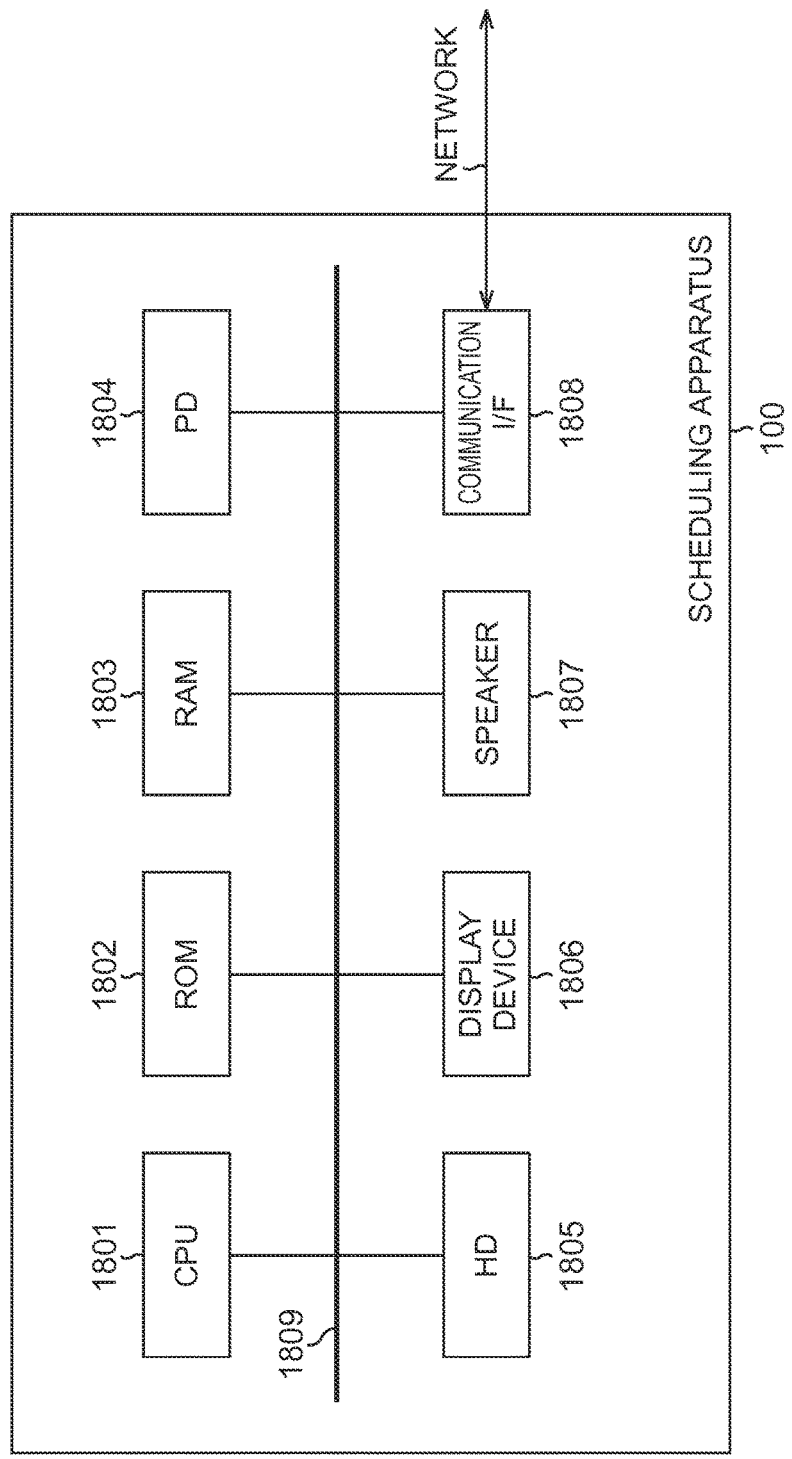
FIG. 18 is a diagram illustrating an example of a hardware structure of the scheduling apparatus.

FIG. 18 is a diagram illustrating an example of a hardware structure of the scheduling apparatus 100.

As illustrated in FIG. 18, the scheduling apparatus 100 has a CPU (Central Processing Unit) 1801, a ROM (Read Only Memory) 1802, a RAM (Random Access Memory) 1803, a PD (Pointing Device) 1804, an HD (Hard Disk) 1805, a display device 1806, a speaker 1807, a communication I/F (Interface) 1808, and a system bus 1809.

The CPU 1801 controls overall operation of the scheduling apparatus 100, and controls respective structural units (1802 to 1808) of the scheduling apparatus 100 via the system bus 1809.

The ROM 1802 stores a BIOS (Basic Input/Output System), an operating system program (OS) which are control programs of the CPU 1801, a program needed for the CPU 1801 to execute the above-described processing, and the like.

The RAM 1803 functions as a main memory, a work area, and the like of the CPU 1801. When executing processing, the CPU 1801 loads a necessary computer program or the like from the ROM 1802 and necessary information or the like from the HD 1805 into the RAM 1803, and executes this computer program or the like or processing of this information or the like to realize various operations.

The PD 1804 is, for example, constituted of a mouse, a keyboard, and/or the like and forms an operation input means for performing an operation input to the scheduling apparatus 100 by the operator as necessary.

The HD 1805 forms a storage means storing various information and data, files, and so on.

The display device 1806 forms a display means representing various types of information based on control by the CPU 1801.

The speaker 1807 forms an audio output means for outputting sound related to various types of information based on control by the CPU 1801.

The communication I/F 1808 performs communication of various types of information with an external apparatus via a network based on control by the CPU 1801.

The system bus 1809 is a bus for connecting the CPU 1801, the ROM 1802, the RAM 1803, the PD 1804, the HD 1805, the display device 1806, the speaker 1807, and the communication I/F 1808 in a mutually communicable manner.

Note that the above-described embodiment of the present invention can be realized by a computer executing a program. Further, a computer readable recording medium recording the program and a computer program product of the program or the like can be applied as an embodiment of the present invention. As the recording medium, for example, a flexible disk, a hard disk, an optical disk, a magneto-optical disk, a CD-ROM, a magnetic tape, a non-volatile memory card, a ROM, or the like can be used.

Further, it should be noted that the above-described embodiments of the present invention merely illustrate concrete examples of implementing the present invention, and the technical scope of the present invention is not to be construed in a restrictive manner by these embodiments. That is, the present invention may be implemented in various forms without departing from the technical spirit or main features thereof.

(Relation with Claims)

In accordance with at least one embodiment:

A registration means (step) is realized by, for example, the resource input registration unit 101 executing step S1703, the product class input registration unit 102 executing step S1706, the process input registration unit 103 executing step S1709, and the product order input registration unit 104 executing step S1712 (see also FIG. 2).

A construction means (process) is realized by, for example, the variable/constant construction unit 105 executing step S1713.

"A start time and end time of each order/each process/each resource" corresponds to, for example, start $time_{order\ number,\ process\ name,\ resource\ name}$, end $time_{order\ number,\ process\ name,\ resource\ name}$.

A constraint setting means (step) is realized by, for example, the constraint condition input setting unit 106 executing steps S1714, S1716, S1717, S1719, S1720, S1722, S1723, S1725, S1726, and steps S1728, S1729, S1731, S1732, S1734.

"A selection input field of at least one piece of identification information of the product class, the process, and the resource" corresponds to, for example, the constraint condition input fields 701, 801, 901, 1001, 1101, 1201, 1301.

An object setting means (step) is realized by, for example, the objective function input setting unit 107 executing steps S1739, S1741.

"A selection input field for inputting identification information of the product class and the process and an object by the objective function" corresponds to, for example, the objective function input field 1501.

A constraint expression formulating means (step) is realized by, for example, the formulation unit 108 executing step S1746.

An objective function formulating means (step) is realized by, for example, the formulation unit 108 executing step S1747.

A plan creating means (step) is realized by, for example, the plan creating unit 109 executing step S1748.

In accordance with at least one embodiment:

A resource registration screen display means (step) is realized by, for example, the resource input registration unit 101 executing step S1701.

"Attribute information of the resources set in advance to be a constant in at least one of the objective function and the constraint expression" corresponds to, for example, the information of "maximum capacity" and "minimum use interval" of FIG. 3A.

In accordance with at least one embodiment:

A resource registration screen display means (step) is realized by, for example, the resource input registration unit 101 executing steps S1701 and S1702.

"An input field of attribute information to be a constant in at least one of the objective function and the constraint expression" corresponds to, for example, the input field of "availability start date" of FIG. 3B.

In accordance with at least one embodiment:

A product class registration screen display means (step) is realized by, for example, the product class input registration unit 102 executing step S1704.

In accordance with at least one embodiment:

A process registration screen display means (step) is realized by, for example, the process input registration unit 103 executing step S1707.

A registration means (step) is realized by, for example, the process input registration unit 103 executing step S1709.

"An input field of the resources in the process registration screen" corresponds to, for example, the selection input fields of "'machine 1', 'machine 2', . . . , 'machine L-1', 'machine L'" of the process registration screen 500.

In accordance with at least one embodiment:

A process registration screen display means (step) is realized by, for example, the process input registration unit 103 executing steps S1701 to S1708.

In accordance with at least one embodiment:

A product order registration screen display means (step) is realized by, for example, the product order input registration unit 104 executing step S1710.

"An input field of the product class in the product order registration screen" corresponds to, for example, the selection input field of "product class" of the product order registration screen 600.

In accordance with at least one embodiment:

A product order registration screen display means (step) is realized by, for example, the product order input registration unit 104 executing steps S1710, S1711.

In accordance with at least one embodiment:

A new constraint setting screen display means (step) is realized by, for example, the constraint condition input setting unit 106 executing step S1735.

In accordance with at least one embodiment:

A new object setting screen display means (step) is realized by, for example, the objective function input setting unit 107 executes step S1745.

"The contents of an object based on an operation by the user to the new object setting screen displayed by the new object setting screen display means" corresponds to, for example, the contents described in a line where a checkbox of "effectiveness necessity" of the objective function input field 1501 is checked.

In accordance with at least one embodiment:

A plan output means (step) is realized by, for example, the plan output unit 112 transmitting a signal related to a production plan to the external device 120.

INDUSTRIAL APPLICABILITY

The present invention can be applied to an application or the like carrying out production or distribution.

The invention claimed is:

1. A scheduling apparatus automatically making a production plan or a distribution plan by mathematical programming by using information of each of
 a product order indicating contents of an order of a product,
 a process which is processing executed in a course of production or distribution of the product,
 a resource which is a human resource and a material resource used in the process, and a product class which is identification information for distinguishing orders for which processes executed in the course of production or distribution of the product, an order of execution of the processes, and resources used respectively in the processes are same, as one set from others, the scheduling apparatus comprising:

a processing circuitry configured to:

register the resources and the processes, the processes and the product classes, and the product classes and the product orders in mutual association in a recording medium;

construct variables including a start time and end time of each product order/each process/each resource as decision variables used when formulating an objective function and a constraint expression according to the mathematical programming based on the product classes, the processes, the resources, and the product orders which are mutually associated;

set contents of the constraint expression based on an input operation of identification information by a user to a selection input field for inputting at least one piece of identification information of the product classes, the processes, and the resources which are mutually associated;

set contents of the objective function based on an input operation of identification information and an object by the user to a selection input field for inputting identification information of the product classes and the processes which are mutually associated and an object by the objective function;

formulate the constraint expression by using the constructed variables based on the product classes, the processes, the resources, and the product orders which are mutually associated and the contents of the set constraint expression;

formulate the objective function by using the constructed variables based on the product classes, the processes, the resources, and the product orders which are mutually associated and the contents of the set objective function; and perform optimization calculation by the mathematical programming to derive the decision variable which maximize or minimize the formulated objective function within a range which satisfies constraints based on the formulated constraint expression, wherein an operation is started by the resource at the start time included in the decision variable derived by the optimization calculation and an operation is finished by the resource at the end time included in the decision variable derived by the optimization calculation, and wherein contents of the objective change according to the contents of the input to the selection input field, and contents of the constraints change according to the contents of the input to the selection input field.

2. The scheduling apparatus according to claim 1, wherein the processing circuitry is further configured to:

display on a display device a resource registration screen displaying at least an input field of resource information including identification information of the resources and attribute information of the resources set in advance to be a constant in at least one of the objective function and the constraint expression, register in a storage medium the resource information obtained based on an operation by the user to a displayed resource registration screen, formulate the constraint expression by using the constructed variables and the attribute information included in the resource information based on the product classes, the processes, the resources, and the product orders which are mutually associated and the contents of the set constraint expression, and formulate the objective function by using the constructed variables and the attribute information included in the resource information based on the product classes, the processes, the resources, and the product orders which are mutually associated and the contents of the set objective function.

3. The scheduling apparatus according to claim 2, wherein the processing circuitry is further configured to display a resource registration screen in which an input field of attribute information to be a constant in at least one of the objective function and the constraint expression is added to an input field of the resource information based on an operation by the user to the resource registration screen, and the processing circuitry is further configured to construct a constant based on the attribute information inputted to the input field added to the resource registration screen as a constant used when an objective function and a constraint expression for the objective function are formulated according to the mathematical programming based on the product classes, the processes, the resources, and the product orders which are mutually associated.

4. The scheduling apparatus according to claim 2, wherein the processing circuitry is further configured to display on a display device a product class registration screen displaying at least an input field of product class information including the identification information of the product class, and register in a storage medium the product class information obtained based on an operation by the user to the displayed product class registration screen.

5. The scheduling apparatus according to claim 4, wherein the processing circuitry is further configured to display on a display device a process registration screen displaying at least an input field of process information including information identifying each of processes executed on the registered product classes, an order of executing the processes, and resources used respectively in the processes, an input field of the resources in the process registration screen is a field where resources to be used respectively in the processes are selectively inputted from among the registered resources, and the processing circuitry is further configured to register in the storage medium the process information obtained based on an operation by the user to the displayed process registration screen.

6. The scheduling apparatus according to claim 5, wherein the processing circuitry is further configured to display a process registration screen in which an input field of attribute information of each of the processes is added to an input field of the process information based on an operation by the user to the process registration screen.

7. The scheduling apparatus according to claim 5, wherein the processing circuitry is further configured to display on a display device a product order registration screen displaying at least an input field of product order information including the identification information of the product order, a product class to which the product order belongs, an ordered amount in this product order, and a delivery date of the product order, the input field of the product class in the product order registration screen is a field selectively inputted from the registered product classes, and the processing circuitry is further configured to register in a storage medium the product order information obtained based on an operation by the user to the displayed product order registration screen.

8. The scheduling apparatus according to claim 7, wherein the processing circuitry is further configured to display a product order registration screen in which an input field of attribute information of each of the product orders is added to the input field of the product order information based on an operation by the user to the product order registration screen.

9. The scheduling apparatus according to claim 1, wherein the processing circuitry is further configured to display on a display device a new constraint setting screen displaying at least a selection field of the constructed variables and a selection field of operators, and a constraint expression is further formulated based on an operation by the user to the displayed new constraint setting screen.

10. The scheduling apparatus according to claim 1, wherein the processing circuitry is further configured to display on a display device a new object setting screen displaying at least a selection field of the constructed variables and a selection field of operators, and formulate the objective function by using the constructed variables based on the product classes, the processes, the resources, and the product orders which are mutually associated, the contents of the set objective function, and the contents of the objective function based on an operation by the user to the displayed new object setting screen.

11. The scheduling apparatus according to claim 1, wherein the processing circuitry is further configured to output to an external apparatus a signal related to a production plan constituted of the created decision variable.

12. The scheduling apparatus according to claim 11, wherein the processing circuitry is further configured to transmit to an external apparatus a display instruction signal for instructing display of information related to the production plan as a signal related to the production plan, so as to display the information related to the production plan on a display device.

13. The scheduling apparatus according to claim 11, wherein the resources include a material resource which automatically operates based on a control signal, and the processing circuitry is further configured to transmit to an external apparatus a control signal for instructing a start of operation at the start time and an end of operation at the end time based on the production plan as a signal related to the production plan, so as to make the resource operate automatically based on the control signal.

14. The scheduling apparatus according to claim 1, wherein the mathematical programming is mixed integer programming or mixed integer second order programming.

15. A scheduling method automatically making a production plan or a distribution plan on a computer by mathematical programming by using information of each of a product order indicating contents of an order of a product, a process which is processing executed in a course of production or distribution of the product, a resource which is a human resource and a material resource used in the process, and a product class which is identification information for distinguishing orders for which processes executed in the course of production or distribution of the product, an order of execution of the processes, and resources used respectively in the processes are same, as one set from others, the scheduling method comprising:

a registration step of registering the resources and the processes, the processes and the product classes, and the product classes and the product orders in mutual association in a recording medium;

a construction step of constructing variables including a start time and end time of each product order/each process/each resource as decision variables used when formulating an objective function and a constraint expression according to the mathematical programming based on the product classes, the processes, the resources, and the product orders which are mutually associated by the registration step;

a constraint setting step of setting contents of the constraint expression based on an input operation of identification information by a user to a selection input field for inputting at least one piece of identification information of the product classes, the processes, and the resources which are mutually associated by the registration step;

an object setting step of setting contents of the objective function based on an input operation of identification information and an object by the user to a selection input field for inputting identification information of the product classes and the processes which are mutually associated by the registration step and an object by the objective function;

a constraint expression formulating step of formulating the constraint expression by using the variables constructed by the construction step based on the product classes, the processes, the resources, and the product orders which are mutually associated by the registration step and the contents of the constraint expression set by the constraint setting step;

an objective function formulating step of formulating the objective function by using the variables constructed by the construction step based on the product classes, the processes, the resources, and the product orders which are mutually associated by the registration step and the contents of the objective function set by the object setting step; and a plan creating step of performing optimization calculation by the mathematical programming to derive the variable which maximize or minimize the objective function formulated by the objective function formulating step within a range which satisfies constraints based on the constraint expression formulated by the constraint expression formulating step, wherein an operation is started by the resource at the start time included in the decision variable derived by the optimization calculation and an operation is finished by the resource at the end time included in the decision variable derived by the optimization calculation, and wherein contents of the objective change according to the contents of the input to the selection input field, and contents of the constraints change according to the contents of the input to the selection input field.

16. The scheduling method according to claim 15, wherein
the registration step
further has a resource registration screen display step of displaying on a display device a resource registration screen displaying at least an input field of resource information including identification information of the resources and attribute information of the resources set in advance to be a constant in at least one of the objective function and the constraint expression, and registers in a storage medium the resource information obtained based on an operation by the user to a resource registration screen displayed by the resource registration screen display step, and
the constraint expression formulating step formulates the constraint expression by using the variables constructed by the construction step and the attribute information included in the resource information based on the product classes, the processes, the resources, and the product orders which are mutually associated by the registration step and the contents of the constraint expression set by the constraint setting step, and
the objective function formulating step formulates the objective function by using the variables constructed by the construction step and the attribute information included in the resource information based on the product classes, the processes, the resources, and the product orders which are mutually associated by the registration step and the contents of the objective function set by the object setting step.

17. The scheduling method according to claim 16, wherein
the resource registration screen display step displays a resource registration screen in which an input field of attribute information to be a constant in at least one of the objective function and the constraint expression is added to an input field of the resource information based on an operation by the user to the resource registration screen, and
the construction step further constructs a constant based on the attribute information inputted to the input field added to the resource registration screen as a constant used when an objective function and a constraint expression for the objective function are formulated according to the mathematical programming based on the product classes, the processes, the resources, and the product orders which are mutually associated by the registration step.

18. The scheduling method according to claim 16, wherein
the registration step
further has a product class registration screen display step of displaying on a display device a product class registration screen displaying at least an input field of product class information including the identification information of the product class, and
registers in a storage medium the product class information obtained based on an operation by the user to the product class registration screen displayed by the product class registration screen display step.

19. The scheduling method according to claim 18, comprising
a process registration screen display step of displaying on a display device a process registration screen displaying at least an input field of process information including information identifying each of processes executed on the product classes registered by the registration step, an order of executing the processes, and resources used respectively in the processes, wherein
an input field of the resources in the process registration screen is a field where resources to be used respectively in the processes are selectively inputted from among the resources registered by the registration step, and
the registration step registers in the storage medium the process information obtained based on an operation by the user to the process registration screen displayed by the process registration screen display step.

20. The scheduling method according to claim 19, wherein
the process registration screen display step displays a process registration screen in which an input field of attribute information of each of the processes is added to an input field of the process information based on an operation by the user to the process registration screen.

21. The scheduling method according to claim 19, wherein
the registration step further has a product order registration screen display step of displaying on a display device a product order registration screen displaying at least an input field of product order information including the identification information of the product order, a product class to which the product order belongs, an ordered amount in this product order, and a delivery date of the product order,
the input field of the product class in the product order registration screen is a field selectively inputted from the product classes registered by the registration step, and
the registration step registers in a storage medium the product order information obtained based on an operation by the user to the product order registration screen displayed by the product order registration screen display step.

22. The scheduling method according to claim 21, wherein
the product order registration screen display step displays a product order registration screen in which an input field of attribute information of each of the product orders is added to the input field of the product order information based on an operation by the user to the product order registration screen.

23. The scheduling method according to claim 15, wherein
the constraint expression formulating step
further has a new constraint setting screen display step of displaying on a display device a new constraint setting screen displaying at least a selection field of the variables constructed by the construction step and a selection field of operators, and
a new constraint expression is further formulated based on an operation by the user to the new constraint setting screen displayed by the new constraint setting screen display step.

24. The scheduling method according to claim 15, wherein
the objective function formulating step
further has a new object setting screen display step of displaying on a display device a new object setting screen displaying at least a selection field of the variables constructed by the construction step and a selection field of operators, and
formulates the objective function by using the variables constructed by the construction step based on the product classes, the processes, the resources, and the product orders which are mutually associated by the registration step, the contents of the objective function set by the object setting step, and the contents of the objective function based on an operation by the user to the new object setting screen displayed by the new object setting screen display step.

25. The scheduling method according to claim 15, comprising
a plan output step of outputting to an external apparatus a signal related to a production plan constituted of the decision variable created by the plan creating step.

26. The scheduling method according to claim 25, wherein
the plan output step transmits to an external apparatus a display instruction signal for instructing display of information related to the production plan as a signal related to the production plan, so as to display the information related to the production plan on a display device.

27. The scheduling method according to claim 25, wherein
the resources include a material resource which automatically operates based on a control signal, and
the plan output step transmits to an external apparatus a control signal for instructing a start of operation at the start time and an end of operation at the end time based on the production plan as a signal related to the production plan, so as to make the resource operate automatically based on the control signal.

28. The scheduling method according to claim 15, wherein
the mathematical programming is mixed integer programming or mixed integer second order programming.

* * * * *